(12) United States Patent
Fukuda

(10) Patent No.: US 8,145,031 B2
(45) Date of Patent: Mar. 27, 2012

(54) RECORDING APPARATUS

(75) Inventor: Kazuhiro Fukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 622 days.

(21) Appl. No.: 12/354,215

(22) Filed: Jan. 15, 2009

(65) Prior Publication Data

US 2009/0180759 A1    Jul. 16, 2009

(30) Foreign Application Priority Data

Jan. 16, 2008    (JP) ................................. 2008-006605

(51) Int. Cl.
*H04N 5/765* (2006.01)
*H04N 9/88* (2006.01)

(52) U.S. Cl. ........................ 386/232; 386/263
(58) Field of Classification Search ................. 386/232, 386/263, 264, 270, 269
See application file for complete search history.

(56) References Cited

U.S. PATENT DOCUMENTS 6,122,435 A * 9/2000 Izawa et al. ................... 386/241
2006/0165385 A1 * 7/2006 Aoki ............................. 386/112

FOREIGN PATENT DOCUMENTS

EP    1 933 557    6/2008
JP    2007-82040    3/2007

* cited by examiner

*Primary Examiner* — Robert Chevalier
(74) *Attorney, Agent, or Firm* — Wenderoth, Lind & Ponack, L.L.P.

(57) ABSTRACT

A recording apparatus which can provide a video signal and an audio signal in synchronization even when the input signal is discontinuous. The recording apparatus includes: an input unit which receives 60P or 60I video and audio signals; a control unit which detects a discontinuity of a pulldown sequence; a recording command information generation unit which generates video recording command information and audio recording command information so that the video signal is recorded as a 24P signal; and a recording unit which provides to-be-recorded video data and to-be-recorded audio data in accordance with the video recording command information and the audio recording command information. The control unit determines the state of recording as the non-record state for a predetermined period of time during which recording of the video signal is suspended following the discontinuity detection of the pulldown sequence and after a lapse of which the recording of the video signal is resumed so that the pulldown sequence of the recorded video signal becomes continuous. The recording command information generation unit generates the video recording command information and the audio recording command information according to the determined state of recording.

9 Claims, 54 Drawing Sheets

Recorded video data
Recorded audio data

FIG. 32

Recorded video data: A B C a e f g h i j k l
Recorded audio data: 1-1 1-2 1-3 1-4 1-5 1-6 2-1 2-2 2-3 2-4 2-11 2-12 2-13 2-14 2-15 2-16 2-17 2-18 2-19 2-20 2-21 2-22 2-23 2-24 2-25 2-26 2-27 2-28 2-29 2-30

FIG. 44

Recorded video data: A | B | C | D | e | f | g | h | i | j | k | l

Recorded audio data: 1-1 | 1-2 | 1-3 | 1-4 | 1-5 | 1-6 | 1-7 | 1-8 | 2-1 | 2-2 | 2-11 | 2-12 | 2-13 | 2-14 | 2-15 | 2-16 | 2-17 | 2-18 | 2-19 | 2-20 | 2-21 | 2-22 | 2-23 | 2-24 | 2-25 | 2-26 | 2-27 | 2-28 | 2-29 | 2-30

FIG. 54
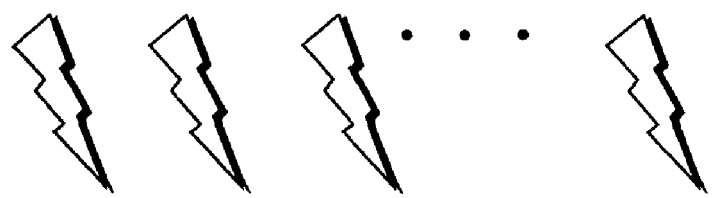
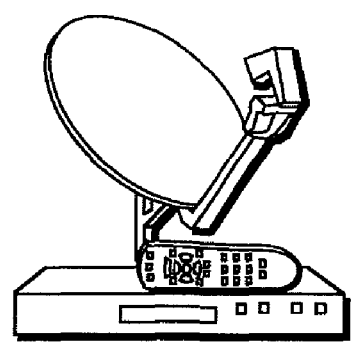
REC
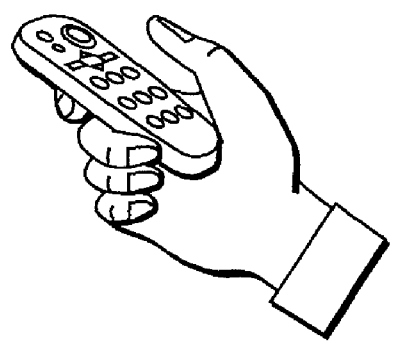

RECORDING APPARATUS

BACKGROUND OF THE INVENTION (1) Field of the Invention

The present invention relates to a recording apparatus which is equal to a film camera in terms of imaging effect. More specifically, the present invention relates to a recording apparatus used in the digital cinematography field where 2-3 pulldown video and audio signals are recorded for video production, which is equal in terms of quality to the video production made by a film cinema system. Hereinafter, 2-3 pulldown may also be referred to simply as "pulldown".

(2) Description of the Related Art

For making a movie using film, a progressive video signal is recorded at 24 frames per second and then this 24P signal is reproduced.

In recent years, digital cinema production which refers to making a movie using a video camera has been suggested as an alternative to film cinema production which refers to making a movie using a film camera. Examples of digital cinema production equipment are explained as follows.

FIG. 1 is a diagram showing a configuration example of a usual video camera. As shown, when using the usual video camera, a progressive video signal or an interlaced video signal is recorded at 60 frames per second onto a video tape. Hereafter, the progressive video signal is referred to as the "60P signal" whereas the interlaced video signal is referred to as the "60I signal".

FIG. 2 is a diagram showing a configuration example of digital cinema production equipment that employs a pulldown recording method. As shown, when using the digital cinema production equipment employing the pulldown recording method, a captured image is stored as a 24P signal which is first converted into a 60P or 60I signal by a pulldown conversion unit and then is recorded onto a video tape. For reproduction, a reverse pulldown conversion unit of the digital cinema production equipment converts the 60P or 60I signal back into the 24P signal. Or, without such conversion, the 60P or 60I signal is provided for reproduction. By doing so, a signal processing circuit of a conventional video camera can be used as it is, so that quality systems have been able to be provided at low cost.

Moreover, in recent years, recording media having a high affinity for information technology (IT), such as disc media and semiconductor memory media, have been used in addition to tape media. However, as compared with tape media, these media cost more per recording time. For this reason, a recording method for saving recording capacity, that is, a native recording method, has been suggested.

FIG. 3 is a diagram showing a configuration example of digital cinema production equipment that employs the native recording method. As shown, when using the digital cinema production equipment employing the native recording method, an effective-frame extraction unit deletes a redundant video signal from the 60P or 60I signal which has been pulldown-converted on the basis of pulldown sequence information. Thus, only the video signal necessary for the recording, i.e., the effective frame signal, is extracted and recorded, thereby saving recording capacity.

Moreover, not only recording-reproduction apparatuses having a video capture unit, such as a combination camera-recorder-player apparatus, but also recording-reproduction apparatuses used for backup, dubbing, and editing purposes which have no video capture unit have been suggested.

FIG. 4 is a diagram showing a configuration example of digital cinema production equipment which does not have a video capture unit. As shown, for performing a recording operation using the digital cinema production equipment having no video capture unit, an input unit receives a pulldown-converted 60P or 60I signal, and then an effective-frame extraction unit extracts the effective frame signal on the basis of pulldown sequence information detected by a pulldown sequence detection unit.

When the input signal is pulldown-converted in the apparatus as in the cases of the recording-reproduction apparatuses having the video capture units as shown in FIGS. 2 and 3, the pulldown sequence information used for extracting the effective frame signal can be controlled in the apparatus and, in general, the pulldown sequence information is controlled as information repeated every predetermined period of time.

On the other hand, when the input signal is a 60P or 60I signal as in the case of the recording-reproduction apparatus having no video capture unit as shown in FIG. 4, the pulldown sequence information of the input video signal is not always repeated, or continuous, every predetermined period of time. In addition, a usual 60P or 60I signal which has not been pulldown-converted may be received. For such a case, the pulldown sequence detection unit and the effective-frame extraction unit are designed so as to reduce visual discomfort caused by the effective frame signal.

For example, a method for extracting the effective frame signal in the case where the 60I input signal includes both the 2-3 pulldown video signal and the 2-3 non-pulldown video signal has been suggested (refer to Japanese Unexamined Patent Application Publication No. 2007-82040, for example). According to this extracting method, the effective frame signal is extracted as follows on the basis of the pulldown sequence information. When the 60I input signal is the 2-3 non-pulldown video signal, the 60I signal is converted into the 60P signal. When the 60I input signal is the 2-3 non-pulldown video signal, the 60I signal is reversely pulldown-converted into the 24P signal which is then converted to the 60P signal. In this way, the extraction is performed by switching between the signals which are accordingly converted. It should be noted here that in the above-mentioned reference No. 2007-82040, the video signal processing is described and the audio signal processing is not considered.

Using the configuration examples shown in FIGS. 1 to 4, the video signal processing has been described. However, the recording-reproduction apparatus records and reproduces an audio signal as well as the video signal. As a condition for doing this, the video signal and the audio signal received and recorded at the same timing need to be provided for reproduction at the same timing. In other words, the video signal and the audio signal need to be synchronized. This is because when watching a material in which the video signal and the audio signal are out of synchronization, one may experience discomfort or even feel sick. Moreover, the input signal disturbed during recording can end up being material with noise, requiring man-hours to delete the noise part from the material.

FIG. 5 is a diagram showing a method for recording video and audio using the usual video camera. As shown, when using the usual video camera, the input video signal and the input audio signal are recorded without being deleted. Here, it should be noted that descriptions regarding delays caused by the signal processing and the like are omitted in the present and following diagrams explained below.

FIG. 6 is a diagram showing video and audio data of material recorded using the usual video camera. From this diagram, it should be understood that the video signal and the audio signal of this material can be synchronized for reproduction when the reproduction of the recorded video data and the recorded audio data are started at the same timing.

FIG. 7 is a diagram showing a method for recording video and audio using the pulldown recording method. FIG. 8 is a diagram showing the video and audio data recorded using the pulldown recording method. As in the cases shown in FIGS. 5 and 6, the video signal and the audio signal are recorded without being deleted, and it should be thus understood that the video signal and the audio signal of this material can be synchronized for reproduction when the reproduction of the recorded video data and the recorded audio data are started at the same timing. Note that it does not matter if the signal is a 60P signal or a 60I signal.

FIG. 9 is a diagram showing the native recording method for the 60P signal. Video recording command information shown in this diagram is used for control to record or not to record the 60P input signal, in accordance with the pulldown sequence information detected by the pulldown sequence detection unit as shown in FIG. 4. Here, the pulldown sequence detection unit may detect the pulldown sequence information: by comparing the input video signal data; by calculating a numeric value of time code information superimposed on the input video signal; or by referring to the pulldown sequence information allocated to user's bit information superimposed on the input video signal.

As shown in FIG. 9, the pulldown sequence information is represented by a numeric value from 0 to 4, and one set of pulldown sequence information is allocated to two frames of the 60P signal. It should be noted that a frame assigned 0 as the pulldown sequence information is referred to as the "top" of the sequence.

Here, one set of pulldown sequence information is allocated to two frames of the 60P signal as mentioned above, in order to maintain compatibility between the 60P signal and the 60I signal in the case of mutual conversion. The 60I signal constructs one piece of video by one frame, i.e., two fields, and one set of information, such as the time code information and the pulldown sequence information attached to the video, is allocated to two fields. When the 60P signal and the 60I signal are mutually converted, two fields of the 60I signal correspond to two frames of the 60P signal on a time axis. This is why one set of the pulldown sequence information is allocated to two frames of the 60P signal. Note that, out of the two fields of the 60I signal, an anterior field is referred to as the first field whereas a posterior field is referred to as the second field. Also note that, out of the two frames of the 60P signal, an anterior frame is referred to as the first frame whereas a posterior frame is refereed to as the second frame.

The video recording command information is controlled in the following manner. When the pulldown sequence information is 0 or 1, only the first frame is to be recorded. When the pulldown sequence information is 2 or 3, only the second frame is to be recorded. When the pulldown sequence information is 4, neither of the two frames is to be recorded. Through such control over the video signal, only the frames out of the 60P signal indicated to be recorded according to the video recording command information are extracted as the effective-frame signal. This signal is processed as the to-be-recorded video data and is then recorded. Meanwhile, regarding the audio signal, the audio record command information is controlled in such a manner that audio is recorded all the time while the recording operation is being performed. Thus, the audio signal is recorded without being deleted.

FIG. 10 is a diagram showing the video and audio data recorded according to the native recording method. As shown, when the data is recorded according to the native recording method, the recorded video data is reduces as compared with the cases shown in FIGS. 6 and 8. In other words, it can be understood that the recording capacity is saved. Moreover, when the native recording method is employed, the video signal and the audio signal cannot be synchronized simply by starting the reproduction of the recorded video data and the recorded audio data at the same timing. To be more specific, the to-be-recorded video data is shorter, meaning that the reproduction would be completed earlier.

Against this backdrop, there are methods for synchronizing the video signal and the audio signal of the material recorded as shown in FIG. 10. With reference to FIGS. 11 to 14, these methods are explained as follows.

FIG. 11 is a diagram showing a method for reproducing the 60P video through pulldown conversion. As shown, when the recorded video data of the 60P video is to be reproduced according to this method employing the pulldown conversion, the first frame of the recorded video is converted to the first and second frames of the 60P video for reproduction, and the second frame of the recorded video is converted to the third, fourth, and fifth frames of the 60P video for reproduction. By continuing the reproduction in the same manner after this, the video and audio are reproduced in synchronization with each other.

FIG. 12 is a diagram of showing a method for reproducing the 24P video through frame rate conversion. As shown, when the 24P video is to be reproduced according to this method employing the frame rate conversion, a reproduction period of time per frame of the recorded video data is increased so that the video and audio are reproduced in synchronization with each other.

FIG. 13 is a diagram showing a method for reproducing the 60I video through pulldown conversion. As shown, when the recorded video data of the 60I video is to be reproduced according to this method employing the pulldown conversion, the first frame of the recorded video is converted to the first and second fields of the first frame of the 60I video for reproduction, and the second frame of the recorded video is converted to the first and second fields of the second frame and the first field of the third frame of the 60I video for reproduction. Also, the third frame of the recorded video is converted to the second field of the third frame and the first field of the fourth frame of the 60I video for reproduction. Moreover, the fourth frame of the recorded video is converted to the second field of the fourth frame and the first and second fields of the fifth frame of the 60I video for reproduction. By continuing the reproduction in the same manner after this, the video and audio are reproduced in synchronization with each other.

FIG. 14 is a diagram showing a method for reproducing 24PsF video through frame rate conversion. As shown, a 24PsF signal is a video signal of the 24PsF video and is generated by interlacing the 24P signal. According to this method for reproducing the 24PsF video through the frame rate conversion, the video and audio are reproduced in synchronization with each other as in the case shown in FIG. 12.

FIG. 15 is a diagram showing the native recording method for the 60I signal. Video recording command information shown in this diagram is used for control to record or not to record the 60I input signal, in accordance with the pulldown sequence information detected by the pulldown sequence detection unit as shown in FIG. 4. Here, the pulldown sequence detection unit detects the pulldown sequence information using the same way employed in the case of the native recording method for the 60P signal.

As shown in FIG. 15, the pulldown sequence information is represented by a numeric value from 0 to 4, and one set of pulldown sequence information is allocated to one frame, i.e., two fields, of the 60I signal. It should be noted that a frame assigned 0 as the pulldown sequence information is referred to as the "top" of the sequence. The video recording command information is controlled in the following manner. When the pulldown sequence information is 0, 1, or 3, both the first and second fields are to be recorded. When the pulldown sequence information is 2, only the second field is to be recorded. When the pulldown sequence information is 4, only the first field is to be recorded.

The processing of extracting the effective-frame signal is performed as follows. When a recording command is given according to the video recording command information so as to record from the first field, the first and second fields of the currently being received 60I signal are extracted as the effective-frame signal. When a recording command is given according to the video recording command information so as to record from the second field, the second field of the currently being received 60I signal and the first field of a next-to-be received 60I signal are extracted as the effective-frame signal.

Through such control over the video signal, only the fields out of the 60I signal indicated to be recorded according to the video recording command information are extracted as the effective-frame signal. This signal is processed as the to-be-recorded video data and is then recorded. Meanwhile, regarding the audio signal, the audio record command information is controlled in such a manner that audio is recorded all the time while the recording operation is performed. Thus, the audio signal is recorded without being deleted. Accordingly, the recorded data is the same to-be-recorded video and audio data in the case of using the native recording method employed for the 60P signal shown in FIG. 10.

In this way, under the right conditions, such as when the input signal is stable and the input signal is received continuously without being switched, the video signal and the audio signal can be synchronized for reproduction according to the above-described method.

However, when the input signal is received discontinuously, such as when the input signal is disturbed or switched, a time lag occurs between the video signal and the audio signal in the case where the recording capacity is to be saved. For this reason, there is a problem that the video signal and the audio signal cannot be synchronized for reproduction according to the above-described method.

For example, when the input signal is the 60P or 60I signal as described above, the input signal is not always continuous. Also, the 60P or 60I signal which has not been pulldown-converted may be received. Moreover, there may be a possibility that the input signal is disturbed due to the reasons such as when the power of a reproduction-side equipment is turned off and on during a recording operation executed for the purpose of making a copy, when a connection cable is removed and inserted, or when noise occurs to the connection cable.

SUMMARY OF THE INVENTION

The present invention is conceived in view of the stated problem, and an object of the present invention is to provide a recording apparatus which can synchronize a video signal and an audio signal for reproduction even when the input signal is received discontinuously because of a disturbance or switching.

In order to achieve the aforementioned object, the recording apparatus according to the present invention is a recording apparatus which records an input video signal and an input audio signal, the apparatus including: an input unit which receives the video signal and the audio signal, a mode of the video signal being a second mode having been pulldown-converted from a first mode; a control unit which detects a discontinuity of a pulldown sequence of the input video signal; a recording command information generation unit which generates: video recording command information which indicates whether or not to record the video signal of the second mode as the video signal of the first mode; and audio recording command information which indicates whether or not to record the audio signal; and a recording unit which provides to-be-recorded video data and to-be-recorded audio data based on the video signal and the audio signal indicated to be recorded respectively according to the generated video recording command information and the generated audio recording command information, wherein the control unit determines a state of recording as a non-record state, where the video signal and the audio signal are not to be recorded, for a predetermined period of time following the discontinuity detection of the pulldown sequence, so that, by suspending the recording of the video signal, the pulldown sequence of the recorded video signal becomes continuous, and the recording command information generation unit generates the video recording command information and the audio recording command information according to the determined state of recording.

With this, while the pulldown sequence is discontinuous, the state of recording is determined as the non-record state where the video signal and the audio signal are not to be recorded, so that the pulldown sequence of the video signal becomes continuous. Then, the to-be-recorded video and audio data is provided so that the video signal and the audio signal are synchronized. In this way, when the input signal is received discontinuously because the input signal is disturbed or switched, the to-be-recorded video and audio data is provided in such a manner that the pulldown sequence of the video signal becomes continuous and that the video signal and the audio signal are synchronized for reproduction.

It should be noted here that, in Claims of the present specification, the video signal in the "first mode" refers to a 24P signal for example whereas the video signal in the "second mode" refers to a 60P or 60I signal for example.

Here, an explanation is given as to the time lag which occurs between the video signal and the audio signal in the case where the recording capacity is to be saved and where the input signal is received discontinuously, such as where the input signal is disturbed or switched. When the input signal is discontinuous, this means that the pulldown sequence of the input video signal is discontinuous.

FIG. 16 is a diagram showing an example of recording where the pulldown sequence changes. As shown, the pulldown sequence becomes discontinuous from a switching point 101. Here, a post-switching input video 102 is taken as an example of the 60P signal after the switching point 101. It can be seen that audio received at the same timing as the post-switching input video 102 is a post-switching input audio 103.

FIG. 17 is a diagram showing an example of the video and audio data recorded when the pulldown sequence changes. FIG. 18 is a diagram showing an example of a case where this material is reproduced through pulldown conversion.

As shown in FIG. 18, when the video data recorded according to the native recording method is to be pulldown-converted, the conversion is performed continuously as shown in FIGS. 11 and 13. Thus, the fourth frame of the recorded video which is immediately before the switching point 101 is converted to the eighth, ninth, and tenth frames of the reproduced video. Also, the fifth frame of the recorded video which is immediately after the switching point 101 is converted to the eleventh and twelfth frames of the reproduced video. This is to say, because the pulldown sequence becomes discontinuous before and after the switching point 101, the number of frames is increased by two as compared with the case where the pulldown sequence is continuous. For this reason, it can be understood that the post-switching input video 102 is provided two frames later than the post-switching input audio 103.

FIG. 19 is a diagram showing an example of reproduction performed through frame rate conversion. As can be seen in this diagram, the post-switching input video 102 is provided two frames later than the post-switching input audio 103 as is the case with FIG. 18. Although the explanation has been given only as to the 60P signal, note that the same holds true for the 60I signal.

As described, due to the discontinuity of the pulldown sequence before and after the switching point, the time lag occurs between the video signal and the audio signal. Therefore, by making the pulldown sequence continuous, the video signal and the audio signal can be synchronized for reproduction.

Also, preferably, the control unit may include: a pulldown sequence detection unit which detects the pulldown sequence of the input video signal; a sequence state control unit which, when information representing the detected pulldown sequence changes from a first pulldown sequence to a second pulldown sequence, detects the change as the discontinuity; and a sequence processing process control unit which determines the state of recording as to whether or not to record the video signal and the audio signal, wherein the sequence processing process control unit determines, when the sequence state control unit detects the discontinuity, the state of recording of a first period as a record state where the video signal and the audio signal are to be recorded in accordance with the first pulldown sequence, the first period starting from the discontinuity detection until the first pulldown sequence becomes a predetermined value; determines the state of recording of a second period after a lapse of the first period, as the non-record state where the video signal and the audio signal are not to be recorded, the second period lasting until the second pulldown sequence becomes the predetermined value; and determines the state of recording, after a lapse of the second period, as the record state where the video signal and the audio signal are to be recorded in accordance with the second pulldown sequence. Alternatively, the control unit may include: a pulldown sequence detection unit which detects the pulldown sequence of the input video signal; a record sequence generation unit which generates a first pulldown sequence which is information representing the pulldown sequence of the video signal currently being recorded; a warning detection unit which, when a second pulldown sequence which is information representing the pulldown sequence of the video signal detected by the pulldown sequence detection unit disagrees with the first pulldown sequence, detects the disagreement as the discontinuity; and a recording start-stop control unit which determines the state of recording as to whether or not to record the video signal and the audio signal, the recording start-stop control unit: determines, when the warning detection unit detects the discontinuity, the state of recording of a first period as a record state where the video signal and the audio signal are to be recorded in accordance with the first pulldown sequence, the first period starting from the discontinuity detection until the first pulldown sequence becomes a predetermined value; determines the state of recording of a second period after a lapse of the first period as the non-record state where the video signal and the audio signal are not to be recorded, the second period lasting until the second pulldown sequence becomes the predetermined value; and determines the state of recording, after a lapse of the second period, as the record state where the video signal and the audio signal are to be recorded in accordance with the second pulldown sequence.

With this, in order to make the pulldown sequence continuous: the state of recording of the first period which lasts until the first pulldown sequence becomes the predetermined value is determined as the record state; the state of recording of the second period which lasts until the second pulldown sequence becomes the predetermined value is determined as the non-record state; and the state of recording after a lapse of the second period is determined as the record state. For example, when the information showing the pulldown sequence is represented by a value from 0 to 4 which make one cycle: the record state lasts until the first pulldown sequence becomes 4; the non-record state lasts until the second pulldown sequence becomes 4; and the record state lasts after the second pulldown sequence becomes 0. In this way, after the first pulldown sequence finishes a cycle, the second pulldown sequence starts a next cycle. Accordingly, even when the input signal is received discontinuously because the input signal is disturbed or switched, the to-be-recorded video and audio data is provided in such a manner that the pulldown sequence of the video signal becomes continuous. Therefore, the video signal and the audio signal can be synchronized for reproduction. It should be noted here that since the data to be provided can be separated into two: the first period; and the second period and afterward, it is useful in a case where a file needs to be divided into two.

Moreover, preferably, the control unit may further include an input disturbance detection unit which detects a disturbance of the input video signal, the sequence processing process control unit may further determines the state of recording of a period during which the disturbance is being detected, as the record state where the video signal and the audio signal are to be recorded in accordance with the first pulldown sequence which is the information representing the pulldown sequence of the video signal detected before the disturbance detection, and the sequence state control unit may, when the information representing the pulldown sequence changes from the first pulldown sequence to the second pulldown sequence after the disturbance is no more detected, detect the change as the discontinuity.

With this, even when the pulldown sequence cannot be detected while the input signal is being disturbed, the record state can be maintained.

Furthermore, preferably, the control unit may further include an input disturbance detection unit which detects a disturbance of the input video signal, the sequence state control unit may, when the disturbance is detected, judge that the first pulldown sequence changes to the second pulldown sequence and detect the change as the discontinuity, the sequence processing process control unit may: when the discontinuity is detected, determine the state of recording of the first period as the record state where the video signal and the audio signal are to be recorded in accordance with the first pulldown sequence; determine the state of recording of the second period after a lapse of the first period as the non-record state where the video signal and the audio signal are not to be recorded, the second period lasting until the disturbance is no more detected and the second pulldown sequence becomes the predetermined value; and determine the state of recording, after a lapse of the second period, as the record state where the video signal and the audio signal are to be recorded in accordance with the second pulldown sequence. Alternatively, the control unit may further include an input disturbance detection unit which detects a disturbance of the input video signal, the warning detection unit may, when the disturbance is detected, judge that the first pulldown sequence changes to the second pulldown sequence and detect the change as the discontinuity, the recording start-stop control unit may: when the discontinuity is detected, determine the state of recording of the first period as the record state where the video signal and the audio signal are to be recorded in accordance with the first pulldown sequence; determine the state of recording of the second period after a lapse of the first period as the non-record state where the video signal and the audio signal are not to be recorded, the second period lasting until the disturbance is no more detected and the second pulldown sequence becomes the predetermined value; and determine the state of recording, after a lapse of the second period, as the record state where the video signal and the audio signal are to be recorded in accordance with the second pulldown sequence.

With this, the non-record state of the second period does not allow the recording to be performed during a period in which the input signal is being disturbed.

Also, preferably, the control unit may: when information representing the pulldown sequence of the input video signal changes from a first pulldown sequence to a second pulldown sequence, detect the change as the discontinuity; determine the state of recording as the non-record state where the video signal and the audio signal are not to be recorded for the predetermined period of time, during which the recording of the video signal is suspended following the discontinuity detection and after a lapse of which the recording of the video signal is resumed, so that the first pulldown sequence becomes continuous to the second pulldown sequence; and determine the state of recording, after the lapse of the predetermined period of time, as the record state where the video signal and the audio signal are to be recorded in accordance with the second pulldown sequence.

With this, in order to make the pulldown sequence continuous, the state of recording is determined as the non-record state during the predetermined period of time immediately after the discontinuity of the pulldown sequence is detected. For example, suppose here that the information showing the pulldown sequence is represented by a value from 0 to 4 which make one cycle. When the discontinuity is detected at the instant when the first pulldown sequence becomes 3, the state of recording is determined as the non-record state until the second pulldown sequence becomes 3 and, after the second pulldown sequence becomes 4, the state of recording is determined as the record state. In this way, a cycle of the second pulldown sequence is started as a follow-up to the first pulldown sequence ended midway. Accordingly, even when the input signal is received discontinuously because the input signal is disturbed or switched, the to-be-recorded video and audio data is provided in such a manner that the pulldown sequence of the video signal becomes continuous. Therefore, the video signal and the audio signal can be synchronized for reproduction. It should be noted in this case here that since the data to be provided cannot be separated into two, it is useful in a case where one file is generated without splitting.

It should be noted here that the present invention may be realized not only as such a recording apparatus, but also as: a method that has steps corresponding to the processes performed by the characteristic processing units included in the recording apparatus; a program that causes a computer to execute these processes performed by the processing units; and an integrated circuit that executes the processes performed by the processing units. Also, it should be obvious that such a program can be distributed via a recording medium such as a CD-ROM, or via a transmission medium such as the Internet.

Using the recording apparatus of the present invention, even when the input signal is received discontinuously because the input signal is disturbed or switched, the video signal and the audio signal can be synchronized for reproduction.

FURTHER INFORMATION ABOUT TECHNICAL BACKGROUND TO THIS APPLICATION

The disclosure of Japanese Patent Application No. 2008-006605 filed on Jan. 16, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 32 is a diagram showing an example of the video and audio data recorded as shown in FIG. 31, according to the first embodiment.

FIG. 44 is a diagram showing an example of the video and audio data recorded when the pulldown sequence changes, according to the second embodiment.

FIG. 54 is a diagram showing a concrete example of the recording apparatus according to the present invention.

DESCRIPTION OF THE PREFERRED EMBODIMENTS

The following is a description of preferred embodiments to carry out the present invention, with reference to the drawings.

First Embodiment

Figure 20:
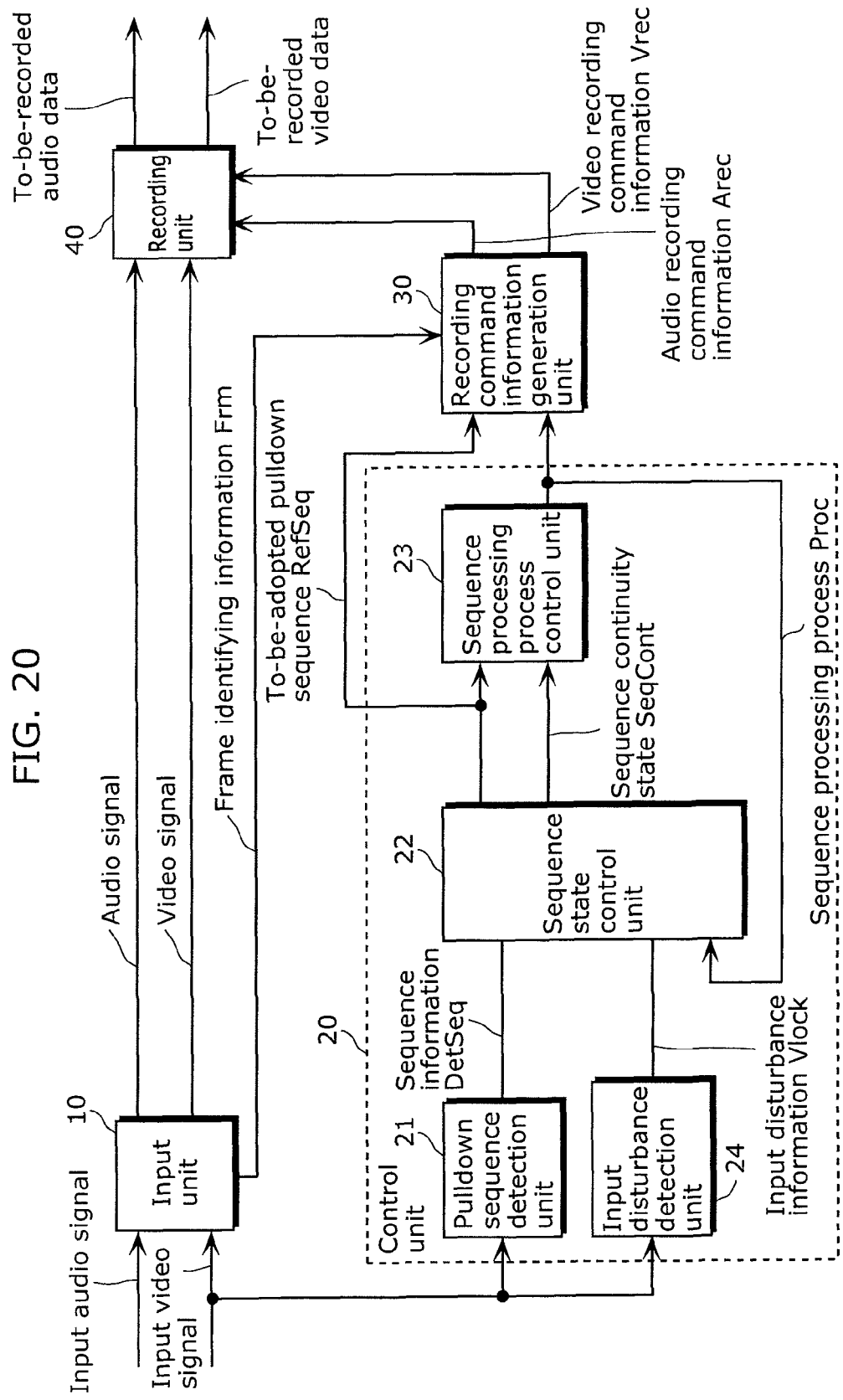
FIG. 20 is a block diagram showing a configuration example of a recording apparatus according to a first embodiment of the present invention.

FIG. 20 is a block diagram showing a configuration example of a recording apparatus according to the first embodiment of the present invention. As shown, the recording apparatus of the first embodiment includes an input unit 10, a control unit 20, a recording command information generation unit 30, and a recording unit 40.

The input unit 10 receives an input video signal and an input audio signal, performs decode processing such as input signal analysis, and then provides the decoded video and audio signals. In this case here, the input video signal is a 60P or 60I signal. The input unit 10 also provides frame identifying information Frm to identify a frame. For example, when the input video signal is a 60P signal, Frm is represented by 1 in the first frame and by 0 in the second frame. When the input video signal is a 60I signal, Frm is represented by 1 in the first field and by 0 in the second field, for example.

The control unit 20 detects a discontinuity of a pulldown sequence of the input video signal. The control unit 20 determines a state of recording as a non-record state, where the video signal and the audio signal are not to be recorded for a predetermined period of time after the discontinuity of the pulldown sequence is detected. By doing so, the pulldown sequence of the recorded video signal becomes continuous after a lapse of the predetermined period of time. The control unit 20 includes a pulldown sequence detection unit 21, a sequence state control unit 22, a sequence processing process control unit 23, and an input disturbance detection unit 24.

The pulldown sequence detection unit 21 detects the pulldown sequence of the input video signal. To be more specific, the pulldown sequence detection unit 21 makes reference to time code information superimposed on the video signal, detects the pulldown sequence of the input video according to a method such as calculating a remainder by dividing a frame digit by 5, and then provides sequence information DetSeq that shows this pulldown sequence.

When the information showing the detected pulldown sequence changes from a first pulldown sequence to a second pulldown sequence, the sequence state control unit 22 detects this change as a discontinuity. In other words, the first pulldown sequence is the sequence information DetSeq that shows the pulldown sequence before the discontinuity occurs whereas the second pulldown sequence is the sequence information DetSeq that shows the pulldown sequence after the discontinuity occurs.

To be more specific, on the basis of the sequence information DetSeq, input disturbance information Vlock, and sequence processing process Proc which is described later, the sequence state control unit 22 provides a to-be-adopted pulldown sequence RefSeq and a sequence continuity state SeqCont. Here, the to-be-adopted RefSeq is the sequence information which is referred to for recording, and the SeqCont is the information showing the state of continuity of the pulldown sequence of the input video. A detailed description will be given later.

The sequence processing process control unit 23 determines the state of recording, as to whether or not to record the video signal and the audio signal. To be more specific, when the sequence state control unit 22 detects the discontinuity, the sequence processing process control unit 23 determines the state of recording as the record state where the video signal and the audio signal are to be recorded in accordance with the first pulldown sequence during a first period which starts from the discontinuity detection until the first pulldown sequence becomes a predetermined value. Then, the sequence processing process control unit 23 determines the state of recording, after a lapse of the first period, as the non-record state where the video signal and the audio signal are not to be recorded during a second period which lasts until the second pulldown sequence becomes the predetermined value. Then, after a lapse of the second period, the sequence processing process control unit 23 determines the state of recording as the record state where the video signal and the audio signal are to be recorded in accordance with the second pulldown sequence.

Here, on the basis of the to-be-adopted pulldown sequence RefSeq and the sequence continuity state SeqCont, the sequence processing process control unit 23 provides the sequence processing process Proc which shows an execution state of the sequence processing process control unit 23. A detailed description will be given later.

The input disturbance detection unit 24 detects a disturbance of the input video signal. To be more specific, the input disturbance detection unit 24 detects a disturbance of synchronization, including horizontal and vertical synchronization, of the video signal, and provides the input disturbance information Vlock.

The recording command information generation unit 30 generates: video recording command information which indicates whether or not to record the video signal in a first mode; and audio recording command information which indicates whether or not to record the audio signal. In this case here, the video signal in the first mode refers to a 24P signal. The recording command information generation unit 30 generates the video recording command information and the audio recording command information in accordance with the state of recording determined by the control unit 20.

To be more specific, on the basis of the frame identifying information Frm, the to-be-adopted pulldown sequence RefSeq, and the sequence processing process Proc, the recording command information generation unit 30 provides: video recording command information Vrec indicating whether or not to record the video signal; and audio recording command information Arec indicating whether or not to record the audio signal. A detailed description will be given later.

The recording unit 40 provides the to-be-recorded video and audio data, on the basis of the video signal and the audio signal indicated to be recorded respectively according to the video recording command information and the audio recording command information generated by the recording command information generation unit 30. More specifically, the recording unit 40 performs signal processing, such as compression processing performed on the video signal and the audio signal, and provides the to-be-recorded video and audio data on the basis of the video recording command information Vrec and the audio recording command information Arec. Although not shown in the diagram, the to-be-recorded video and audio data is recorded in a recording medium. A detailed description will be given later.

Next, the detailed descriptions concerning the processing performed in the present embodiment are given, with reference to the flowcharts. It should be noted here that: the signal processing by the input unit 10 and the recording unit 40 is executed at all times; the processing by the recording command information generation unit 30 is executed every sixtieth of a second, which corresponds to one frame in the case of the 60P signal and to one field in the case of the 60I signal; and the processing by the other processing units is executed every thirtieth of a second, which corresponds to two frames in the case of the 60P signal and to one frame in the case of the 60I signal.

Figure 21:
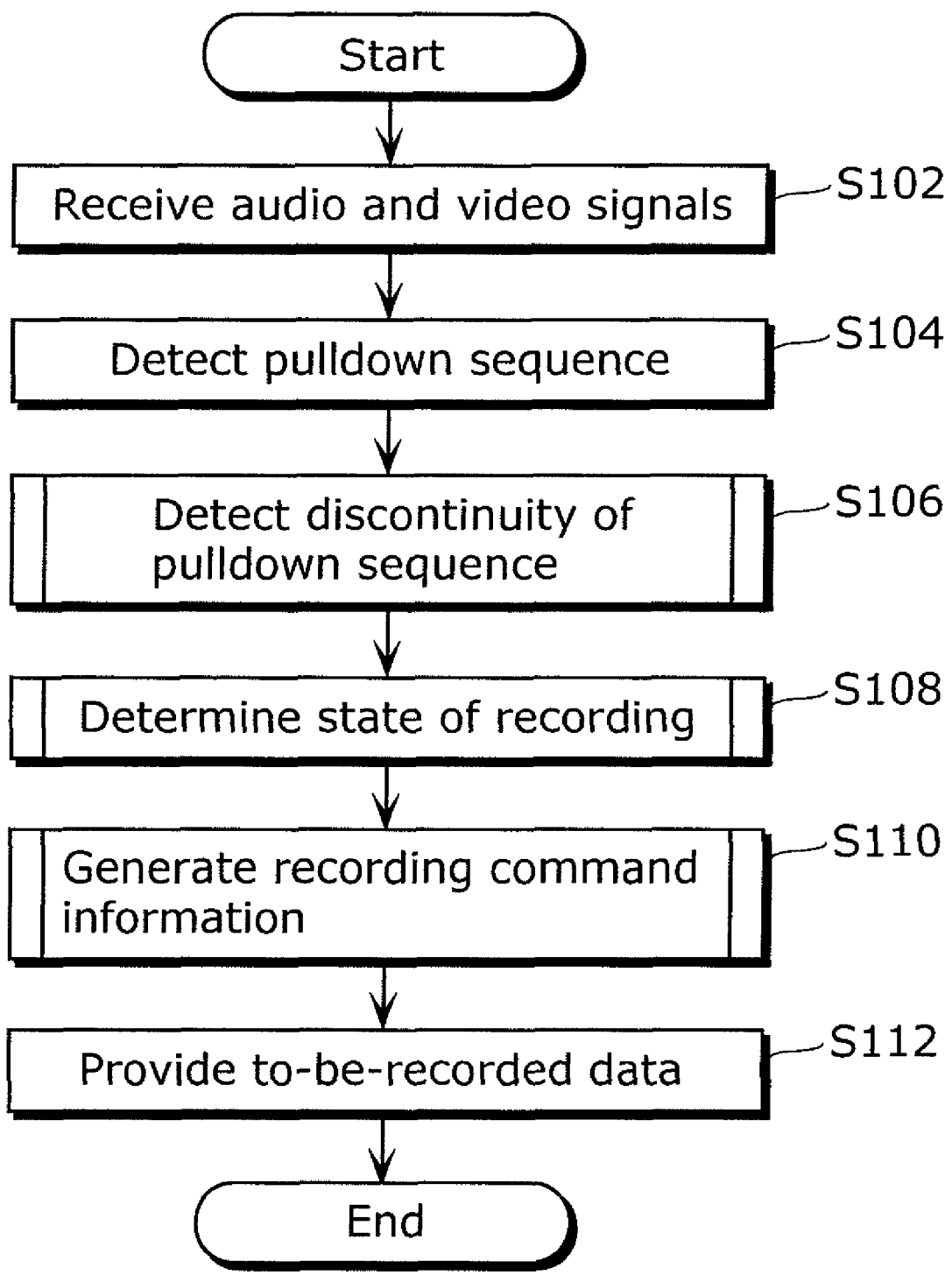
FIG. 21 is a flowchart showing an example of processing performed by the recording apparatus according to the first embodiment.

FIG. 21 is a flowchart showing an example of the processing performed by the recording apparatus according to the present embodiment.

First, the input unit 10 receives the input video signal and the input audio signal (S102).

The pulldown sequence detection unit 21 detects the pulldown sequence of the input video signal (S104).

The sequence state control unit 22 detects a discontinuity of the pulldown sequence (S106). A detailed description of this processing performed by the sequence state control unit 22 will be given later.

Next, the sequence processing process control unit 23 determines the state of recording, as to whether or not to record the video signal and the audio signal (S108). A detailed description of this processing performed by the sequence processing process control unit 23 will be given later.

The recording command information generation unit 30 generates the video recording command information and the audio recording command information (S110). A detailed description of this processing performed by the recording command information generation unit 30 will be given later.

The recording unit 40 provides the to-be-recorded video and audio data, on the basis of the video signal and the audio signal indicated to be recorded respectively according to the video recording command information and the audio recording command information (S112).

Next, the detailed description of the processing performed by the sequence state control unit 22 in step S106 shown in FIG. 21 is given.

Figure 22:
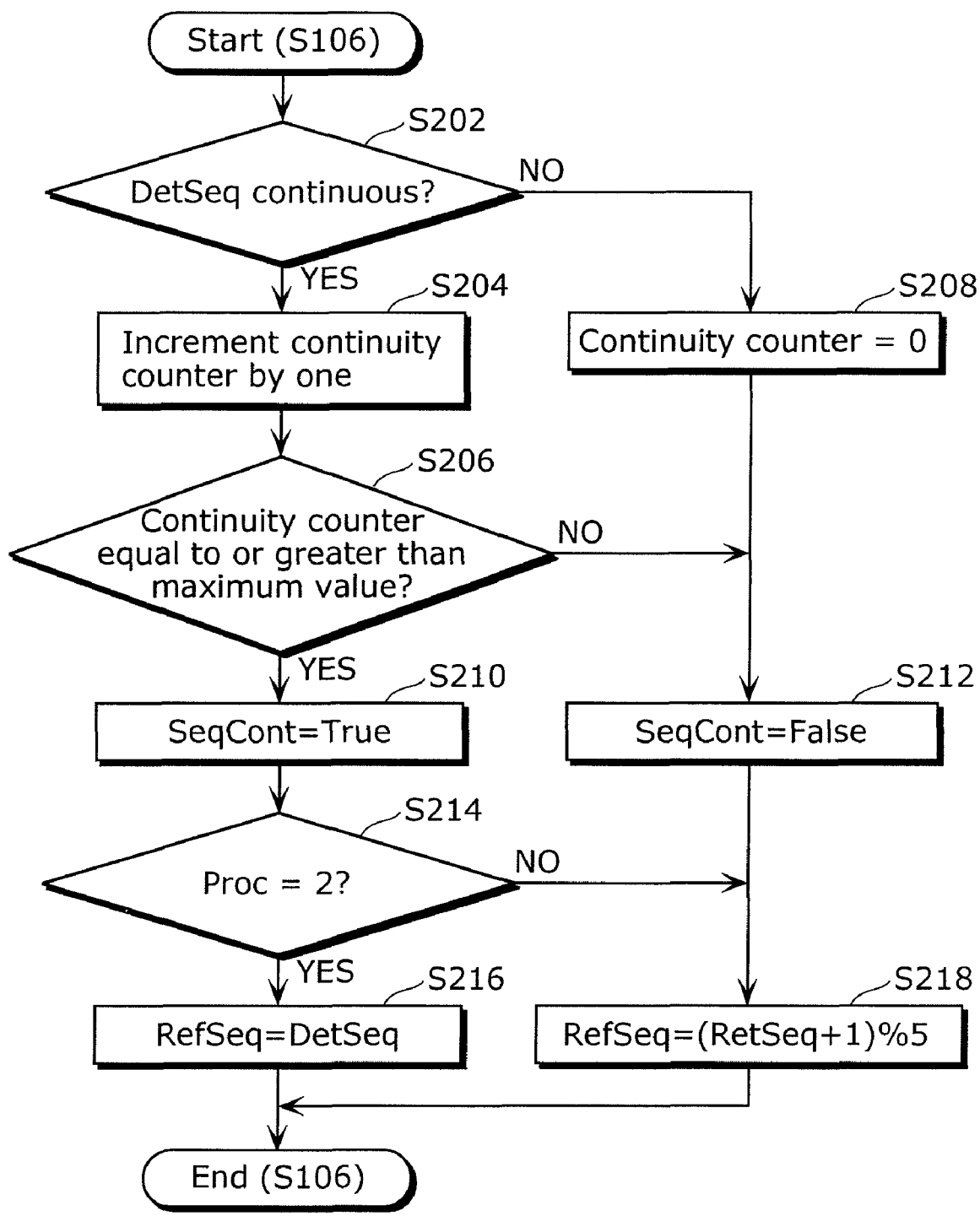
FIG. 22 is a flowchart showing sequence state control processing according to the first embodiment.

FIG. 22 is a flowchart showing the sequence state control processing performed by the sequence state control unit 22.

First, the sequence state control unit 22 judges the continuity of the sequence information DetSeq that shows the pulldown sequence (S202). For example, the sequence state control unit 22 compares the previous DetSeq which has been retrieved and stored (this sequence is referred to as the "OldSeq" hereafter) with the present DetSeq which is currently being retrieved, according to a comparison expression below. The sequence state control unit 22 judges: that the sequence information is continuous when the right-hand side value agrees with the left-hand side value; and that the sequence information is discontinuous when the right-hand side value disagrees with the left-hand side value. Note that the % symbol in the following expression represents the remainder operator, and that Expression 101 shows a remainder when divided by 5.

$$DetSeq=(OldSeq+1)\% 5 \qquad \text{Expression 101}$$

When judging that the sequence information DetSeq is continuous (YES in S202), the sequence state control unit 22 increments a continuity counter (S204).

After this, the sequence state control unit 22 judges whether or not the value of the continuity counter is equal to or greater than a predetermined maximum value (S206). This judgment is made so as to prevent error detection which may be caused, such as when the information is continuous only for a short period of time and becomes discontinuous soon. Here, the maximum value may be determined depending on a type of the input signal and on a use of the recording apparatus. When the maximum value is predetermined as 1, the continuity can be detected with a minimum of delay.

When judging that the value of the continuity counter is equal to or greater than the predetermined maximum value (YES in S206), the sequence state control unit 22 sets the sequence continuity state SeqCont to True which indicates that the sequence is continuous (S210).

When judging that the value of the continuity counter is smaller than the predetermined maximum value (NO in S206), the sequence state control unit 22 sets the sequence continuity state SeqCont to False which indicates that the sequence is discontinuous (S212).

When judging that the sequence information DetSeq is discontinuous (NO in S202), the sequence state control unit 22 clears the continuity counter, which shows how many times the information has been judged to be continuous, to 0 (S208) and sets the sequence continuity state SeqCont to False which indicates that the sequence is discontinuous (S212).

After setting the sequence continuity state SeqCont to True (S210), the sequence state control unit 22 judges whether or not the sequence processing process Proc is 2 (S214).

When judging that the sequence processing process Proc is 2 (YES in S214), the sequence state control unit 22 substitutes the sequence information DetSeq into the to-be-adopted pulldown sequence RefSeq (S216).

When judging that the sequence processing process Proc is not 2 (NO in S214), the sequence state control unit 22 sets the to-be-adopted pulldown sequence RefSeq to a value incremented by 1 from the RefSeq adopted the last time (S218).

When setting the sequence continuity state SeqCont to False (S212), the sequence state control unit 22 also sets the to-be-adopted pulldown sequence RefSeq to the value incremented by 1 from the RefSeq adopted the last time (S218).

In this way, the processing performed by the sequence state control unit 22 in step S106 shown in FIG. 21 is terminated.

Next, the detailed description of the processing performed by the sequence processing process control unit 23 in step S108 shown in FIG. 21 is given.

Figure 23:
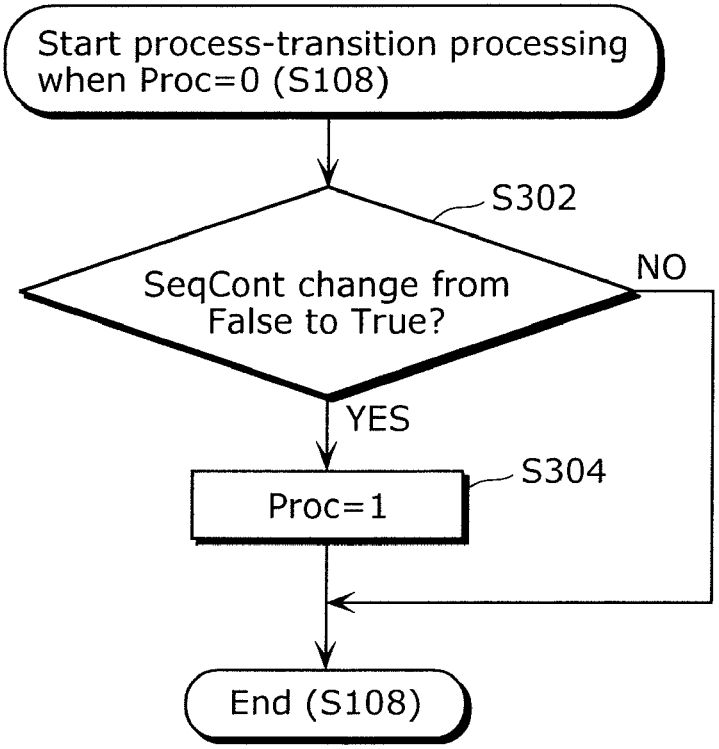
FIG. 23 is a flowchart showing process-transition processing performed when Proc=0 according to the first embodiment.
Figure 24:
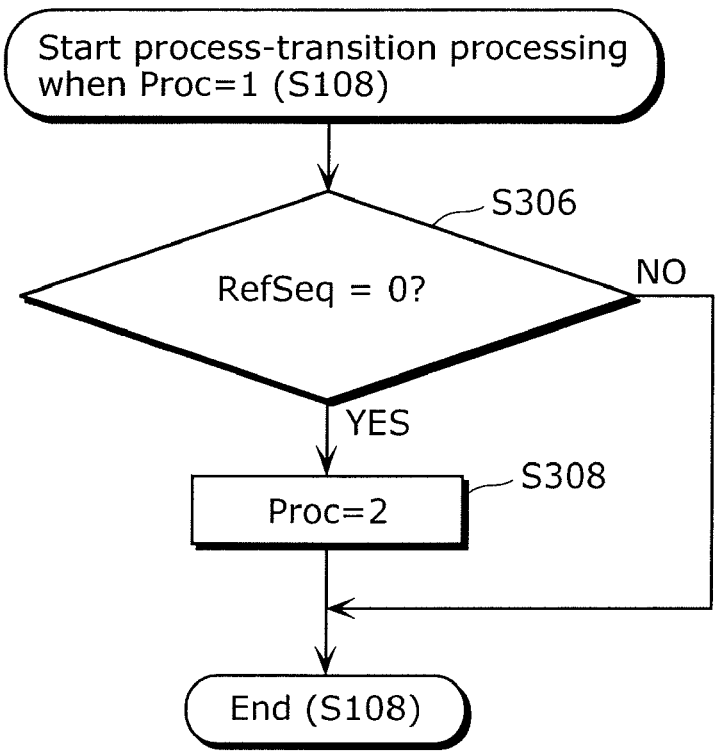
FIG. 24 is a flowchart showing the process-transition processing performed when Proc=1 according to the first embodiment.
Figure 25:
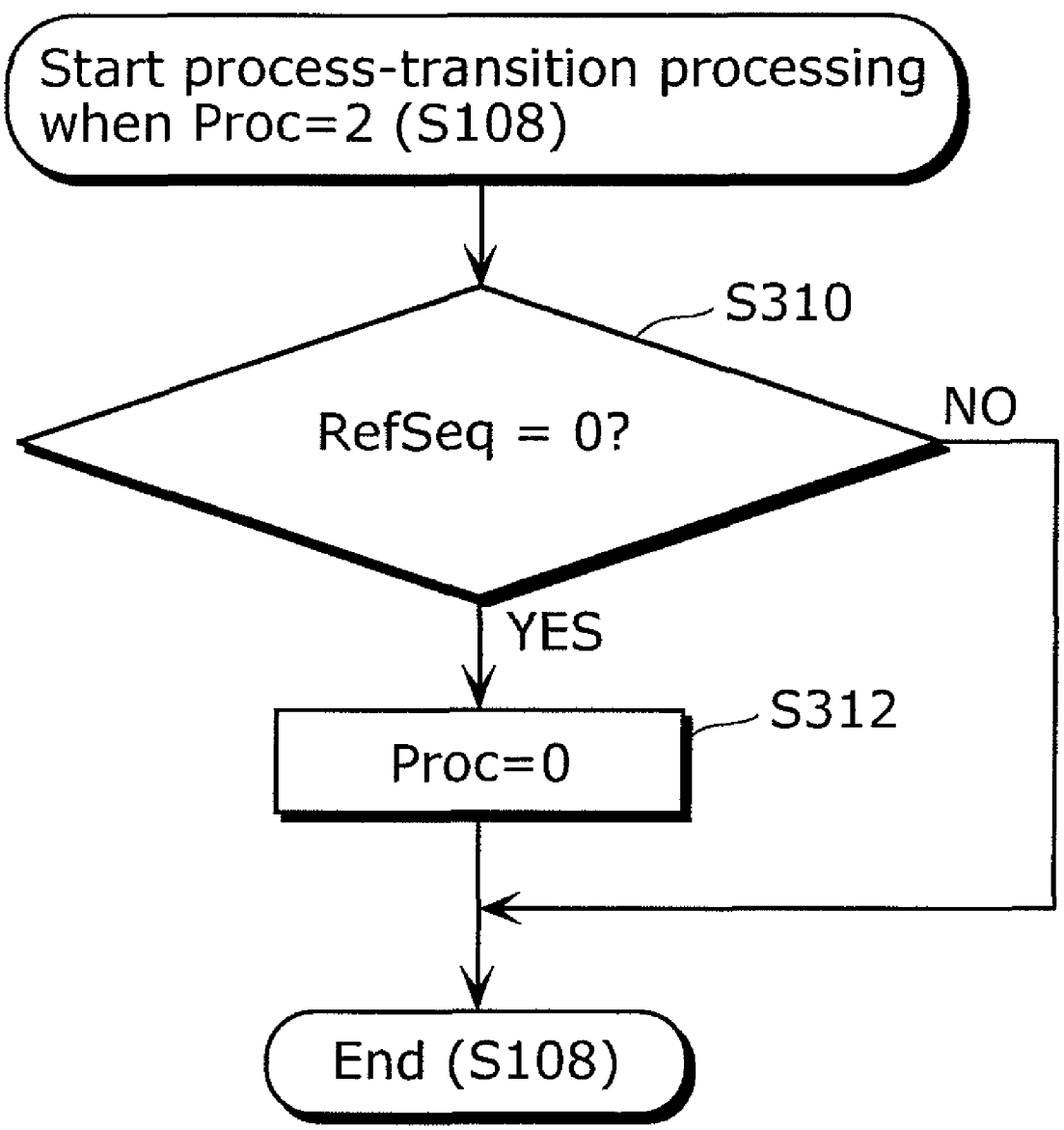
FIG. 25 is a flowchart showing the process-transition processing performed when Proc=2 according to the first embodiment.

FIGS. 23 to 25 are flowcharts showing transition processing performed by the sequence processing process control unit 23 corresponding to the sequence processing process Proc. The sequence processing process Proc takes a value from 0 to 2. It should be noted that the initial value is 0.

FIG. 23 is a flowchart showing process-transition processing performed when the sequence processing process Proc is 0.

First, the sequence processing process control unit 23 judges whether or not the sequence continuity state SeqCont is changed from False to True (S302). This judgment is made in order to verify that the sequence information DetSeq was discontinuous and now becomes continuous again and stable in this state.

When judging that the sequence continuity state SeqCont is changed from False to True (YES in S302), the sequence processing process control unit 23 sets the sequence processing process Proc to 1 (S304) and then terminates the processing.

When judging that the sequence continuity state SeqCont is not changed from False to True (NO in S302), the sequence processing process control unit 23 terminates the processing.

FIG. 24 is a flowchart showing the process-transition processing performed when the sequence processing process Proc is 1.

First, the sequence processing process control unit 23 judges whether or not the to-be-adopted pulldown sequence RefSeq is 0 (S306). This judgment is made in order to locate the top of the sequence during the operation performed when the sequence processing process Proc is 1.

When judging that the to-be-adopted pulldown sequence RefSeq is 0 (YES in S306), the sequence processing process control unit 23 sets the sequence processing process Proc to 2 (S308) and terminates the processing.

When judging that the to-be-adopted pulldown sequence RefSeq is not 0 (NO in S306), the sequence processing process control unit 23 terminates the processing.

FIG. 25 is a flowchart showing the process-transition processing performed when the sequence processing process Proc is 2.

First, the sequence processing process control unit 23 judges whether or not the to-be-adopted pulldown sequence RefSeq is 0 (S310). This judgment is made in order to locate the top of the sequence during the operation performed when the sequence processing process Proc is 2.

When judging that the to-be-adopted pulldown sequence RefSeq is 0 (YES in S310), the sequence processing process control unit 23 sets the sequence processing process Proc to 0 (S312) and terminates the processing.

When judging that the to-be-adopted pulldown sequence RefSeq is not 0 (NO in S310), the sequence processing process control unit 23 terminates the processing.

In this way, the processing performed by the sequence processing process control unit 23 in step S108 shown in FIG. 21 is terminated.

Next, the detailed description of the processing performed by the recording command information generation unit 30 in step S110 shown in FIG. 21 is given.

Figure 26:
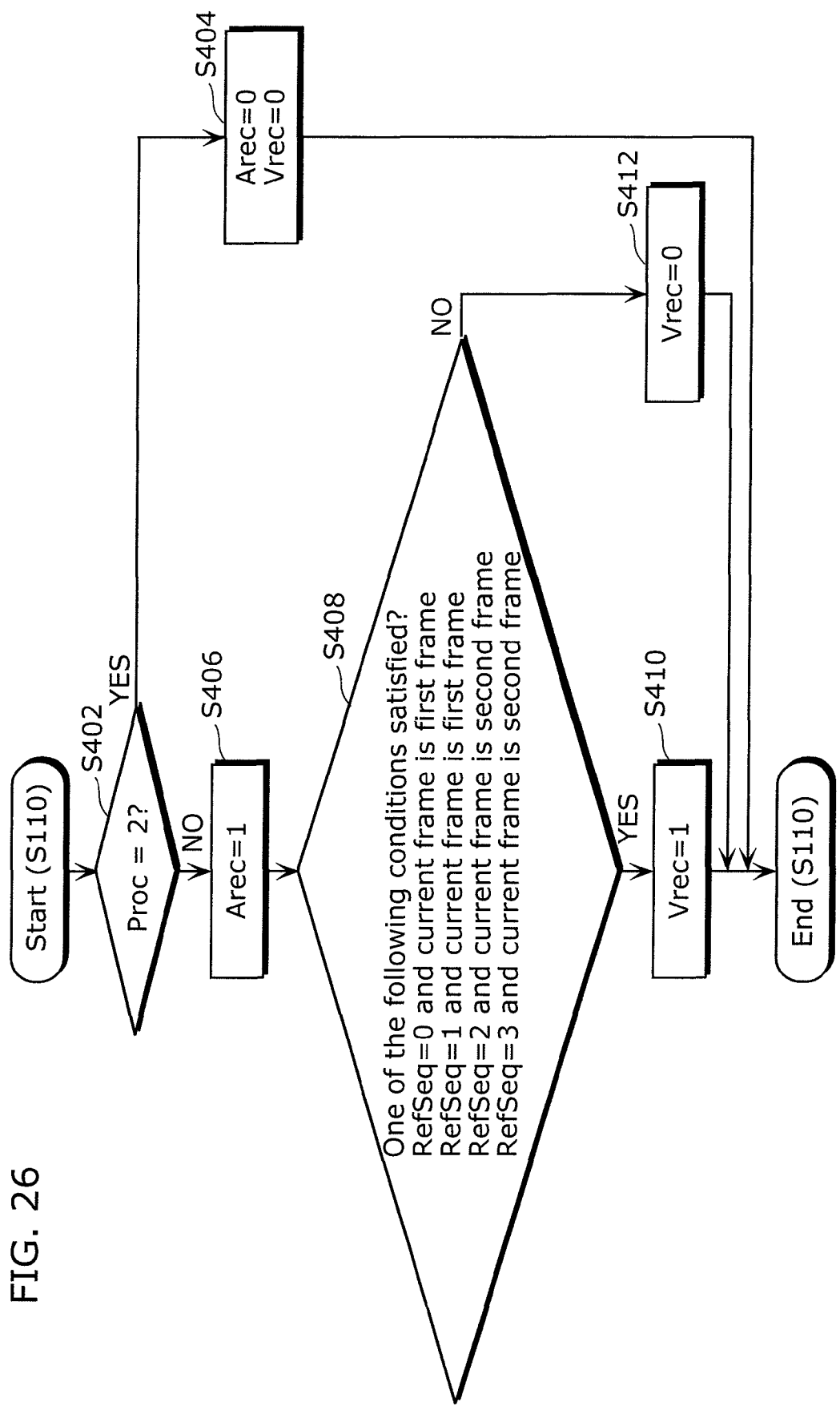
FIG. 26 is a flowchart showing recording command information generation processing according to the first embodiment.

FIG. 26 is a flowchart showing the recording command information generation processing performed in the first embodiment.

First, the recording command information generation unit 30 judges whether or not the sequence processing process Proc is 2 (S402). This judgment is made in order to determine whether or not to record the video signal and the audio signal.

When judging that the sequence processing process Proc is 2 (YES in S402), the recording command information generation unit 30 sets the video recording command information Vrec and the audio recording command information Arec to 0 which indicates that the recording is not to be performed (S404).

When judging that the sequence processing process Proc is not 2 (NO in S402), the recording command information generation unit 30 sets the audio recording command information Arec to 1 which indicates that the recording is to be performed (S406).

After this, the recording command information generation unit 30 judges a setting condition of the video recording command information Vrec (S408). This judgment is made in order to determine whether or not to extract the video signal as the effective frame signal.

To be more specific, when one of the conditions: that the to-be-adopted pulldown sequence RefSeq is 0 and the current frame is the first frame; that the RefSeq is 1 and the current frame is the first frame; that the RefSeq is 2 and the current frame is the second frame; and that the RefSeq is 3 and the current frame is the second frame, is satisfied (YES in S408), the recording command information generation unit 30 sets the video recording command information Vrec to 1 which indicates that the recording is to be performed (S410).

When none of the conditions is satisfied (NO in S408), the recording command information generation unit 30 sets the video recording command information Vrec to 0 which indicates that the recording is not to be performed (S412).

It should be noted here that the above-described conditions are for the case of the 60P signal. In the case of the 60I signal, when one of the conditions: that the to-be-adopted pulldown sequence RefSeq is 0; that the RefSeq is 1; that the RefSeq is 3; that the RefSeq is 2 and the current field is the second field; and that the RefSeq is 4 and the current field is the first field, is satisfied (YES in S408), the recording command information generation unit 30 sets the video recording command information Vrec to 1 which indicates that the recording is to be performed (S410). When none of the conditions is satisfied (NO in S408), the recording command information generation unit 30 sets the video recording command information Vrec to 0 which indicates that the recording is not to be performed (S412).

In this way, the processing performed by the recording command information generation unit 30 in step S110 shown in FIG. 21 is terminated.

Figure 16:
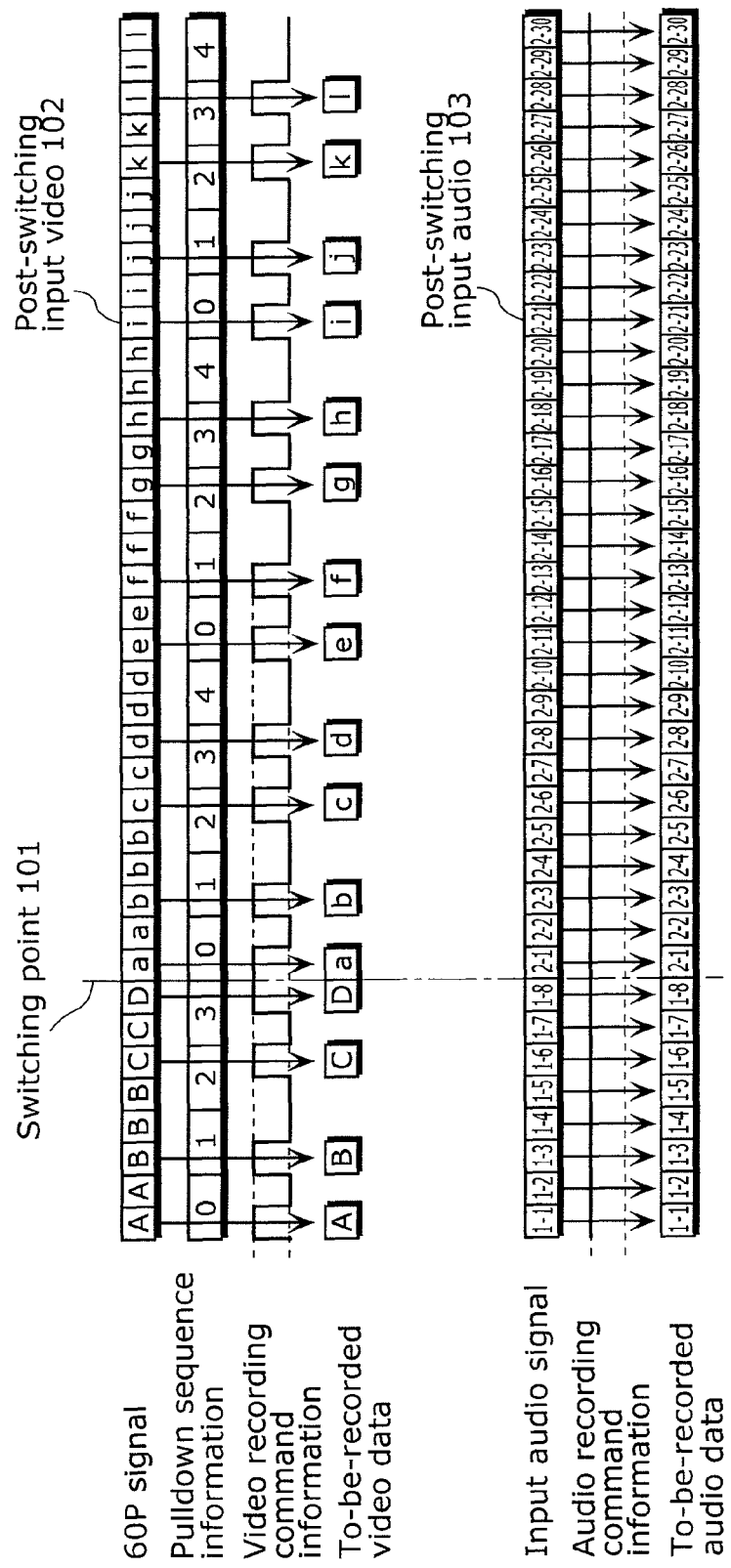
FIG. 16 is a diagram showing an example of recording where the pulldown sequence changes.
Figure 17:
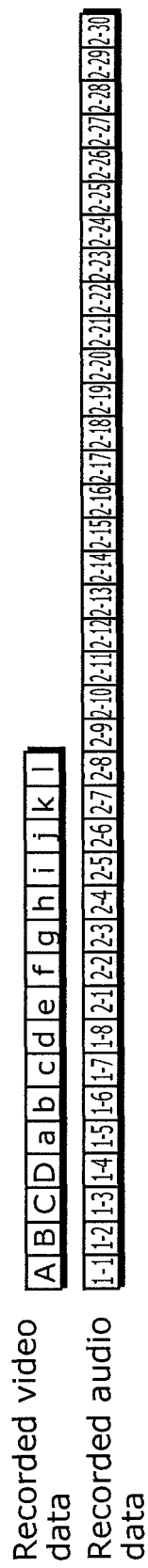
FIG. 17 is a diagram showing an example of the video and audio data recorded when the pulldown sequence changes.
Figure 18:
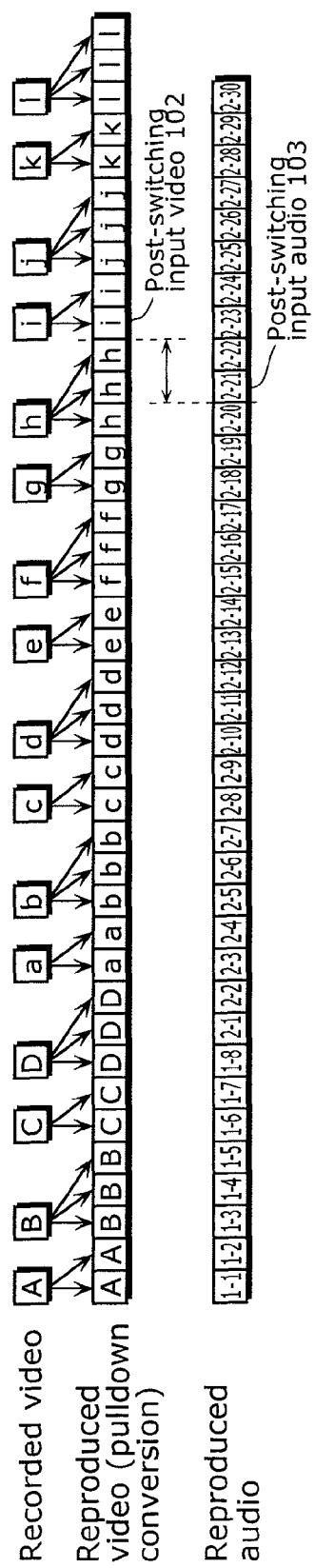
FIG. 18 is a diagram showing an example of a case where the material is reproduced through pulldown conversion when the pulldown sequence changes.
Figure 19:
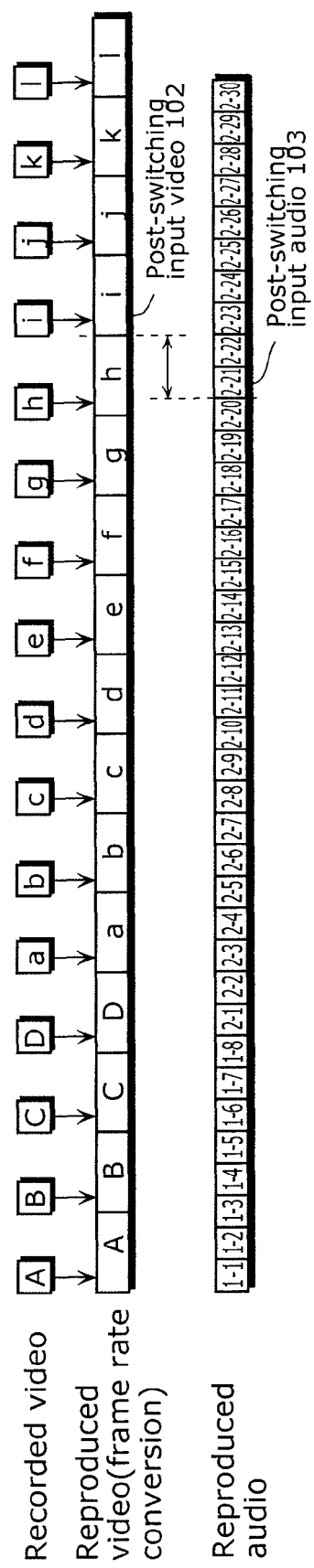
FIG. 19 is a diagram showing an example of a case where the material is reproduced through frame rate conversion when the pulldown sequence changes.
Figure 27:
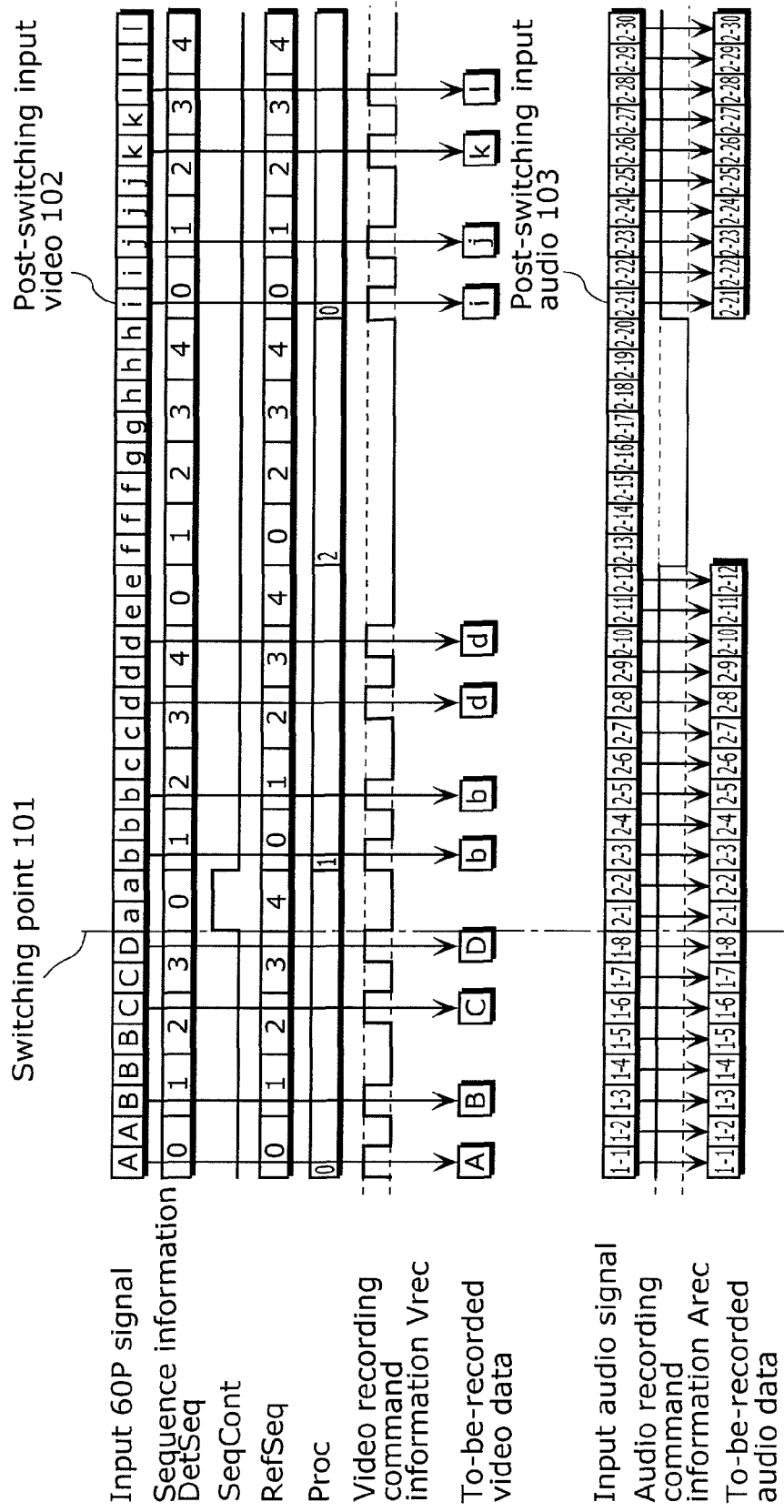
FIG. 27 is a diagram showing an example of recording where a pulldown sequence changes, according to the first embodiment.

FIG. 27 is a diagram showing an example of recording performed in the first embodiment when the pulldown sequence changes under the same condition as shown in FIG. 16. Note that the maximum value of the continuity counter is set at 1 in the sequence state control processing performed by the sequence state control unit 22.

As shown in this diagram, the sequence state control unit 22 judges that the sequence information DetSeq showing the detected pulldown sequence changes from the first pulldown sequence to the second pulldown sequence at a switching point 101, and detects this change as a discontinuity.

Then, the sequence processing process control unit 23 determines the state of recording as the record state where the video signal and the audio signal are to be recorded in accordance with the RefSeq during a first period which starts from the discontinuity detection until the first pulldown sequence becomes a predetermined value. In this case here, the first period refers to a period where Proc=1 and the predetermined value of the RefSeq is 4. Also note here that the RefSeq shows the first pulldown sequence on the assumption that the first pulldown sequence does not change to the second pulldown sequence.

After a lapse of the period where Proc=1, the sequence processing process control unit 23 determines the state of recording as the non-record state where the video signal and the audio signal are not to be recorded, during a second period which lasts until the second pulldown sequence becomes the predetermined value. In this case here, the second period refers to a period where Proc=2 and the predetermine value of the DetSeq is 4. Also note here that, during the period where Proc=2, the RefSeq becomes equal to the sequence information DetSeq.

Moreover, after a lapse of the period where Proc=2, the sequence processing process control unit 23 determines the state of recording as the record state where the video signal and the audio signal are to be recorded in accordance with the sequence information DetSeq. Here, since the RefSeq is equal to the sequence information DetSeq, the sequence processing process control unit 23 determines the state of recording, after a lapse of the period where Proc=2, as the record state where the video signal and the audio signal are to be recorded in accordance with the RefSeq.

In accordance with the state of recording determined by the sequence processing process control unit 23, the recording command information generation unit 30 generates the video recording command information Vrec and the audio recording command information Arec so that the video signal is recorded as the 24P signal.

Then, the recording unit 40 provides the to-be-recorded video and audio data, on the basis of the video signal and the audio signal indicated to be recorded respectively according to the video recording command information Vrec and the audio recording command information Arec.

Figure 1:
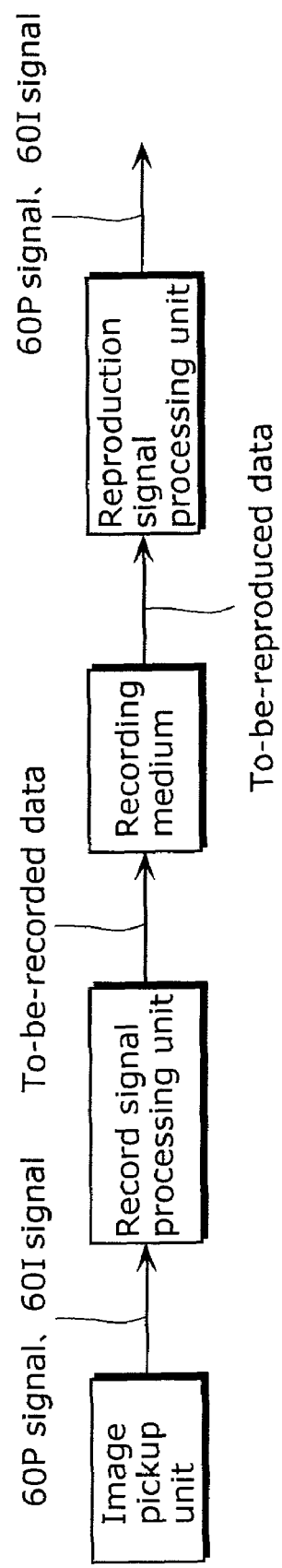
FIG. 1 is a diagram showing a configuration example of a usual video camera.
Figure 2:
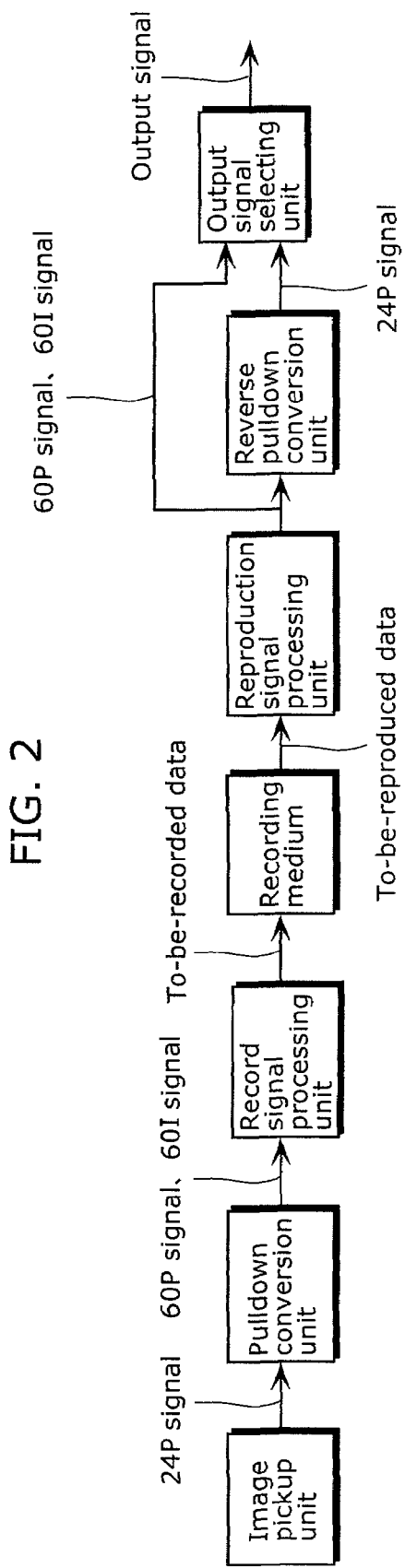
FIG. 2 is a diagram showing a configuration example of digital cinema production equipment that employs a pulldown recording method.
Figure 3:
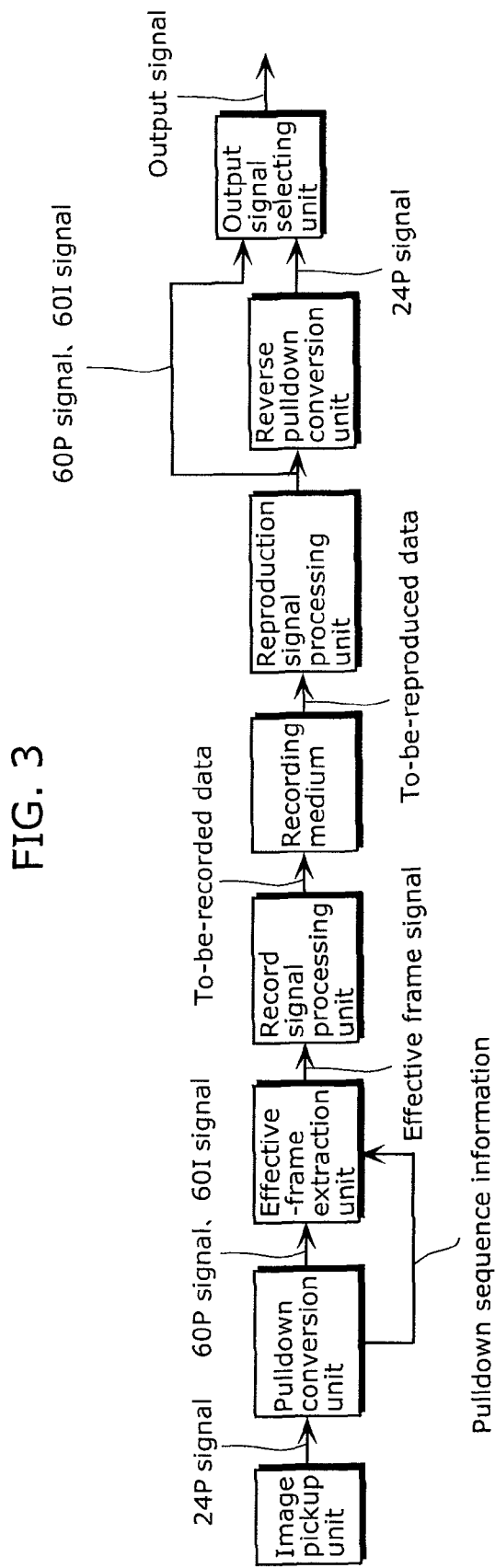
FIG. 3 is a diagram showing a configuration example of digital cinema production equipment that employs a native recording method.
Figure 4:
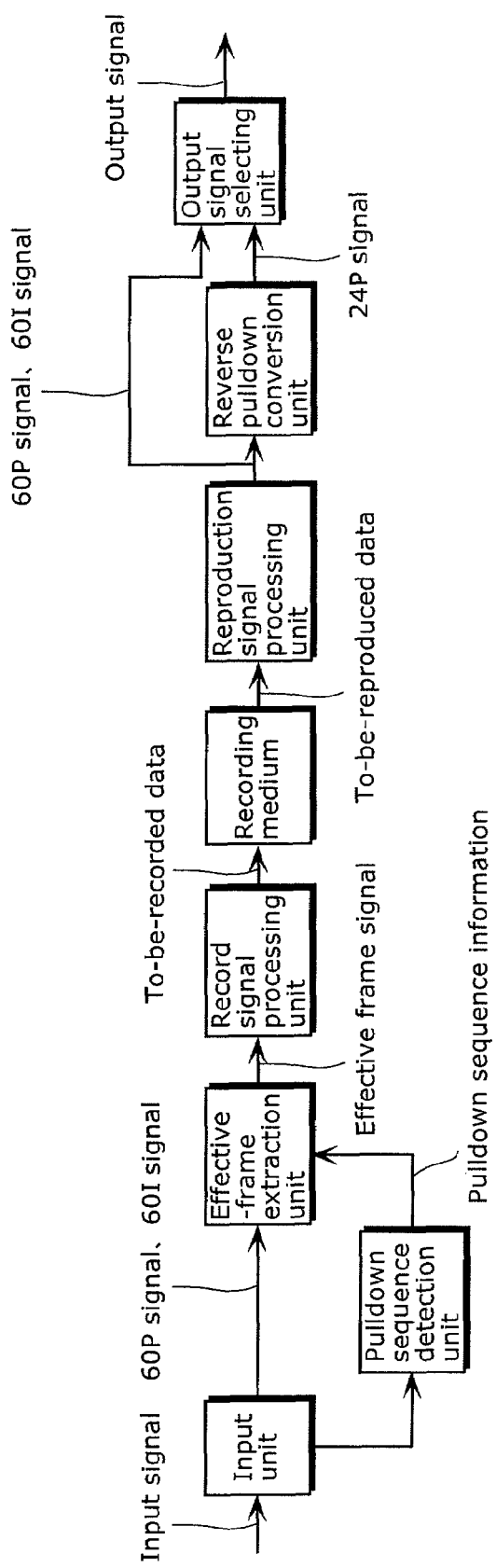
FIG. 4 is a diagram showing a configuration example of digital cinema production equipment which does not have a video capture unit.
Figure 5:
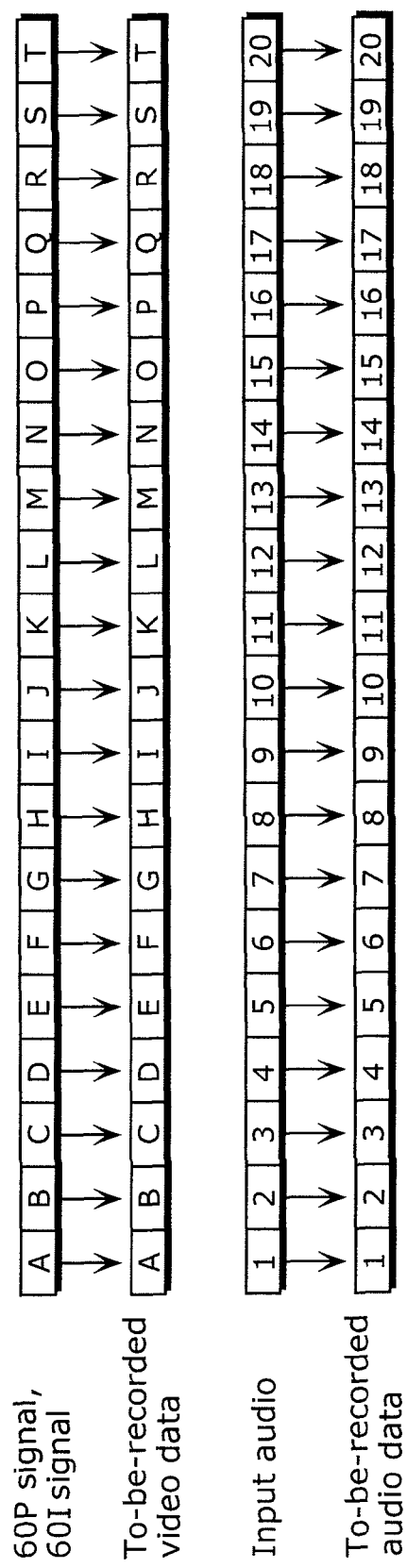
FIG. 5 is a diagram showing a method for recording video and audio using the usual video camera.
Figure 6:
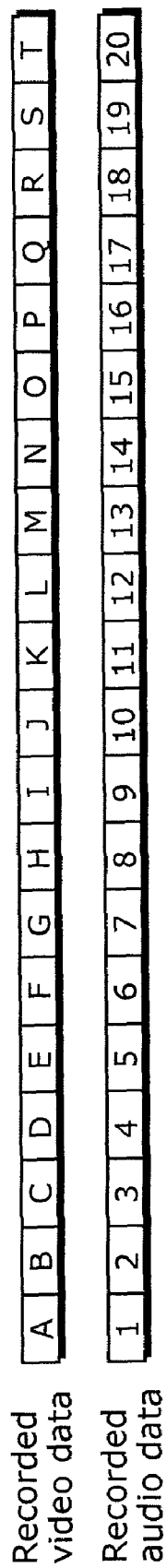
FIG. 6 is a diagram showing video and audio data of material recorded using the usual video camera.
Figure 7:
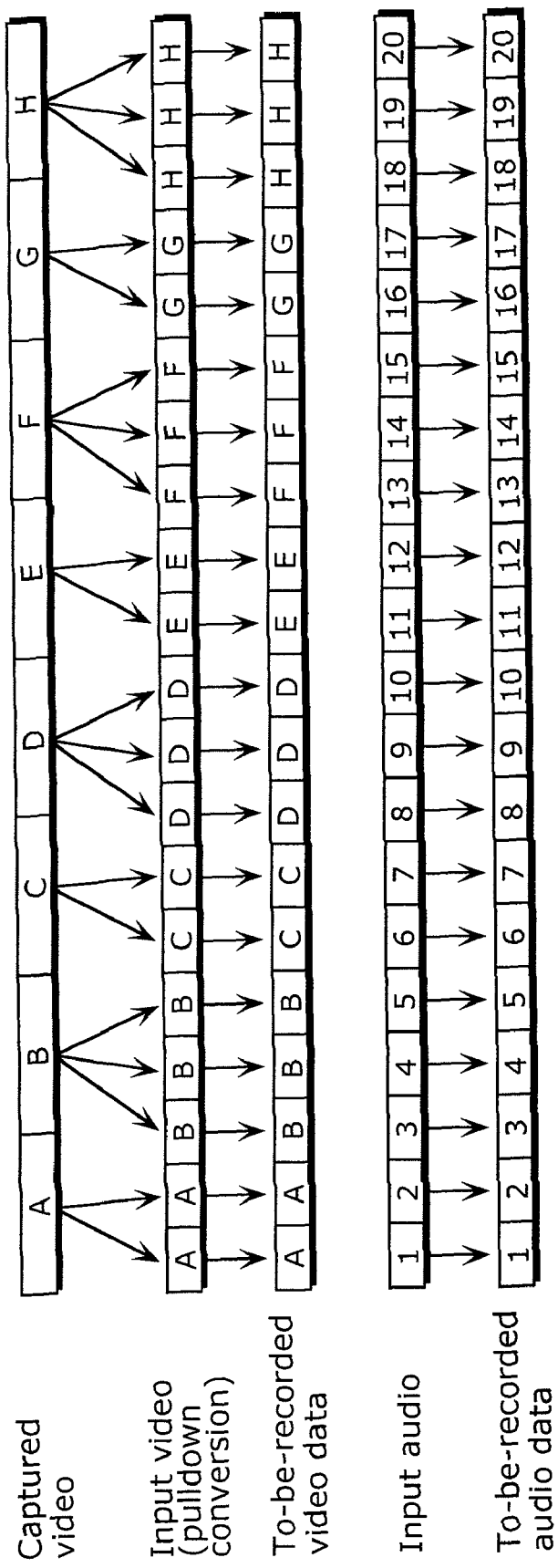
FIG. 7 is a diagram showing a method for recording video and audio according to the pulldown recording method.
Figure 8:
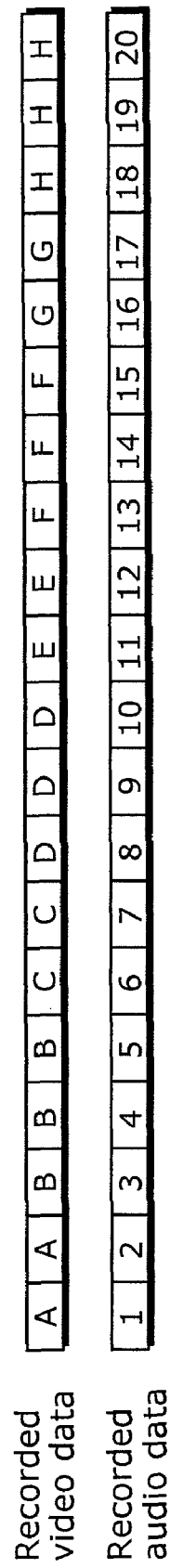
FIG. 8 is a diagram showing the video and audio data recorded according to the pulldown recording method.
Figure 9:
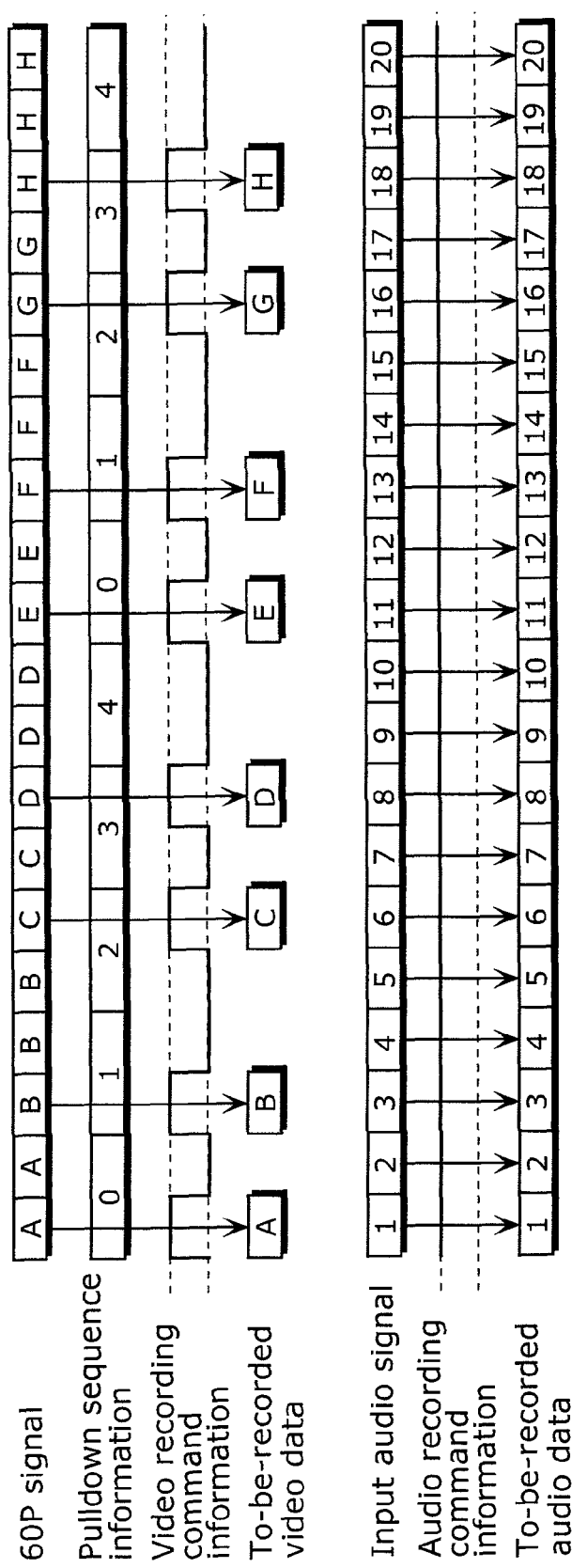
FIG. 9 is a diagram showing the native recording method for the 60P signal.
Figure 10:
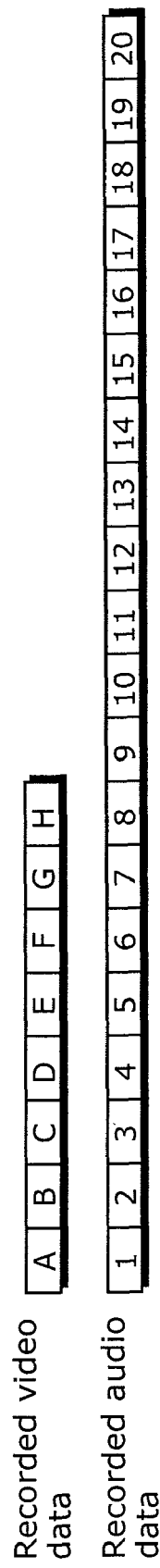
FIG. 10 is a diagram showing the video and audio data recorded according to the native recording method.
Figure 11:
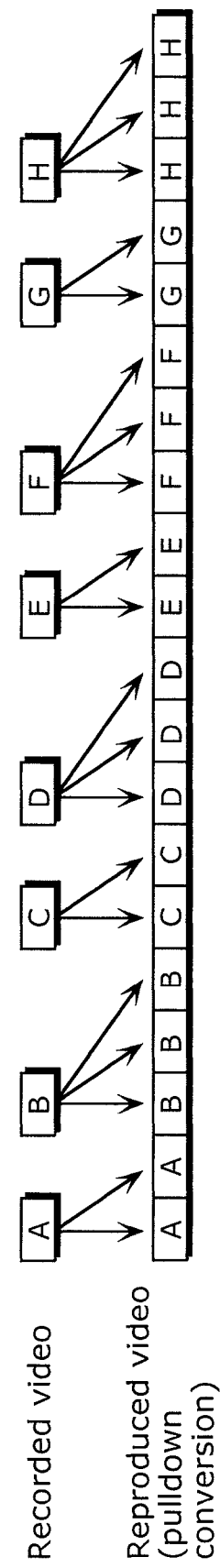
FIG. 11 is a diagram showing a method for reproducing the 60P video through pulldown conversion.
Figure 13:
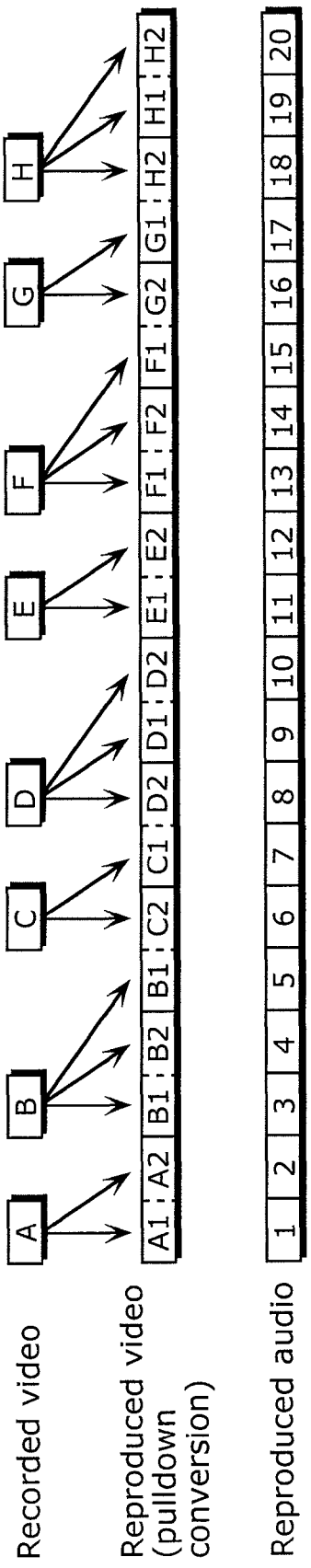
FIG. 13 is a diagram showing a method for reproducing the 60I video through pulldown conversion.
Figure 14:
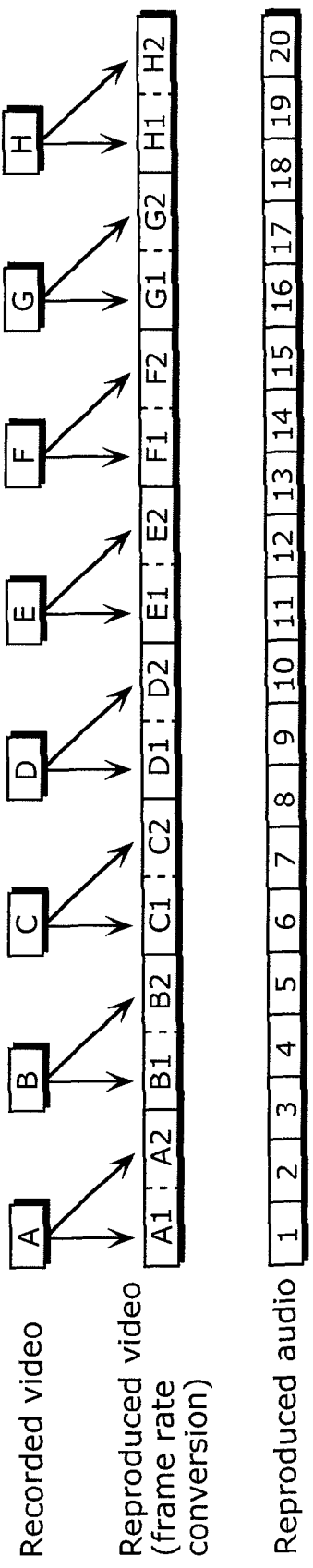
FIG. 14 is a diagram showing a method for reproducing 24PsF video through frame rate conversion.
Figure 15:
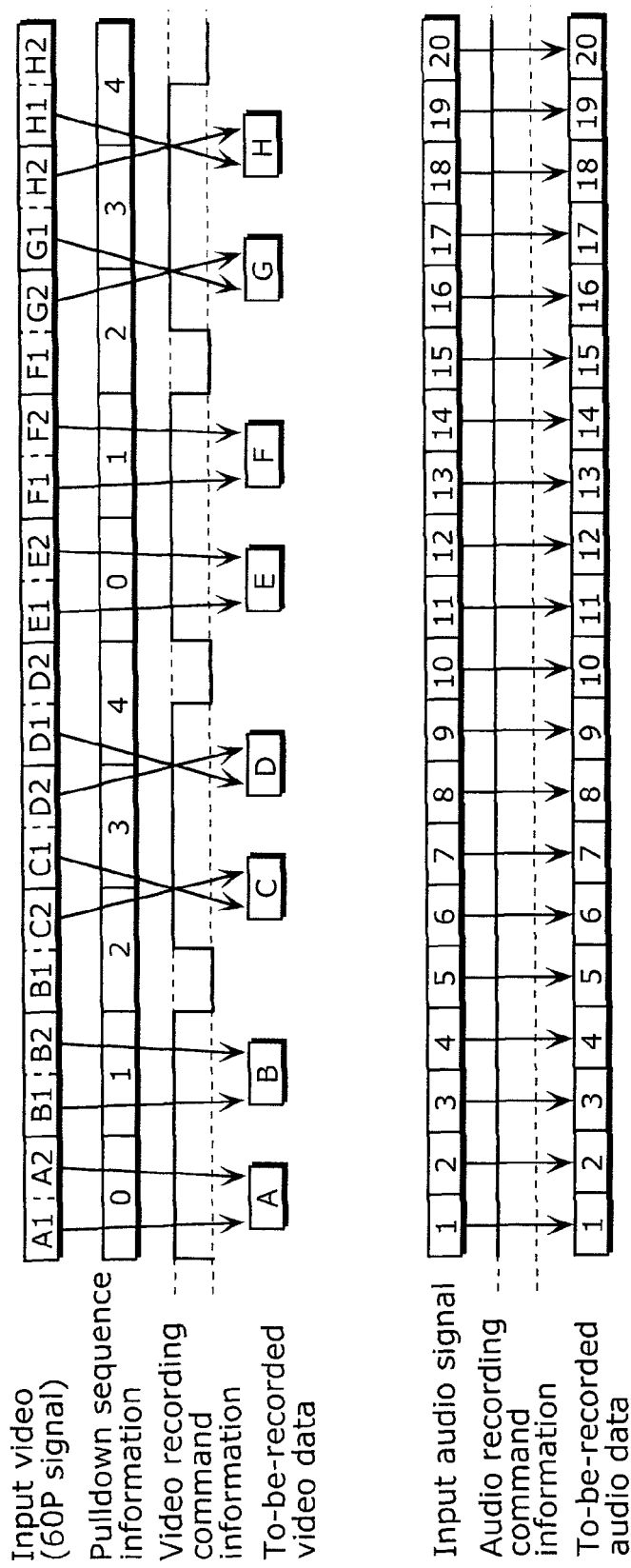
FIG. 15 is a diagram showing the native recording method for the 60I signal.
Figure 28:
FIG. 28 is a diagram showing an example of video and audio data recorded when the pulldown sequence changes, according to the first embodiment.
Figure 29:
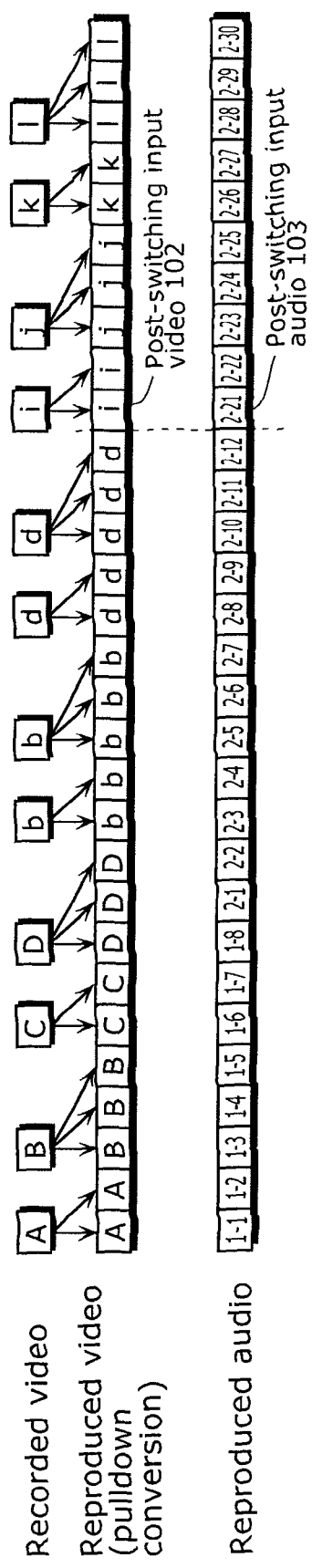
FIG. 29 is a diagram showing an example of reproducing the material through pulldown conversion when the pulldown sequence changes, according to the first embodiment.

FIG. 28 is a diagram showing an example of the video and audio data of the material recorded as shown in FIG. 27. FIG. 29 is a diagram showing an example of reproducing the material shown in FIG. 28 through pulldown conversion. As shown in FIG. 29, a post-switching input video 102 and a post-switching input audio 103 are provided at the same timing. It should be noted that the method of reproduction through pulldown conversion is the same method as described with reference to FIGS. 11 and 13 above, and therefore a detailed explanation is omitted here.

Figure 12:
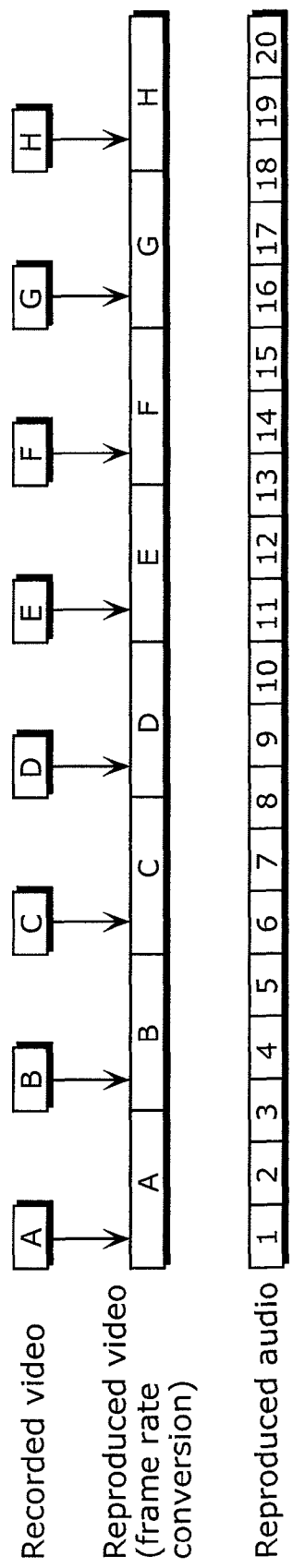
FIG. 12 is a diagram of showing a method for reproducing the 24P video through frame rate conversion.
Figure 30:
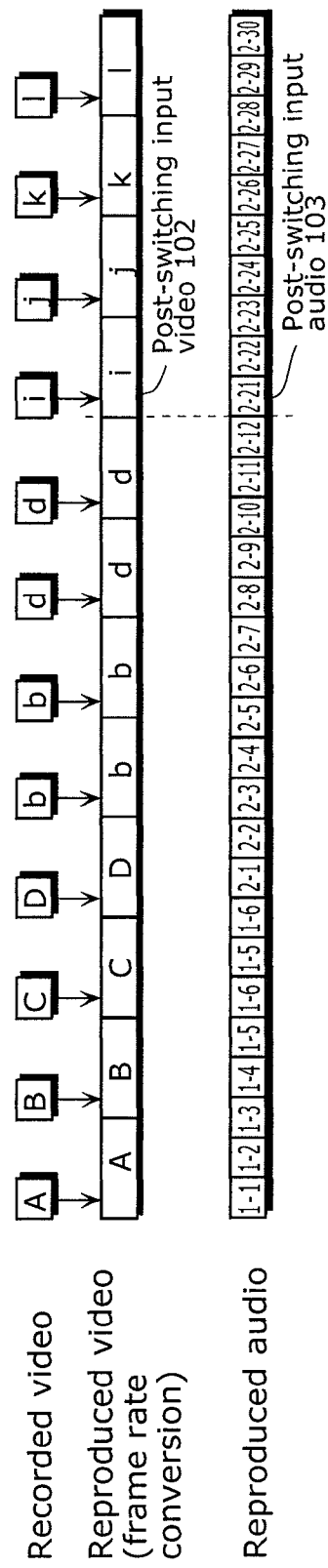
FIG. 30 is a diagram showing an example of a case where the material is reproduced through frame rate conversion when the pulldown sequence changes, according to the first embodiment.

FIG. 30 is a diagram showing an example of reproducing the material shown in FIG. 28 through frame rate conversion. As shown in FIG. 30, the post-switching input video 102 and the post-switching input audio 103 are provided at the same timing. It should be noted that the method of reproduction through frame rate conversion is the same method as described with reference to FIG. 12 above, and therefore a detailed explanation is omitted here.

Figure 31:
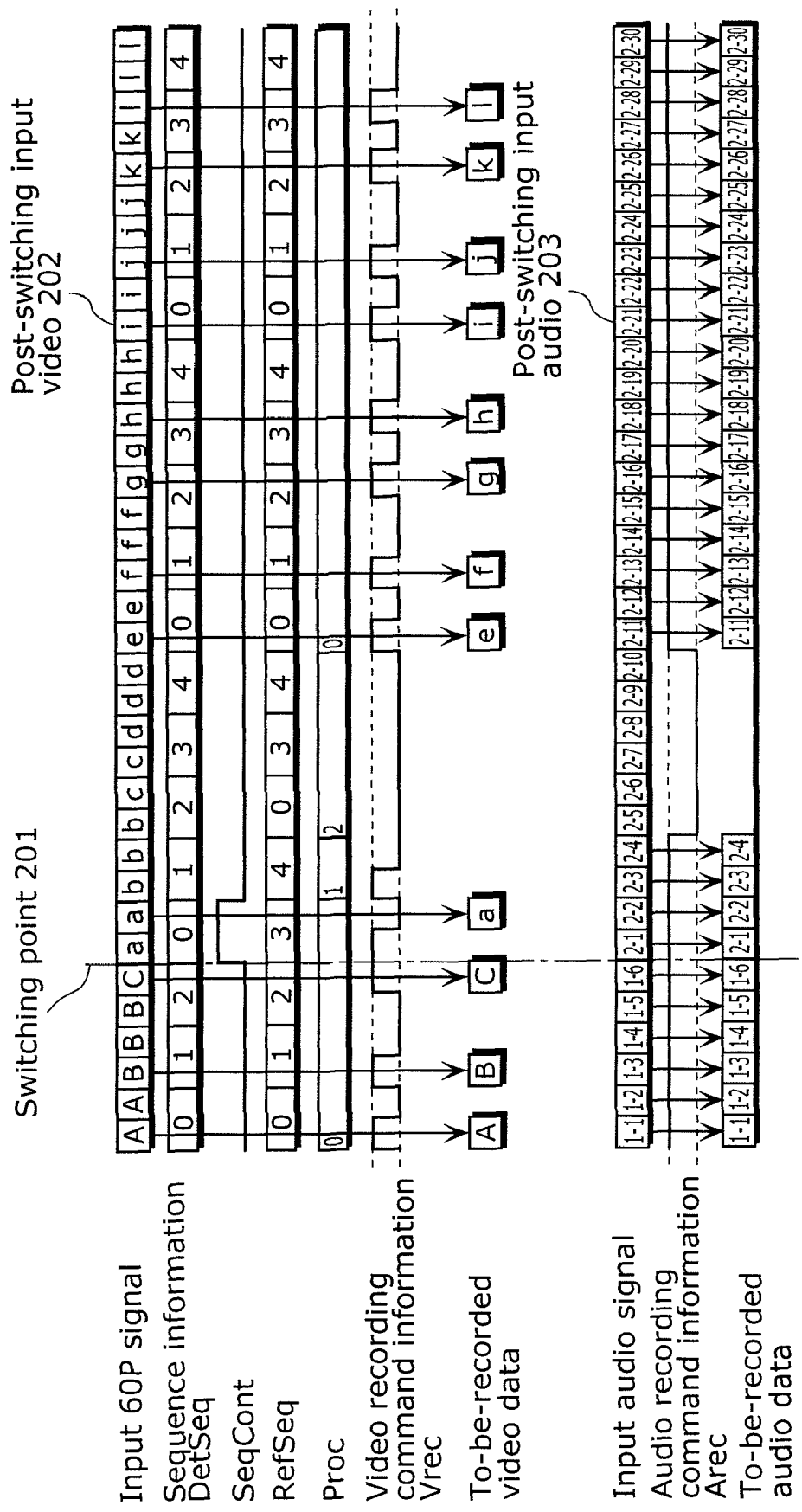
FIG. 31 is a diagram showing another example of recording where the pulldown sequence changes, according to the first embodiment.

FIG. 31 is a diagram showing another example of recording where the pulldown sequence changes. Note here that the maximum value of the continuity counter is set at 1 in the sequence state control processing performed by the sequence state control unit 22.

In the case of the present example of recording as shown, the pulldown sequence becomes discontinuous at a switching point 201 between the sixth frame and the seventh frame of the 60P input signal. In this case, the first period where Proc=1 is shorter as compared with the case shown in FIG. 27.

On account of this, the state of recording is determined as the record state early on after a lapse of the period where Proc=2, and the to-be-recorded video and audio data can be thus provided.

Figure 33:
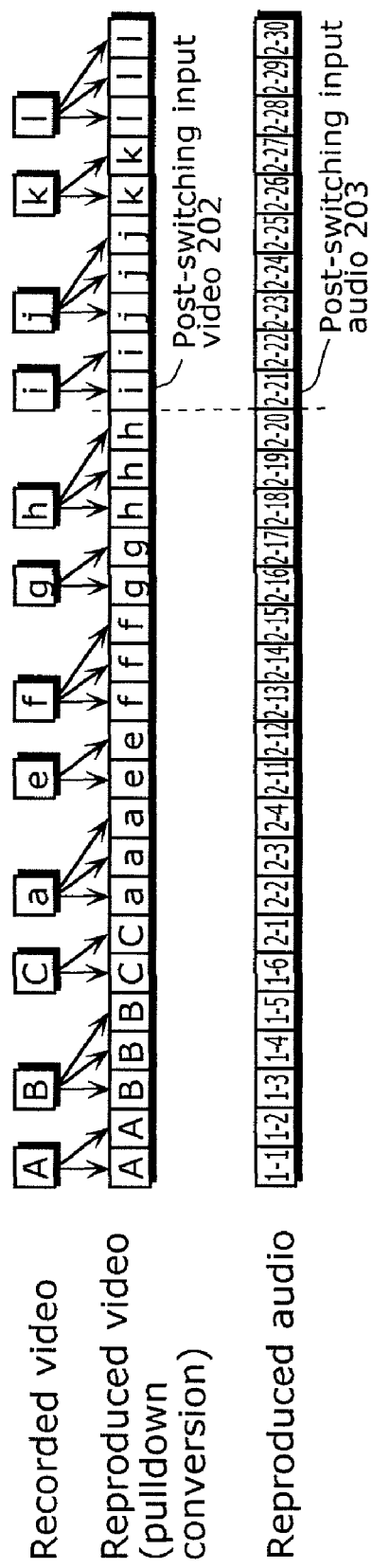
FIG. 33 is a diagram showing an example of reproducing the material through pulldown conversion in the case as shown in FIG. 31, according to the first embodiment.

FIG. 32 is a diagram showing an example of the video and audio of the material recorded as shown in FIG. 31. FIG. 33 is a diagram showing an example of reproducing the material shown in FIG. 32 through pulldown conversion. As shown in FIG. 33, a post-switching input video 202 and a post-switching input audio 203 are provided at the same timing. It should be noted that the method of reproduction through pulldown conversion is the same method as described with reference to FIGS. 11 and 13 above, and therefore a detailed explanation is omitted here.

Figure 34:
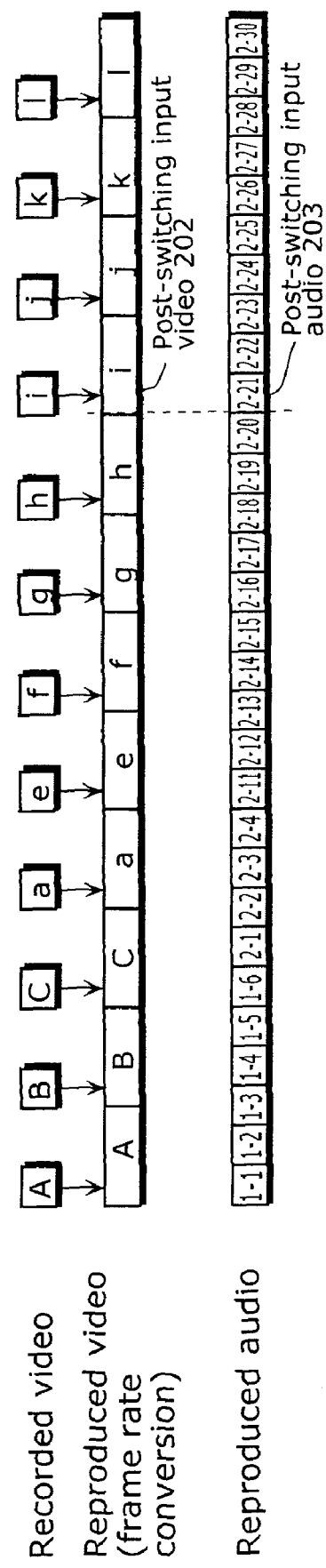
FIG. 34 is a diagram showing an example of reproducing the material through frame rate conversion in the case as shown in FIG. 31, according to the first embodiment.

FIG. 34 is a diagram showing an example of reproducing the material shown in FIG. 32 through frame rate conversion. As shown in FIG. 34, the post-switching input video 202 and the post-switching input audio 203 are provided at the same timing. It should be noted that the method of reproduction through frame rate conversion is the same method as described with reference to FIG. 12 above, and therefore a detailed explanation is omitted here.

First Modification

Here, the first modification of the first embodiment is described. In the first embodiment above, a disturbance of the input signal is not considered. In the present modification, on the other hand, an input disturbance detection unit 24 detects an input disturbance.

Figure 35:
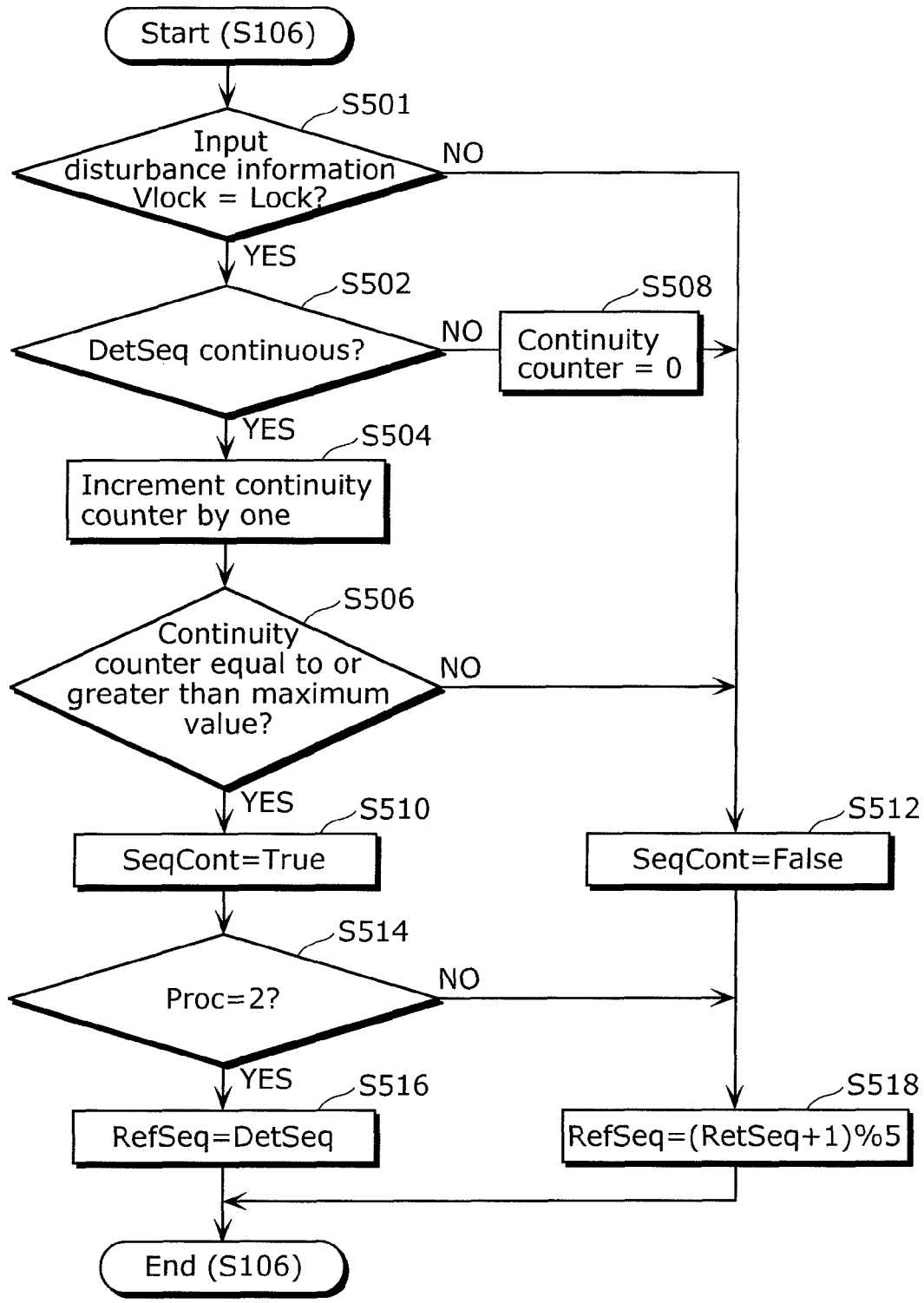
FIG. 35 is a flowchart showing processing performed by a sequence state control unit in the case where an input disturbance is considered, according to a first modification of the first embodiment.

FIG. 35 is a flowchart showing processing performed by the sequence state control unit 22 in the case where an input disturbance is considered.

First, the sequence state control unit 22 judges whether or not an input disturbance is occurring (S501). To be more specific, while the input disturbance detection unit 24 is not detecting an input disturbance, the sequence state control unit 22 sets input disturbance information Vlock to Lock which indicates that the input is not disturbed. When the input disturbance detection unit 24 detects an input disturbance, the sequence state control unit 22 sets the input disturbance information Vlock to Unlock which indicates that the input is being disturbed.

When the input disturbance information Vlock is not set to Lock (NO in 5501), the sequence state control unit 22 sets the sequence continuity state SeqCont to False (S512). In this way, while the input disturbance detection unit 24 is detecting the input disturbance, the sequence continuity state SeqCont is set to False, meaning that the record state continues. More specifically, the sequence processing process control unit 23 determines the state of recording, while the input disturbance detection unit 24 is detecting the input disturbance, as the record state where the video signal and the audio signal are to be recorded in accordance with the pulldown sequence of the video signal detected before the input disturbance detection.

When the input disturbance information Vlock is set to Lock (YES in S501), the sequence state control unit 22 determines the continuity of the sequence information DetSeq (S502). To be more specific, when the pulldown sequence changes before and after the input disturbance detection, the sequence state control unit 22 detects this change as a discontinuity. The processing of steps S502 to S518 performed hereafter is the same as the processing of steps S202 to S218 shown in FIG. 22, and therefore the explanation is omitted here.

In this way, according to the flowchart of FIG. 35, while the input disturbance is being detected, the sequence continuity SeqCont is set to False and the to-be-adopted pulldown sequence RefSeq is on its own without being dependent on the uncertain sequence information DetSeq. When the disturbance of the input signal is no more detected, the sequence continuity state SeqCont is set to True only after the sequence information DetSeq is verified to be continuous. Thus, even when detection of the sequence information is impossible while the input disturbance is occurring, the influence is small and the same effect as in the case where the pulldown sequence of the input video signal is discontinuous can be achieved. It should be noted that, for allowing more for error detection in returning from the input disturbance, the maximum value of the continuity counter may be increased only when a return from the input disturbance is made.

Second Modification

Next, the second modification of the first embodiment is described. In the first modification described above, the record state is maintained when the input signal is disturbed. In the present modification, on the other hand, the state of recording is determined as the non-record state while the input signal is being disturbed.

More specifically, when the input disturbance detection unit 24 detects an input disturbance, the sequence state control unit 22 judges that the sequence information DetSeq showing the pulldown sequence changes from the first pulldown sequence to the second pulldown sequence and detects this change as a discontinuity.

When the discontinuity is detected, the sequence processing process control unit 23 determines the state of recording as the record state where the video signal and the audio signal are to be recorded in accordance with the first pulldown sequence during a first period, where Proc=1, which starts from the discontinuity detection until the first pulldown sequence becomes a predetermined value, that is, until the RefSeq becomes 4 for example.

After a lapse of the first period, the sequence processing process control unit 23 determines the state of recording as the non-record state where the video signal and the audio signal are not to be recorded during a second period, where Proc=2, which lasts until the input disturbance is no more detected and the second pulldown sequence becomes the predetermined value, that is, until the DetSeq becomes 4 for example.

Moreover, after a lapse of the second period, the sequence processing process control unit 23 determines the state of recording as the record state where the video signal and the audio signal are to be recorded in accordance with the second pulldown sequence.

In accordance with the state of recording determined by the sequence processing process control unit 23, the recording command information generation unit 30 generates the video recording command information Vrec and the audio recording command information Arec so that the video signal is recorded as the 24P signal.

Then, the recording unit 40 provides the to-be-recorded video and audio data, on the basis of the video signal and the audio signal indicated to be recorded respectively according to the video recording command information Vrec and the audio recording command information Arec.

In this way, by determining the state of recording as the non-record state during the second period, recording is not performed while the input signal is being disturbed.

For the processing performed by the sequence processing process control unit 23 to locate the top of the pulldown sequence in step S306 of FIG. 24 and in step S310 of FIG. 25, 0 is used as the specific value to be compared with the RefSeq. However, any value 0 to 4 may be used as the specific value as long as this specific value is the same in each processing performed in step S306 of FIG. 24 and in step S310 of FIG. 25. Here, when 0 is used as the specific value, the data to be provided can be separated into two, that is, before and after the non-record state, it is useful in a case where a file needs to be divided into two.

According to the first embodiment and the modifications as described so far, even when the pulldown sequence of the input video signal is discontinuous or the material is recorded while the input signal is being disturbed, the video signal and the audio signal are provided in synchronization with respect to each other for reproduction. Note that when a conventional recording-reproduction apparatus reproduces the above material recorded as in the first embodiment, the same effect can be achieved. That is to say, the recording apparatus of the present invention can record a material including the video signal and the audio signal which are synchronized when reproduced, no matter what reproduction apparatus is to be used.

Second Embodiment

Figure 36:
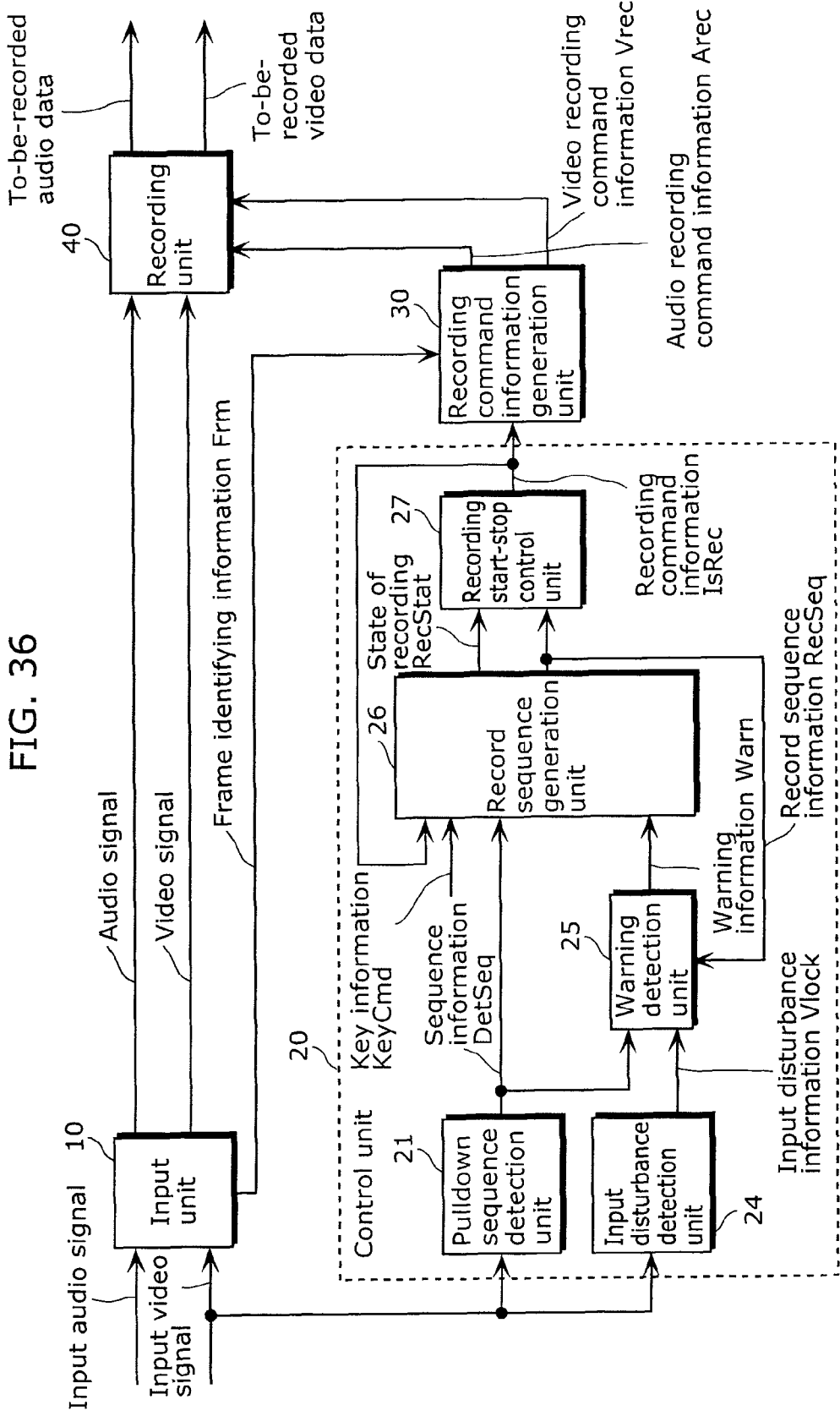
FIG. 36 is a block diagram showing a configuration example of a recording apparatus according to a second embodiment of the present invention.

FIG. 36 is a block diagram showing a configuration example of a recording apparatus according to the second embodiment of the present invention. As shown, the recording apparatus of the second embodiment includes an input unit 10, a control unit 20, a recording command information generation unit 30, and a recording unit 40. The control unit 20 includes a pulldown sequence detection unit 21, an input disturbance detection unit 24, a warning detection unit 25, a record sequence generation unit 26, and a recording start-stop control unit 27. Hereafter, explanations are given regarding parts different from what is shown in FIG. 20.

The warning detection unit 25 detects disagreement between the first pulldown sequence and the second pulldown sequence as a discontinuity. Here, the first pulldown sequence is generated by the record sequence generation unit 26, and the second pulldown sequence is detected by the pulldown sequence detection unit 21 and shows the pulldown sequence of the input video signal. Moreover, when a disturbance is detected, the warning detection unit 25 judges that there is disagreement between the first pulldown sequence and the second pulldown sequence, and detects this disagreement as a discontinuity. Here, the first pulldown sequence is record sequence information RecSeq whereas the second pulldown sequence is sequence information DetSeq.

More specifically, on the basis of the sequence information DetSeq, the input disturbance information Vlock, and the previously-set record sequence information RecSeq, the warning detection unit 25 provides warning information Warn showing whether or not the pulldown sequence of the input video signal agrees with the pulldown sequence which is currently being recorded. A detailed description will be given later.

The record sequence generation unit 26 generates the record sequence information RecSeq as the first pulldown sequence which is information showing the pulldown sequence of the video signal currently being recorded.

To be more specific, the record sequence generation unit 26 provides: a state of recording RecStat which is information showing whether or not to move to recording; and the record sequence information RecSeq which shows the pulldown sequence currently being recorded. The record sequence generation unit 26 provides the RecStat and the RecSeq on the basis of key information KeyCmd received from an operation unit which is not shown, the sequence information DetSeq, the warning information Warn, and recording command information IsRec showing whether or not to actually record. A detailed description will be given later.

The recording start-stop control unit 27 determines a state of recording, as to whether or not to record the video signal and the audio signal. More specifically, when the warning detection unit 25 detects the discontinuity, the recording start-stop control unit 27 determines the state of recording as the record state where the video signal and the audio signal are to be recorded in accordance with the first pulldown sequence during a first period which starts from the discontinuity detection until the first pulldown sequence becomes a predetermined value.

After a lapse of the first period, the recording start-stop control unit 27 determines the state of recording as the non-record state where the video signal and the audio signal are not to be recorded during a second period which lasts until the input disturbance is no more detected and the second pulldown sequence becomes the predetermined value. Moreover, after a lapse of the second period, the recording start-stop control unit 27 determines the state of recording as the record state where the video signal and the audio signal are to be recorded in accordance with the second pulldown sequence.

Here, the recording start-stop control unit 27 provides the recording command information IsRec showing whether or not to actually record, on the basis of the state of recording RecStat and the record sequence information RecSeq. A detailed description will be given later.

The recording command information generation unit 30 provides the video recording command information Vrec indicating whether or not to record the video signal and the audio recording command information Arec indicating whether or not to record the audio signal, on the basis of the frame identifying information Frm and the recording command information IsRec.

Next, the detailed descriptions concerning the processing performed in the second embodiment are given, with reference to the flowcharts. It should be noted here that: the signal processing by the input unit 10 and the recording unit 40 is executed at all times; the processing by the recording command information generation unit 30 is executed every sixtieth of a second, which corresponds to one frame in the case of the 60P signal and to one field in the case of the 60I signal; and the processing by the other processing units is executed every thirtieth of a second, which corresponds to two frames in the case of the 60P signal and to one frame in the case of the 60I signal.

Figure 37:
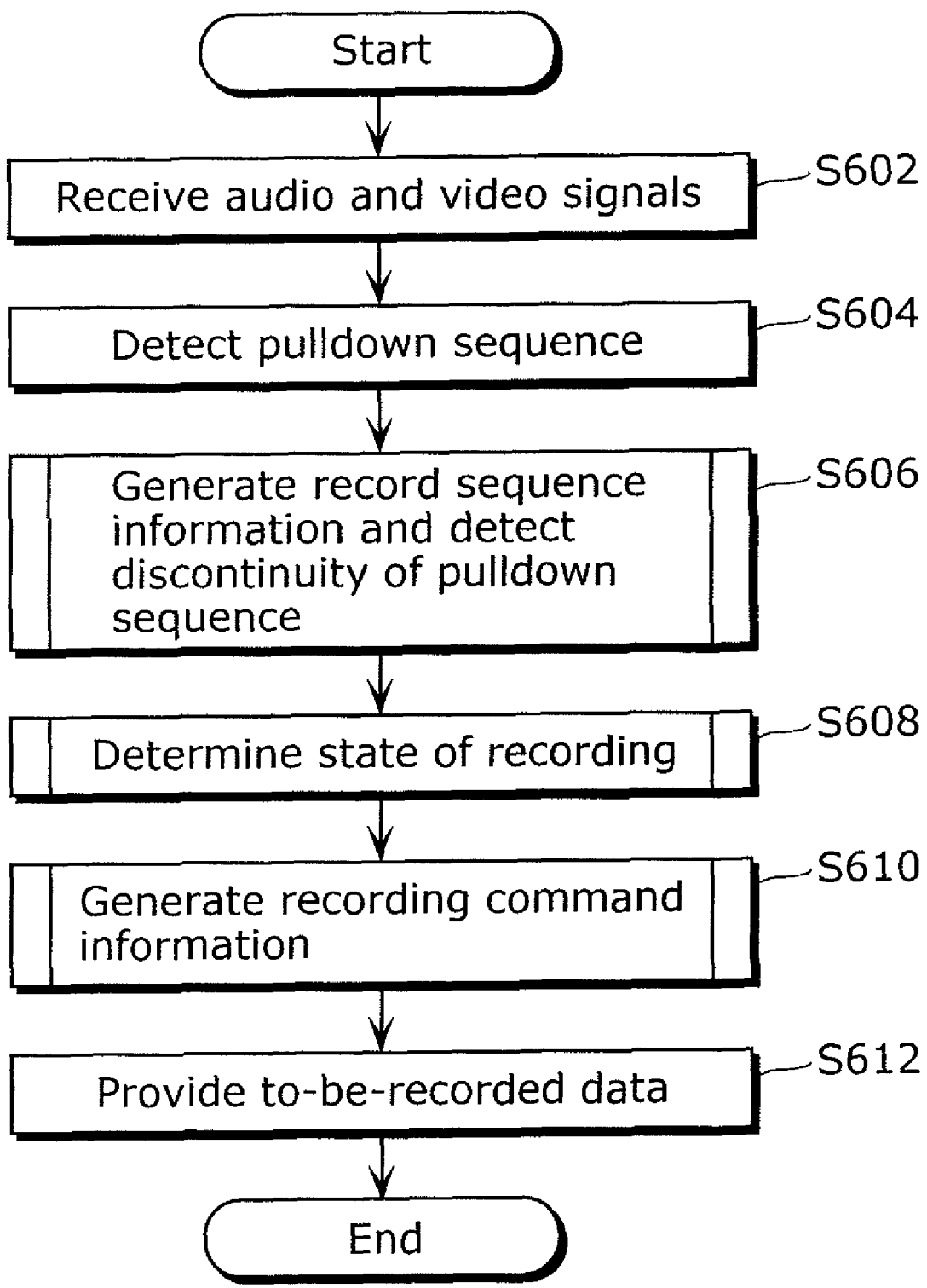
FIG. 37 is a flowchart showing an example of processing performed by the recording apparatus according to the second embodiment.

FIG. 37 is a flowchart showing an example of the processing performed by the recording apparatus according to the second embodiment.

First, the input unit 10 receives the input video signal and the input audio signal (S602).

The pulldown sequence detection unit 21 detects the sequence information DetSeq as the second pulldown sequence which is the information showing the pulldown sequence of the input video signal (S604).

The record sequence generation unit 26 generates the record sequence information RecSeq, and the warning detection unit 25 detects a discontinuity of the pulldown sequence (S606). To be more specific, the record sequence generation unit 26 generates and provides the record sequence information RecSeq as the first pulldown sequence. The warning detection unit 25 detects the disagreement between the sequence information DetSeq and the record sequence information RecSeq, as the discontinuity of the pulldown sequence, and then provides the warning information Warn.

Moreover, using the warning information Warn, the record sequence generation unit 26 generates the record sequence information RecSeq. A detailed description of the processing performed by the warning detection unit 25 and the record sequence generation unit 26 will be given later.

Next, the recording start-stop control unit 27 determines the state of recording, as to whether or not to record the video signal and the audio signal (S608). A detailed description of this processing performed by the recording start-stop control unit 27 will be given later.

The recording command information generation unit 30 generates the video recording command information and the audio recording command information (S610). A detailed description of this processing performed by the recording command information generation unit 30 will be given later.

The recording unit 40 provides the to-be-recorded video and audio data, on the basis of the video signal and the audio signal indicated to be recorded respectively according to the video recording command information and the audio recording command information (S612).

Next, the detailed description of the processing performed by the warning detection unit 25 and the record sequence generation unit 26 in step S606 of FIG. 37 is given.

Figure 38:
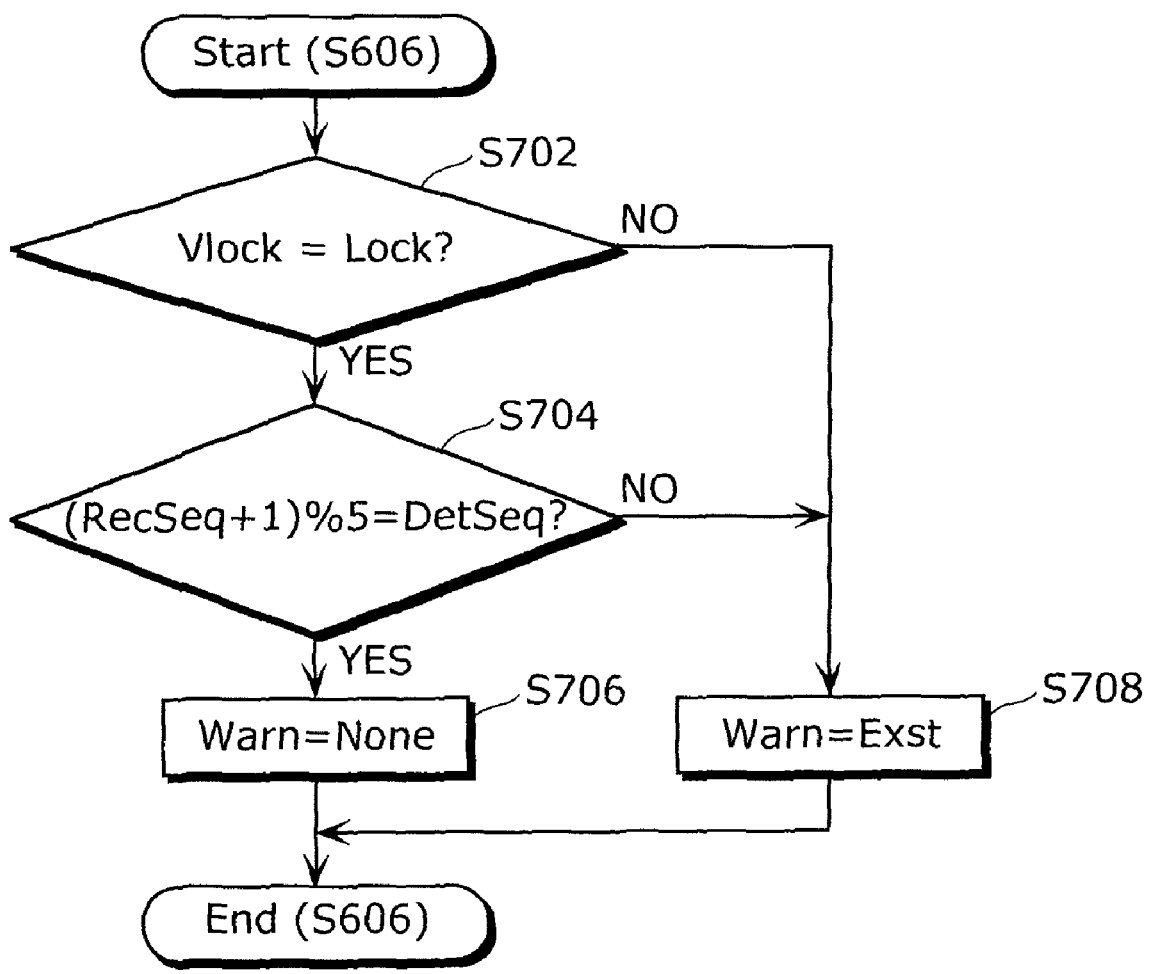
FIG. 38 is a flowchart showing warning detection processing according to the second embodiment.

FIG. 38 is a flowchart showing the warning detection processing performed by the warning detection unit 25.

First, the warning detection unit 25 judges whether or not an input disturbance is occurring (S702). To be more specific, while the input disturbance detection unit 24 is not detecting an input disturbance, the warning detection unit 25 sets the input disturbance information Vlock to Lock which indicates that the input is not disturbed. When the input disturbance detection unit 24 detects an input disturbance, the warning detection unit 25 sets the input disturbance information Vlock to Unlock which indicates that the input is being disturbed.

When judging that the input disturbance is not occurring (YES in S702), the warning detection unit 25 judges whether or not the information showing the pulldown sequence of the input signal agrees with the information showing the pulldown sequence which is currently being recorded (S704). Note that the RecSeq referred to here was generated the last time and, for this reason, the value is increased by one for the purpose of comparing with the DetSeq received this time.

Then, when judging that the information showing the pulldown sequence of the input signal agrees with the information showing the pulldown sequence currently being recorded (YES in S704), the warning detection unit 25 sets the warning information Warn to None which indicates that no warning exists.

On the other hand, when judging that the information showing the pulldown sequence of the input signal disagrees with the information showing the pulldown sequence currently being recorded (NO in S704), the warning detection unit 25 sets the warning information Warn to Exst which indicates that warning exists.

Moreover, when judging that the input disturbance is occurring (NO in S702), the warning detection unit 25 also sets the warning information Warn to Exst. By doing so, it becomes possible not to perform the recording while the input signal is being disturbed.

In this way, the processing performed by the warning detection unit 25 in step S606 shown in FIG. 37 is terminated.

Next, the detailed description of the processing performed by the record sequence generation unit 26 in step S606 shown in FIG. 37 is given.

Figure 39:
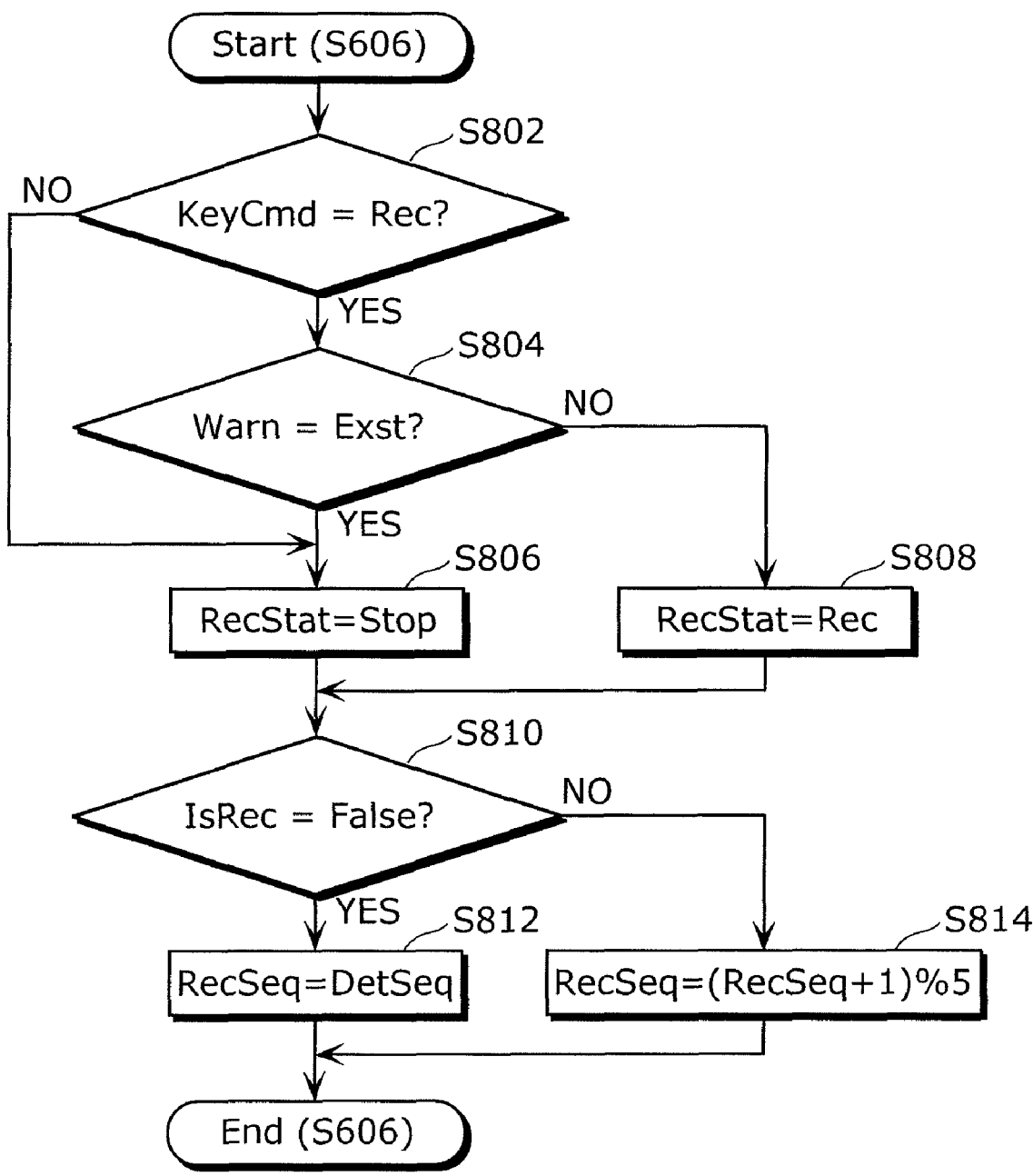
FIG. 39 is a flowchart showing record sequence generation processing according to the second embodiment.

FIG. 39 is a flowchart showing the record sequence generation processing performed by the record sequence generation unit 26.

First, the record sequence generation unit 26 judges whether or not the key information KeyCmd received from the operation unit is Rec which indicates recording (S802).

When judging that the key information KeyCmd is Rec (YES in S802), the record sequence generation unit 26 judges whether or not the warning information Warn is Exst which indicates that warning exists (S804).

When judging that the warning information Warn is Exst (YES in S804), the record sequence generation unit 26 sets the state of recording RecStat to Stop which indicates that the recording is not to be performed. Also, when judging that the key information KeyCmd is not Rec (NO in S802), the record sequence generation unit 26 sets the state of recording RecStat to Stop.

When judging that the warning information Warn is not Exst (NO in S804), the record sequence generation unit 26 sets the state of recording RecStat to Rec which indicates that the recording is not to be performed (S808).

Then, the record sequence generation unit 26 judges whether or not the recording command information IsRec showing whether or not to actually record the signals is set to False indicating that the recording is not to be performed (S810).

When judging that the IsRec is set to False (YES in S810), the record sequence generation unit 26 substitutes the sequence information DetSeq into the record sequence information RecSeq. On the other hand, when judging that the IsRec is not set to False (NO in S810), the record sequence generation unit 26 makes the setting for incrementing the record sequence information RecSeq by 1.

In this way, the processing performed by the record sequence generation unit 26 in step S606 shown in FIG. 37 is terminated.

Next, the detailed description of the processing performed by the recording start-stop control unit 27 in step S608 shown in FIG. 37 is given.

Figure 40:
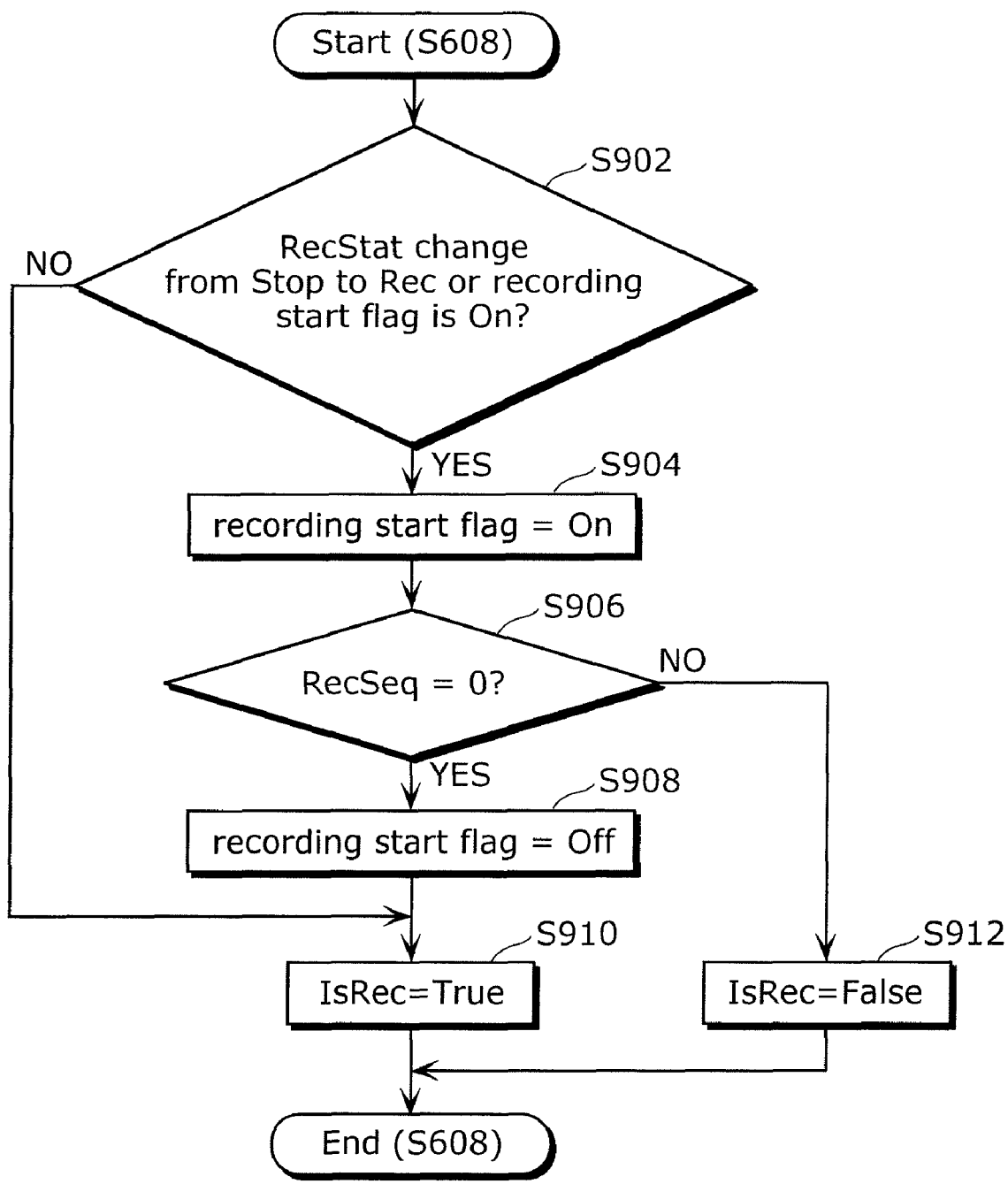
FIG. 40 is a flowchart showing recording start control processing according to the second embodiment.

FIG. 40 is a flowchart showing the recording start control processing performed by the recording start-stop control unit 27. Note that the recording start-stop control unit 27 executes the recording start control processing when the state of recording RecStat is set to Rec.

First, the recording start-stop control unit 27 judges whether or not the state of recording RecStat is changed from Stop to Rec, or whether or not a recording start flag described later is On (S902). Note that the initial value of the recording start flag is Off.

When judging that the state of recording RecStat is changed from Stop to Rec, or that the recording start flag is On (YES in S902), the recording start-stop control unit 27 sets the recording start flag showing whether or not the recording start processing has been started to On which indicates that the recording has been started (S904).

Then, the recording start-stop control unit 27 judges whether or not the record sequence information RecSeq is 0, that is, the top of the sequence (S906).

When judging that the record sequence information RecSeq is 0 (YES in S906), the recording start-stop control unit 27 sets the recording start flag showing whether or not the recording start processing has been started to Off indicating that the recording start processing is completed (S908).

After this, the recording start-stop control unit 27 sets the recording command information IsRec to True indicating that the recording is to be performed (S910). Meanwhile, when judging that the state of recording RecStat is not changed from Stop to Rec and that the recording start flag is not On (NO in S902), the recording start-stop control unit 27 also sets the recording command information IsRec to True (S910).

When judging that the record sequence information Rec-Seq is not 0 (NO in S906), the recording start-stop control unit 27 sets the recording command information IsRec to False indicating that the recording is not to be performed (S912).

Figure 41:
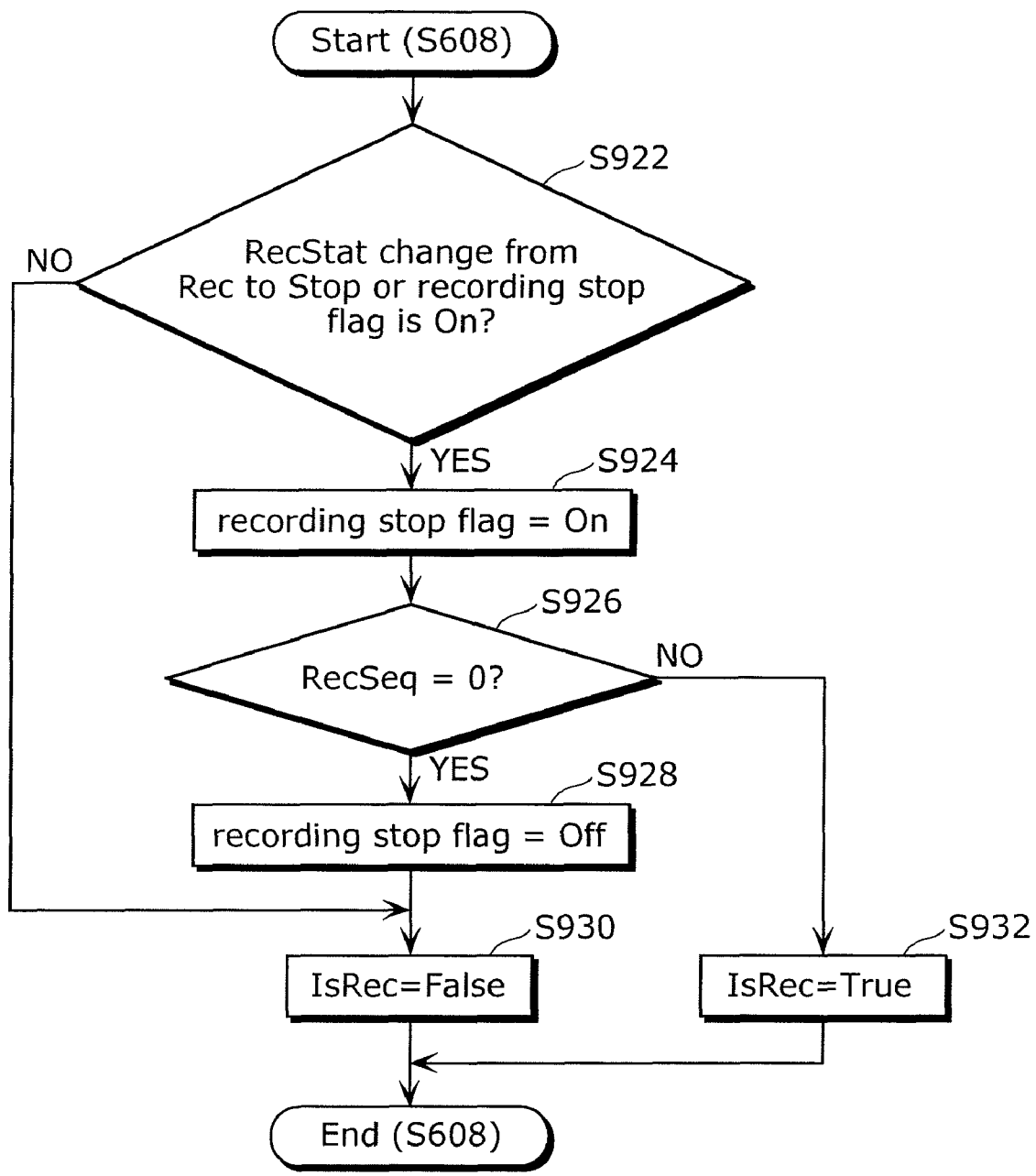
FIG. 41 is a flowchart showing recording stop control processing according to the second embodiment.

FIG. 41 is a flowchart showing the recording stop control processing performed by the recording start-stop control unit 27. Note that the recording start-stop control unit 27 executes the recording stop control processing when the state of recording RecStat is set to Stop.

First, the recording start-stop control unit 27 judges whether or not the state of recording RecStat is changed from Rec to Stop, or whether or not a recording stop flag described later is On (S922). Note that the initial value of the recording stop flag is Off.

When judging that the state of recording RecStat is changed from Rec to Stop, or that the recording stop flag is On (YES in S922), the recording start-stop control unit 27 sets the recording stop flag showing whether or not the recording stop processing has been started to On which indicates that the recording has been started (S924).

Then, the recording start-stop control unit 27 judges whether or not the record sequence information RecSeq is 0, that is, the top of the sequence (S926).

When judging that the record sequence information Rec-Seq is 0 (YES in S926), the recording start-stop control unit 27 sets the recording stop flag showing whether or not the recording stop processing has been started to Off indicating that the recording stop processing is completed (S928).

After this, the recording start-stop control unit 27 sets the recording command information IsRec to False indicating that the recording is not to be performed (S930). Meanwhile, when judging that the state of recording RecStat is not changed from Rec to Stop and that the recording stop flag is not On (NO in S922), the recording start-stop control unit 27 also sets the recording command information IsRec to False (S930).

When judging that the record sequence information Rec-Seq is not 0 (NO in S926), the recording start-stop control unit 27 sets the recording command information IsRec to True indicating that the recording is to be performed (S932).

In this way, the processing performed by the recording start-stop control unit 27 in step S608 shown in FIG. 37 is terminated.

Next, the detailed description of the processing performed by the recording command information generation unit 30 in step S610 shown in FIG. 37 is given.

Figure 42:
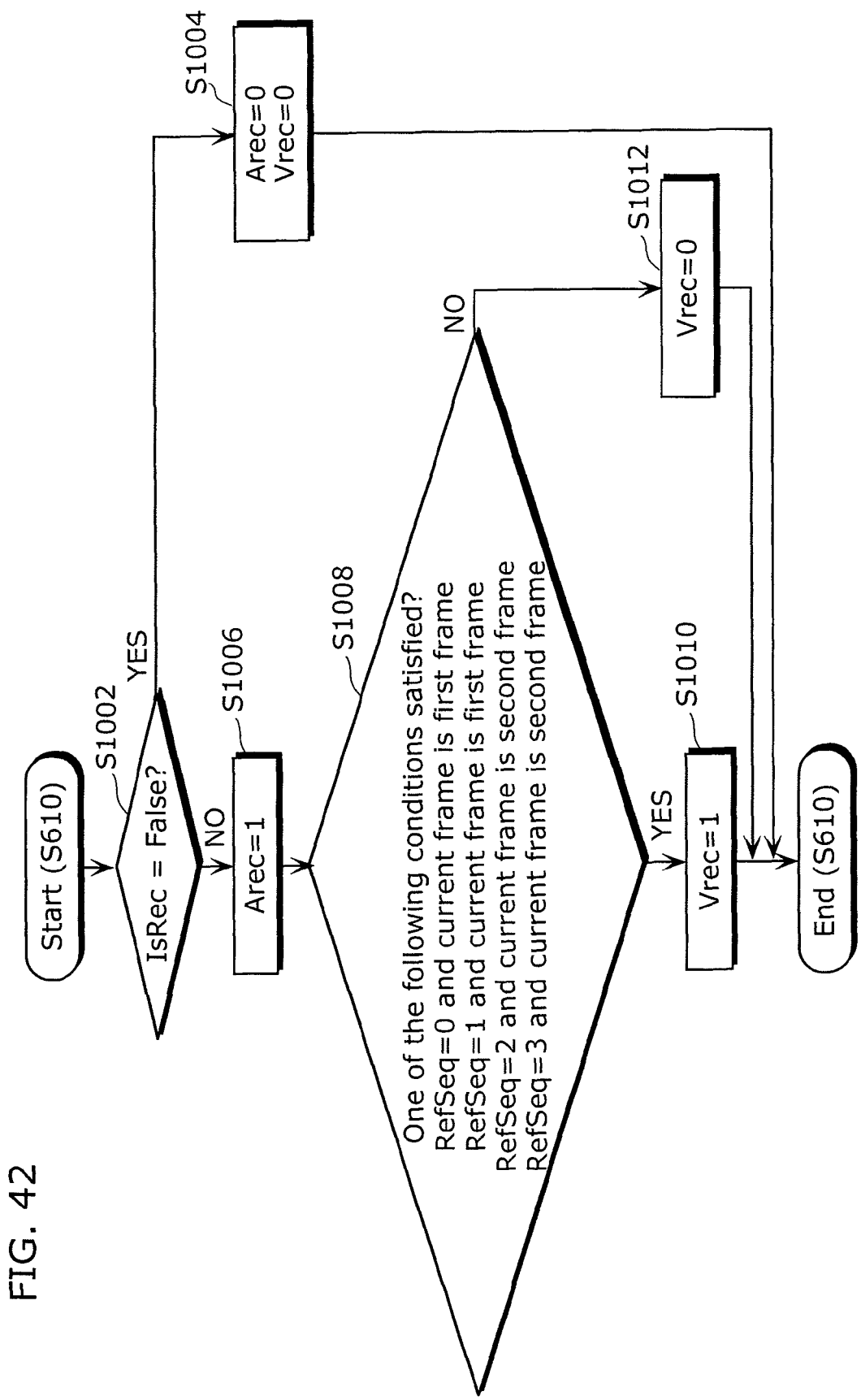
FIG. 42 is a flowchart showing recording command information generation processing according to the second embodiment.

FIG. 42 is a flowchart showing the command information generation processing performed in the second embodiment.

First, the recording command information generation unit 30 judges whether or not the recording command information IsRec is set to False indicating that the recording is not to be performed (S1002). This judgment is made in order to determine whether or not to record the video signal and the audio signal.

When judging that the recording command information IsRec is set to False (YES in S1002), the recording command information generation unit 30 sets the video recording command information Vrec and the audio recording command information Arec to 0 which indicates that the recording is not to be performed (S1004).

When judging that the recording command information IsRec is not set to False (NO in S1002), the recording command information generation unit 30 sets the audio recording command information Arec to 1 which indicates that the recording is to be performed (S1006).

After this, the recording command information generation unit 30 judges a setting condition of the video recording command information Vrec (S1008). This judgment is made in order to determine whether or not to extract the video signal as the effective frame signal.

To be more specific, when one of the conditions: that the to-be-adopted pulldown sequence RefSeq is 0 and the current frame is the first frame; that the RefSeq is 1 and the current frame is the first frame; that the RefSeq is 2 and the current frame is the second frame; and that the RefSeq is 3 and the current frame is the second frame, is satisfied (YES in S1008), the recording command information generation unit 30 sets the video recording command information Vrec to 1 which indicates that the recording is to be performed (S1010).

When none of the conditions is satisfied (NO in S1008), the recording command information generation unit 30 sets the video recording command information Vrec to 0 which indicates that the recording is not to be performed (S1012).

It should be noted here that the above-described conditions are for the case of the 60P signal. In the case of the 60I signal, when one of the conditions: that the to-be-adopted pulldown sequence RefSeq is 0; that the RefSeq is 1; that the RefSeq is 3; that the RefSeq is 2 and the current field is the second field; and that the RefSeq is 4 and the current field is the first field, is satisfied (YES in S1008), the recording command information generation unit 30 sets the video recording command information Vrec to 1 which indicates that the recording is to be performed (S1010). When none of the conditions is satisfied (NO in S1008), the recording command information generation unit 30 sets the video recording command information Vrec to 0 which indicates that the recording is not to be performed (S1012). In this way, the processing performed by the recording command information generation unit 30 in step S610 shown in FIG. 37 is terminated.

Figure 43:
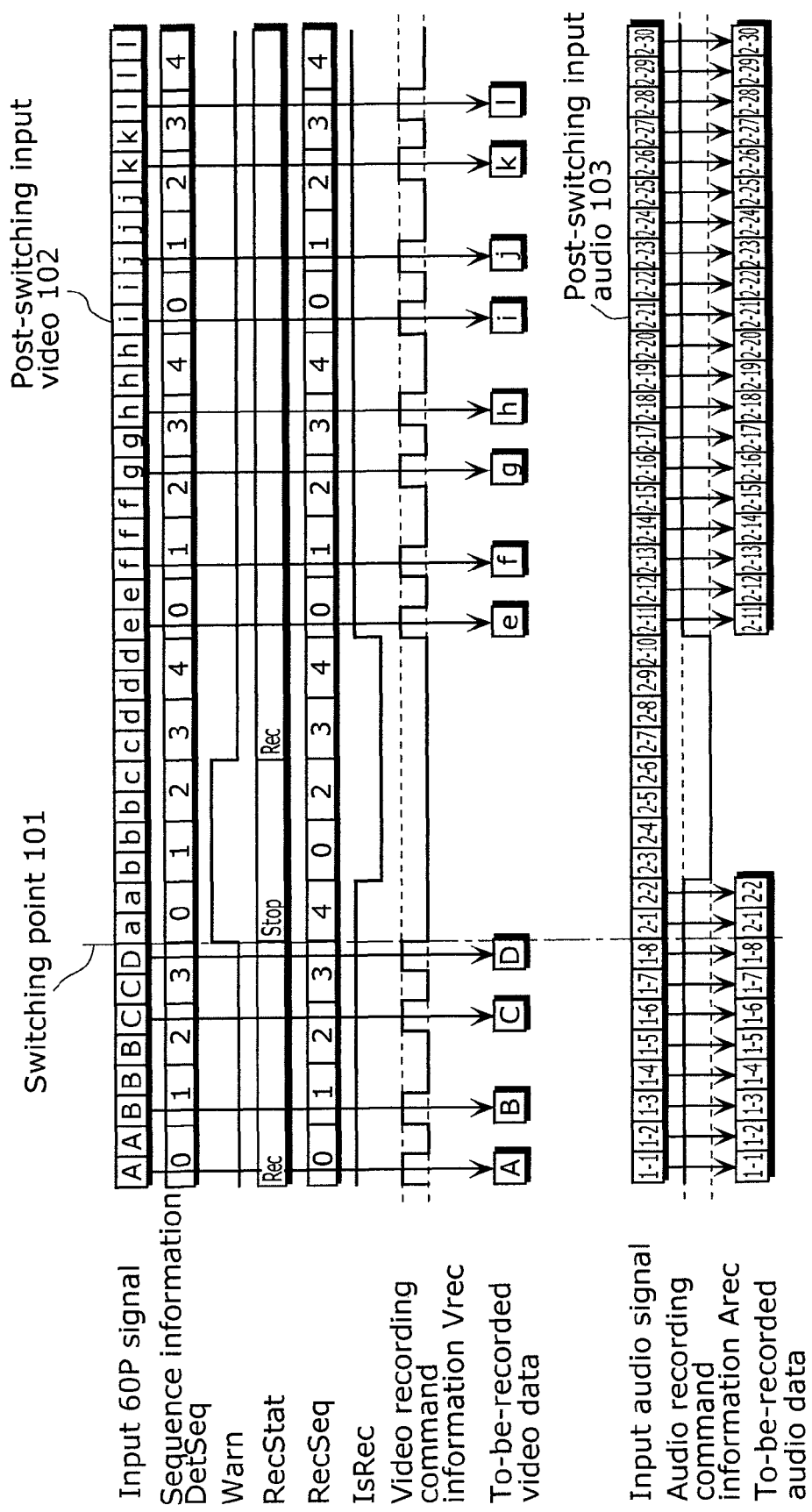
FIG. 43 is a diagram showing an example of recording where a pulldown sequence changes, according to the second embodiment.

FIG. 43 is a diagram showing an example of recording performed in the second embodiment when the pulldown sequence changes under the same condition as shown in FIG. 16. Note that an input disturbance is not occurring here.

As shown, the record sequence generation unit 26 generates the record sequence information RecSeq. The warning detection unit 25 detects the disagreement, as the discontinuity, between the sequence information DetSeq detected by the pulldown sequence detection unit 21 and the record sequence information RecSeq, and then provides the warning information Warn as Exst.

Next, when the warning detection unit 25 detects the discontinuity, the recording start-stop control unit 27 determines the state of recording as the record state where the video signal and the audio signal are to be recorded in accordance with the record sequence information RecSeq during a first period which starts from the discontinuity detection until the record sequence information RecSeq becomes a predetermined value. In this case here, the first period refers to a period when the recording command information IsRec is set to True, and the predetermine value is 4.

After a lapse of the first period, the recording start-stop control unit 27 determines the state of recording as the non-record state where the video signal and the audio signal are not to be recorded during a second period which lasts until the input disturbance is no more detected and the sequence information DetSeq becomes the predetermined value. In this case here, the second period refers to a period when the recording command information IsRec is set to False and the predetermined value of the DetSeq is 4.

Moreover, after a lapse of the second period, the recording start-stop control unit 27 determines the state of recording as the record state where the video signal and the audio signal are to be recorded in accordance with the sequence information DetSeq. When the warning information Warn is received as Exst, the record sequence generation unit 26 judges that the record sequence information RecSeq agrees with the sequence information DetSeq. In other words, after a lapse of the second period, the recording start-stop control unit 27 determines the state of recording as the record state where the video signal and the audio signal are to be recorded in accordance with the record sequence information RecSeq.

In accordance with the state of recording determined by the sequence processing process control unit 23, the recording command information generation unit 30 generates the video recording command information Vrec and the audio recording command information Arec so that the video signal is recorded as the 24P signal.

Then, the recording unit 40 provides the to-be-recorded video and audio data, on the basis of the video signal and the audio signal indicated to be recorded respectively according to the video recording command information Vrec and the audio recording command information Arec.

Figure 45:
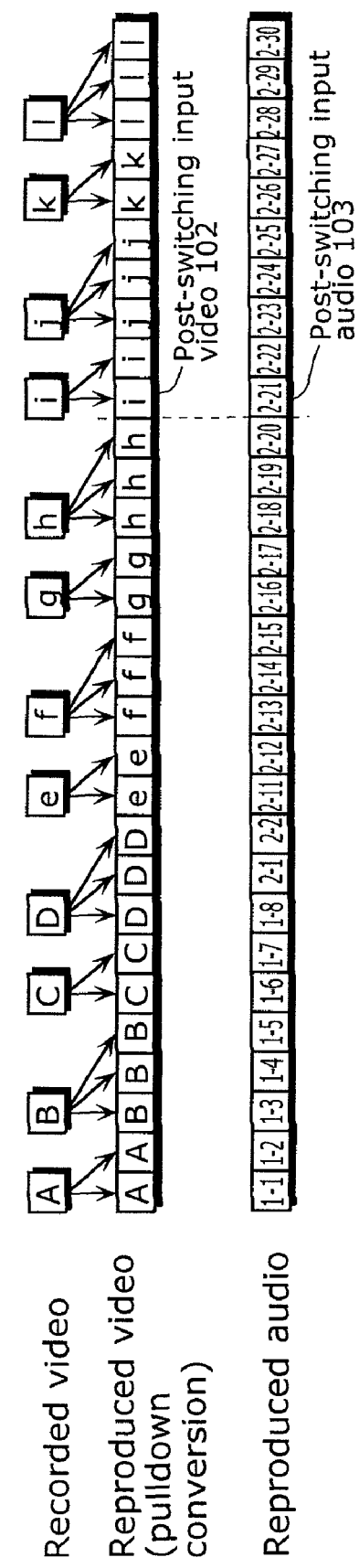
FIG. 45 is a diagram showing an example of reproducing the material through pulldown conversion when the pulldown sequence changes, according to the second embodiment.

FIG. 44 is a diagram showing an example of the video and audio data of the material recorded as shown in FIG. 43. FIG. 45 is a diagram showing an example of reproducing the material shown in FIG. 44 through pulldown conversion. As shown in FIG. 45, a post-switching input video 102 and a post-switching input audio 103 are provided at the same timing. It should be noted that the method of reproduction through pulldown conversion is the same method as described with reference to FIGS. 11 and 13 above, and therefore a detailed explanation is omitted here.

Figure 46:
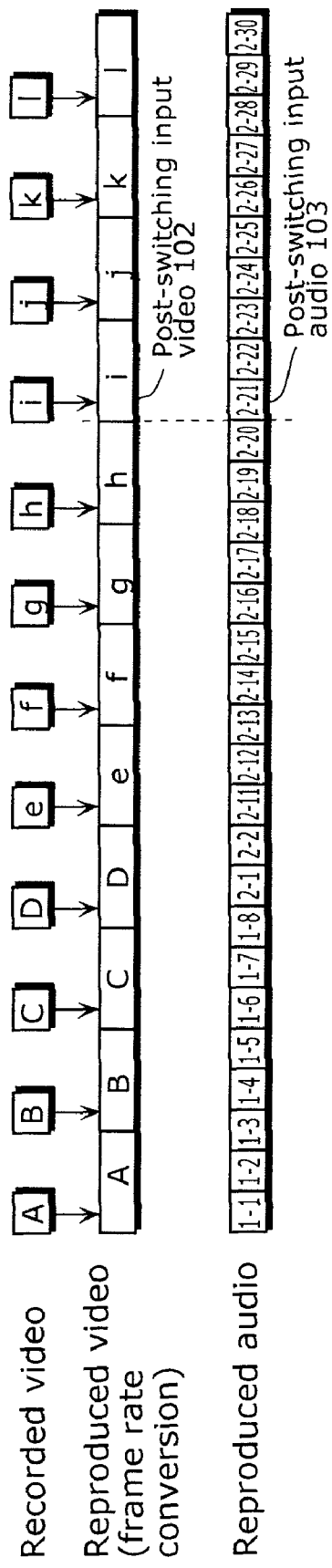
FIG. 46 is a diagram showing an example of reproducing the material through frame rate conversion when the pulldown sequence changes, according to the second embodiment.

FIG. 46 is a diagram showing an example of reproducing the material shown in FIG. 44 through frame rate conversion. As shown in FIG. 46, the post-switching input video 102 and the post-switching input audio 103 are provided at the same timing. It should be noted that the method of reproduction through frame rate conversion is the same method as described with reference to FIG. 12 above, and therefore a detailed explanation is omitted here.

As shown in FIG. 38, while the input disturbance is occurring and the input disturbance detection unit 24 is detecting this input disturbance (NO in S702 in FIG. 38), the warning information Warn is set to Exst, meaning that the state of recording is determined as the non-record state.

For the processing performed by the recording start-stop control unit 27 to locate the top of the pulldown sequence in step S906 of FIG. 40 and in step S926 of FIG. 41, 0 is used as the specific value to be compared with the RefSeq. However, any value 0 to 4 may be used as the specific value as long as this specific value is the same in each processing performed in step S906 of FIG. 40 and in step S926 of FIG. 41. Here, when 0 is used as the specific value, the data to be provided can be separated into two, that is, before and after the non-record state, it is useful in a case where a file needs to be divided into two.

According to the second embodiment as described so far, even when the pulldown sequence of the input video signal is discontinuous or the material is recorded while the input signal is being disturbed, the video signal and the audio signal can be provided in synchronization with respect to each other for reproduction. Note that when a conventional recording-reproduction apparatus reproduces the above material recorded as in the second embodiment, the same effect can be achieved. That is to say, the recording apparatus of the present invention can record a material including the video signal and the audio signal which are synchronized when reproduced, no matter what reproduction apparatus is to be used. Moreover, while the input disturbance is occurring during the recording operation, the state of recording can be set to the non-record state.

Third Embodiment

Figure 47:
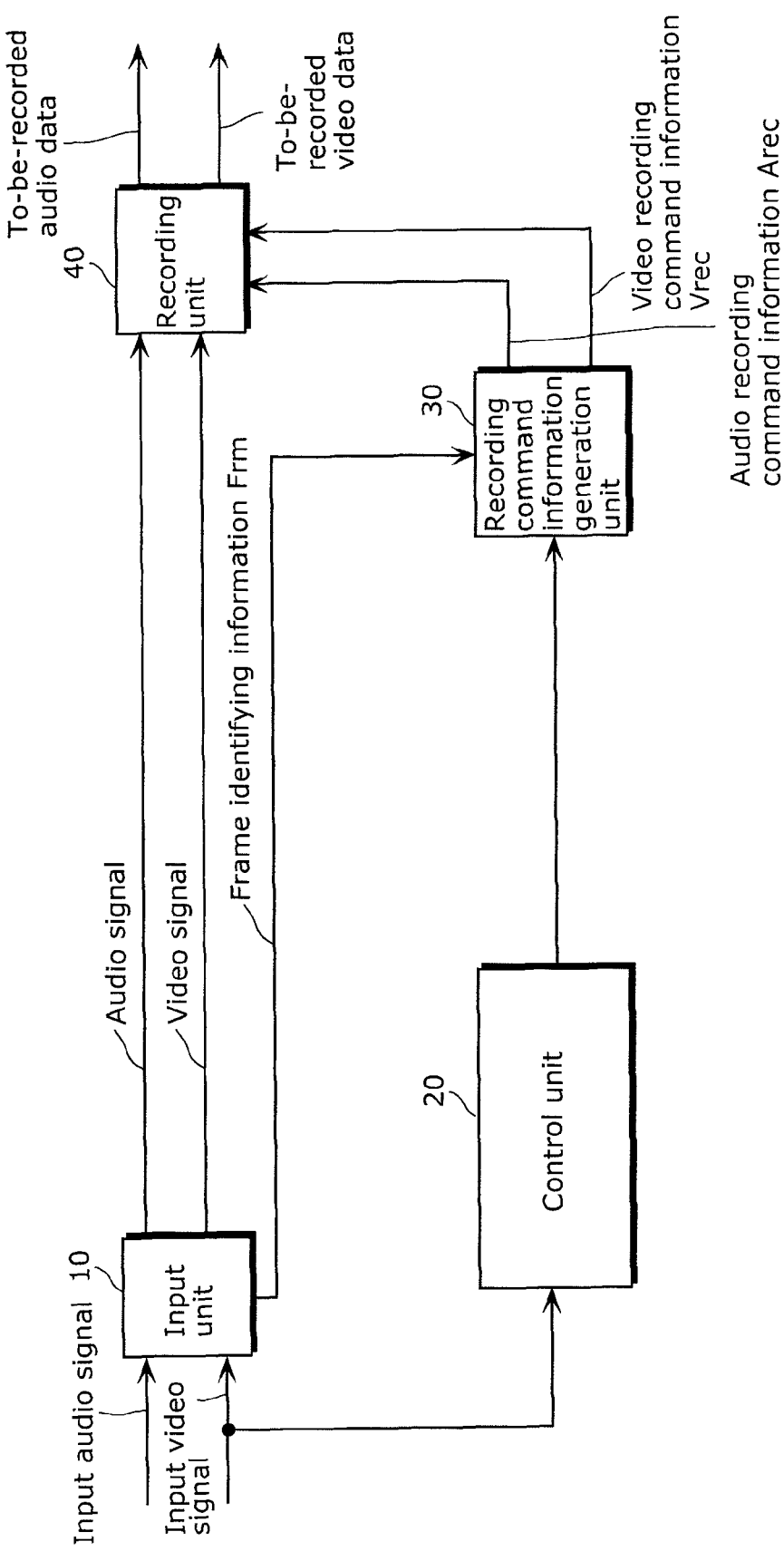
FIG. 47 is a block diagram showing a configuration example of a recording apparatus according to a third embodiment of the present invention.

FIG. 47 is a block diagram showing a configuration example of a recording apparatus according to the third embodiment of the present invention. As shown, the recording apparatus of the third embodiment includes an input unit 10, a control unit 20, a recording command information generation unit 30, and a recording unit 40. Here, the input unit 10, the recording command information generation unit 30, and the recording unit 40 are the same as those shown in FIG. 20. Therefore, the explanations are omitted here.

When the information showing the pulldown sequence of the input video signal changes from the first pulldown sequence to the second pulldown sequence, the control unit 20 detects this change as a discontinuity.

Then, the control unit 20 determines the state of recording as the non-record state where the video signal and the audio signal are not to be recorded for the predetermined period of time, during which the recording of the video signal is suspended following the discontinuity detection and after a lapse of which the recording of the video signal is resumed, so that the first pulldown sequence becomes continuous to the second pulldown sequence.

After the lapse of the predetermined period of time, the control unit 20 determines the state of recording as the record state where the video signal and the audio signal are to be recorded in accordance with the second pulldown sequence.

Next, the detailed descriptions concerning the processing performed in the third embodiment are given, with reference to the flowcharts. It should be noted here that: the signal processing by the input unit 10 and the recording unit 40 is executed at all times; the processing by the recording command information generation unit 30 is executed every sixtieth of a second, which corresponds to one frame in the case of the 60P signal and to one field in the case of the 60I signal; and the processing by the other processing units is executed every thirtieth of a second, which corresponds to two frames in the case of the 60P signal and to one frame in the case of the 60I signal.

Figure 48:
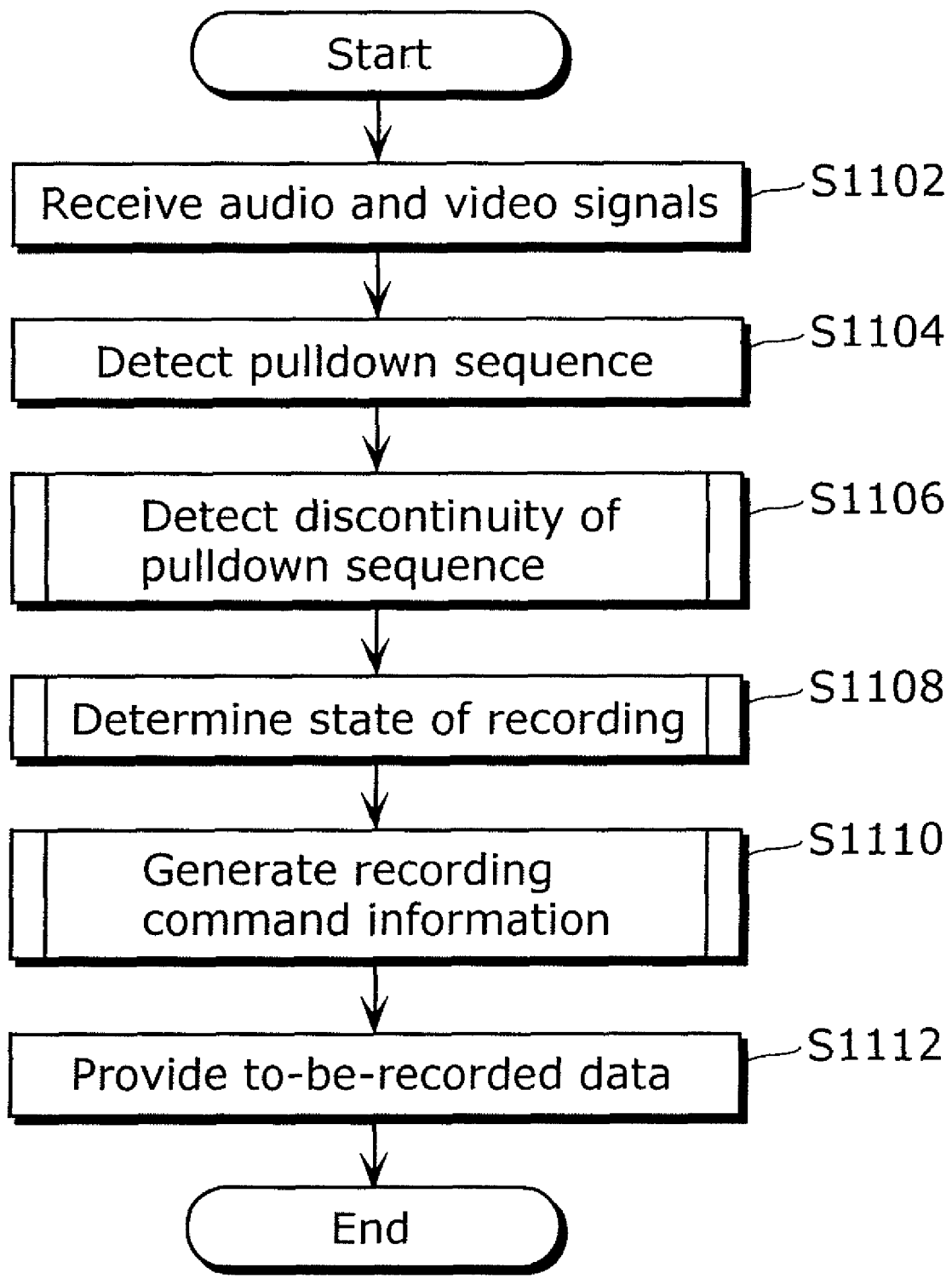
FIG. 48 is a flowchart showing an example of processing performed by the recording apparatus according to the third embodiment.

FIG. 48 is a flowchart showing an example of the processing performed by the recording apparatus according to the third embodiment.

First, the input unit 10 receives the input video signal and the input audio signal (S1102).

The control unit 20 detects the pulldown sequence of the input video signal (S1104).

When the information showing the pulldown sequence of the input video signal changes from the first pulldown sequence to the second pulldown sequence, the control unit 20 detects this change as a discontinuity (S1106).

The control unit 20 determines the state of recording, as to whether or not to record the video signal and the audio signal (S1108). To be more specific, the control unit 20 determines the state of recording as the non-record state where the video signal and the audio signal are not to be recorded for the predetermined period of time, during which the recording of the video signal is suspended following the discontinuity detection and after a lapse of which the recording of the video signal is resumed, so that the first pulldown sequence becomes continuous to the second pulldown sequence. After the lapse of the predetermined period of time, the control unit 20 determines the state of recording as the record state where the video signal and the audio signal are to be recorded in accordance with the second pulldown sequence.

Next, in accordance with the state of recording determined by the control unit 20, the recording command information generation unit 30 generates the video recording command information and the audio recording command information so that the video signal is recorded as the 24P signal (S1110).

Then, the recording unit 40 provides the to-be-recorded video and audio data, on the basis of the video signal and the audio signal indicated to be recorded respectively according to the video recording command information and the audio recording command information (S1112).

Figure 49:
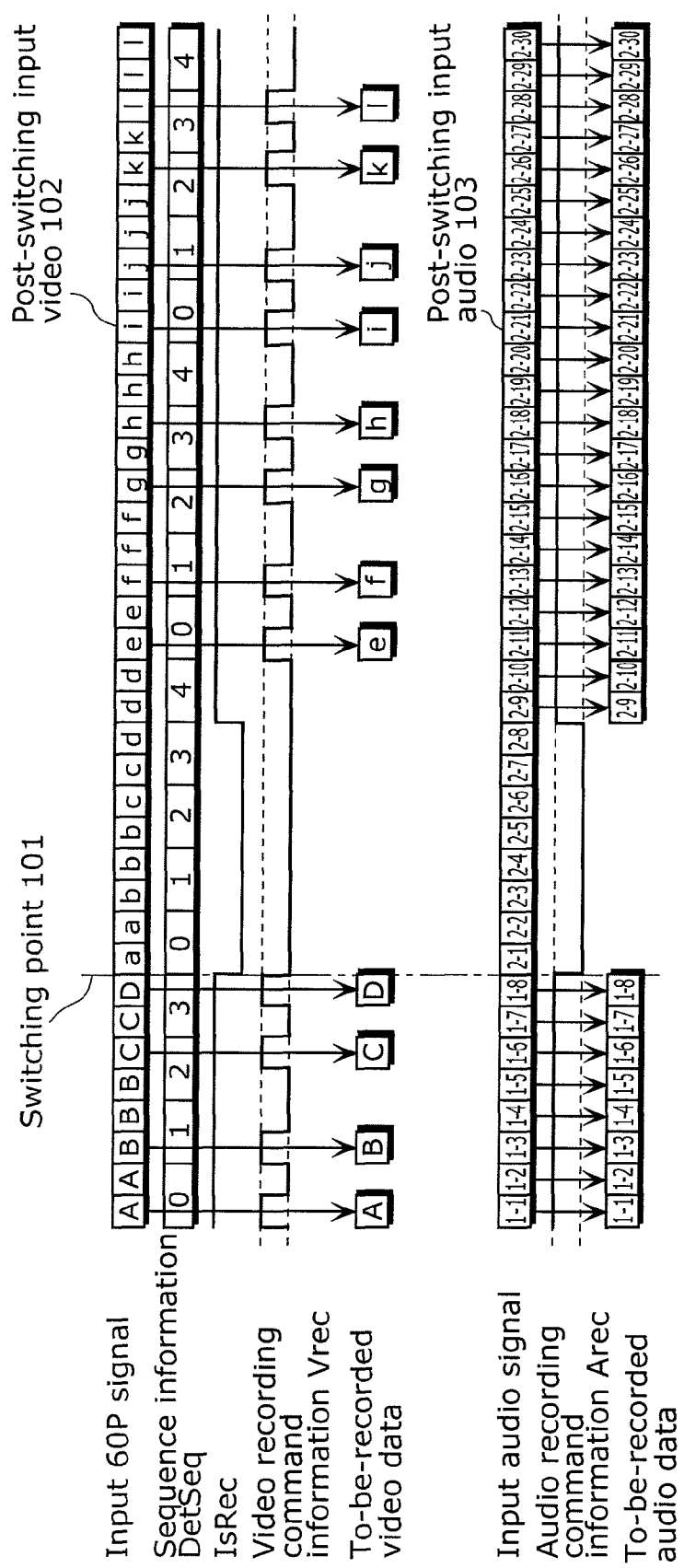
FIG. 49 is a diagram showing an example of recording where a pulldown sequence changes, according to the third embodiment.

FIG. 49 is a diagram showing an example of recording performed in the third embodiment when the pulldown sequence changes under the same condition as shown in FIG. 16. Note that an input disturbance is not occurring here.

As shown in this diagram, the control unit 20 judges that the sequence information DetSeq showing the detected pulldown sequence changes from the first pulldown sequence to the second pulldown sequence at a switching point 101, and detects this change as a discontinuity.

Then, the control unit 20 determines the state of recording as the non-record state where the video signal and the audio signal are not to be recorded, during a predetermined period of time after the discontinuity detection. In this case here, the predetermined period refers to a period where the recording command information IsRec is set to False. More specifically, when the first pulldown sequence is 3 and the discontinuity is detected, the first pulldown sequence is set in the non-record state at 3. Then, when the second pulldown sequence becomes 4, the recording is resumed.

Then, after a lapse of the predetermined period of time, the control unit 20 determines the state of recording as the record state where the video signal and the audio signal are to be recorded in accordance with the second pulldown sequence. Accordingly, the first pulldown sequence becomes continuous to the second pulldown sequence when the recording is resumed.

Next, in accordance with the state of recording determined by the control unit 20, the recording command information generation unit 30 generates the video recording command information Vrec and the audio recording command information Arec so that the video signal is recorded as the 24P signal.

Then, the recording unit 40 provides the to-be-recorded video and audio data, on the basis of the video signal and the audio signal indicated to be recorded respectively according to the video recording command information Vrec and the audio recording command information Arec.

Figure 50:
FIG. 50 is a diagram showing an example of the video and audio data recorded when the pulldown sequence changes, according to the third embodiment.
Figure 51:
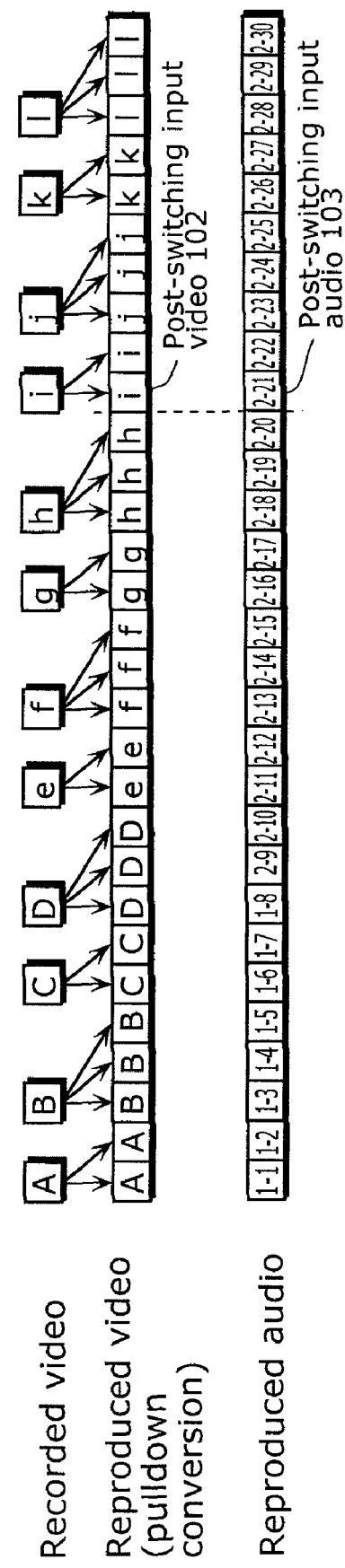
FIG. 51 is a diagram showing an example of reproducing the material through pulldown conversion when the pulldown sequence changes, according to the third embodiment.

FIG. 50 is a diagram showing an example of the video and audio data of the material recorded as shown in FIG. 49. FIG. 51 is a diagram showing an example of reproducing the material shown in FIG. 50 through pulldown conversion. As shown in FIG. 51, a post-switching input video 102 and a post-switching input audio 103 are provided at the same timing. It should be noted that the method of reproduction through pulldown conversion is the same method as described with reference to FIGS. 11 and 13 above, and therefore a detailed explanation is omitted here.

Figure 52:
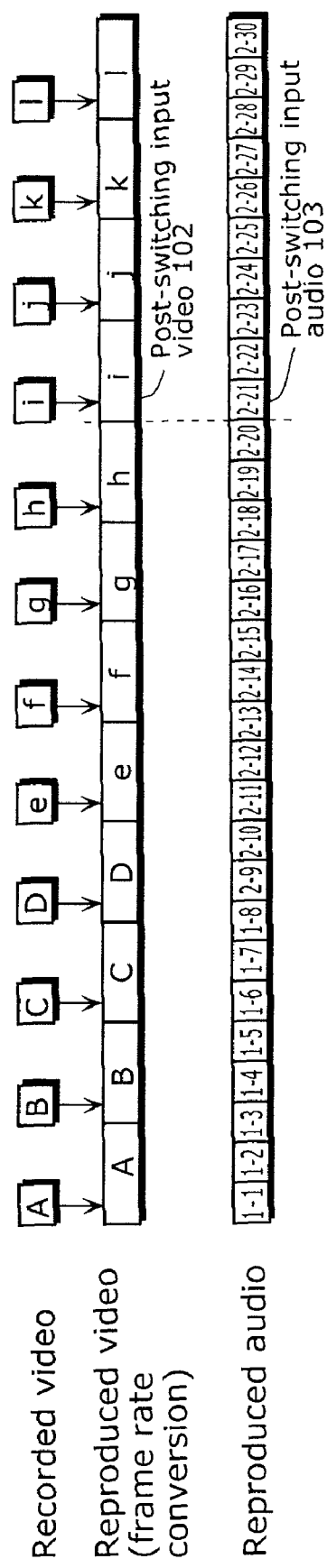
FIG. 52 is a diagram showing an example of reproducing the material through frame rate conversion when the pull-down sequence changes, according to the third embodiment.

FIG. 52 is a diagram showing an example of reproducing the material shown in FIG. 50 through frame rate conversion. As shown in FIG. 52, the post-switching input video 102 and the post-switching input audio 103 are provided at the same timing. It should be noted that the method of reproduction through frame rate conversion is the same method as described with reference to FIG. 12 above, and therefore a detailed explanation is omitted here.

According to the third embodiment as described so far, even when the pulldown sequence of the input video signal is discontinuous or the material is recorded while the input signal is being disturbed, the video signal and the audio signal are provided in synchronization with respect to each other for reproduction. Note that when a conventional recording-reproduction apparatus reproduces the above material recorded as in the third embodiment, the same effect can be achieved. That is to say, the recording apparatus of the present invention can record a material including the video signal and the audio signal which are synchronized when reproduced, no matter what reproduction apparatus is to be used. Moreover, since the provided data cannot be divided into two in the third embodiment, it is useful in a case where one file is generated without splitting.

Figure 53:
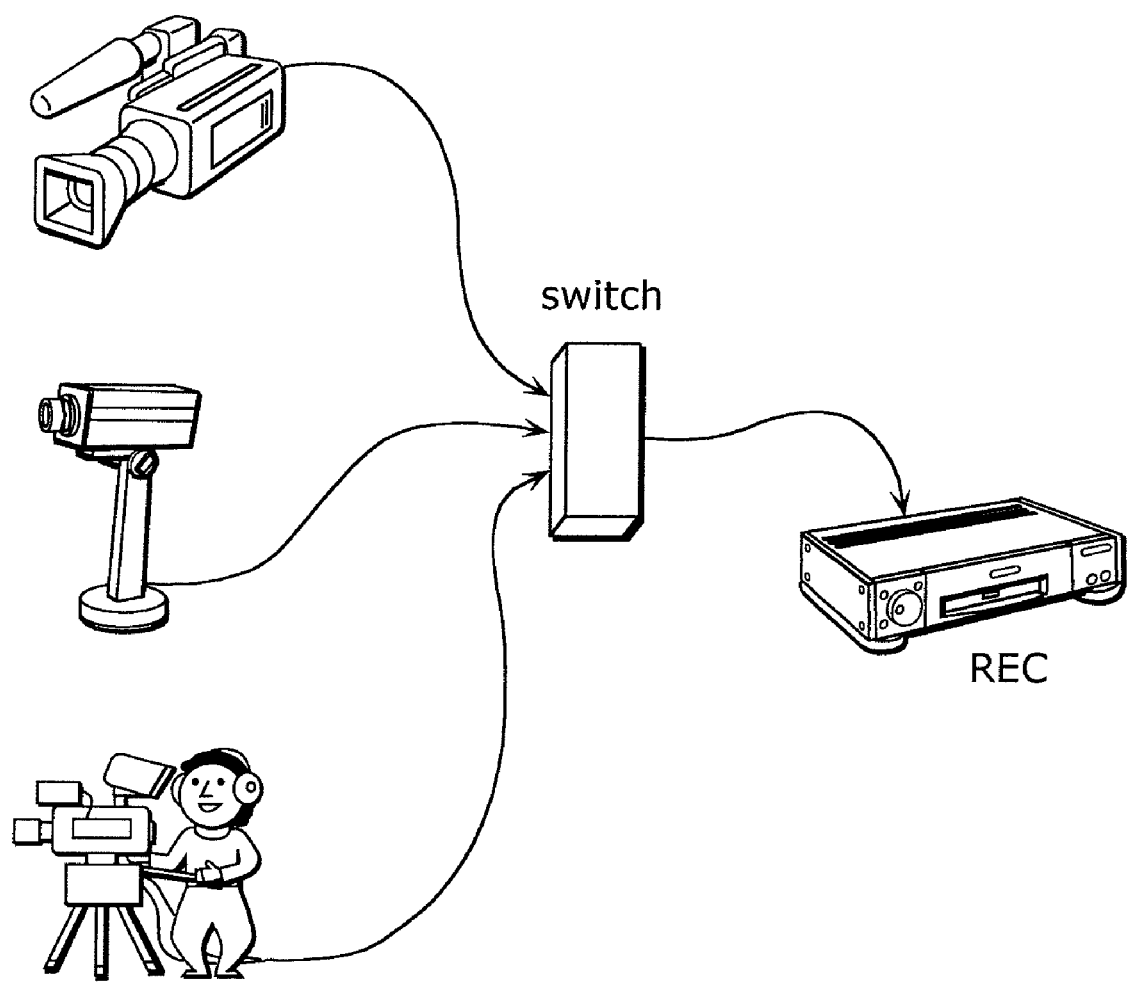
FIG. 53 is a diagram showing a concrete example of the recording apparatus according to the present invention.
Figure 55:
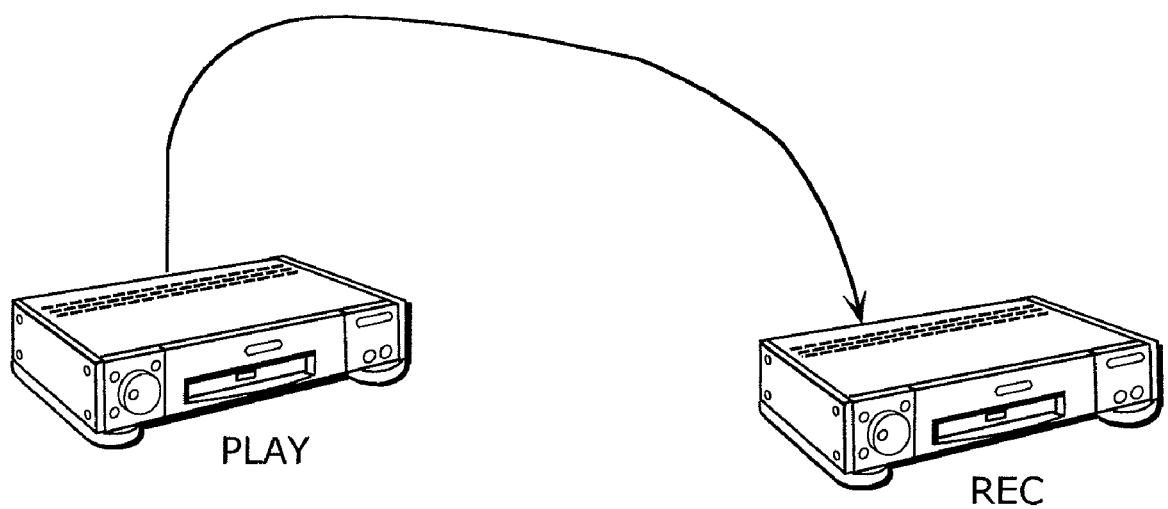
FIG. 55 is a diagram showing a concrete example of the recording apparatus according to the present invention.

FIGS. 53 to 55 are diagrams showing concrete examples of the recording apparatus according to the present invention.

FIG. 53 is a diagram showing that the recording apparatus performs the native recording by switching between a plurality of cameras using a switcher. As can be seen from the diagram, when switching among the cameras, the input signal received by the recording apparatus becomes discontinuous. Even in this case, by using the recording apparatus of the present invention, the video signal and the audio signal are provided in synchronization with respect to each other for reproduction.

FIG. 54 is a diagram showing that the recording apparatus performs the native recording when channels are switched while a broadcast wave and cable television are being received. As can be seen from the diagram, when the receiving channels of the broadcast wave and the cable television are switched, the input signal received by the recording apparatus becomes discontinuous. Even in this case, by using the recording apparatus of the present invention, the video signal and the audio signal are provided in synchronization with respect to each other for reproduction.

FIG. 55 is a diagram showing that the recording apparatus performs native dubbing. As can be seen from the diagram, when discontinuous video is reproduced and then provided to the recording apparatus, the input signal received by the recording apparatus becomes discontinuous. Even in this case, by using the recording apparatus of the present invention, the video signal and the audio signal are provided in synchronization with respect to each other for reproduction.

Additionally, all the functional blocks shown in the block diagrams of FIGS. 20, 36, and 47 are realized as an LSI which is typically an integrated circuit device. This LSI may be integrated into a single chip or into a plurality of chips. Although referred to as the LSI here, it may be referred to as an IC, a system LSI, a super LSI, or an ultra LSI depending on the scale of integration.

A method for circuit integration is not limited to application of an LSI. It may be realized using a dedicated circuit or a general purpose processor. After an LSI is manufactured, an FPGA (Field Programmable Gate Array) which is programmable or a reconfigurable processor for which the connections and settings of circuit cells inside the LSI are reconfigurable may be used.

Moreover, when a circuit integration technology that replaces LSIs comes along owing to advances of the semiconductor technology or to a separate derivative technology, the functional blocks should be understandably integrated using that technology. There can be a possibility of adaptation of biotechnology, for example.

The recording apparatus of the present invention has been described so far according to the above embodiments. However, the present invention is not limited to these embodiments.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

When the pulldown sequence of the input video signal is discontinuous or when the input signal is disturbed, the video signal and the audio signal can be provided in synchronization with respect to each other using the recording apparatus of the present invention. Thus, the present invention is useful as a recording apparatus or the like used in the digital cinema production field for making video.

What is claimed is:

1. A recording apparatus which records an input video signal and an input audio signal, said apparatus comprising:
   an input unit configured to receive the video signal and the audio signal, a mode of the video signal being a second mode having been pulldown-converted from a first mode;
   a control unit configured to detect a discontinuity of a pulldown sequence of the input video signal;
   a recording command information generation unit configured to generate: video recording command information which indicates whether or not to record the video signal of the second mode as the video signal of the first mode; and audio recording command information which indicates whether or not to record the audio signal; and
   a recording unit configured to provide to-be-recorded video data and to-be-recorded audio data based on the video signal and the audio signal indicated to be recorded respectively according to the generated video recording command information and the generated audio recording command information,
   wherein said control unit is configured to determine a state of recording as a non-record state, where the video signal and the audio signal are not to be recorded, for a predetermined period of time following the discontinuity detection of the pulldown sequence, so that, by suspending the recording of the video signal, the pulldown sequence of the recorded video signal becomes continuous, and
   said recording command information generation unit is configured to generate the video recording command information and the audio recording command information according to the determined state of recording.

2. The recording apparatus according to claim 1,
   wherein said control unit includes:
   a pulldown sequence detection unit configured to detect the pulldown sequence of the input video signal;
   a sequence state control unit configured to, when information representing the detected pulldown sequence changes from a first pulldown sequence to a second pulldown sequence, detect the change as the discontinuity; and
   a sequence processing process control unit configured to determine the state of recording as to whether or not to record the video signal and the audio signal,
   wherein said sequence processing process control unit is configured to:
   when said sequence state control unit detects the discontinuity, determine the state of recording of a first period as a record state where the video signal and the audio signal are to be recorded in accordance with the first pulldown sequence, the first period starting from the discontinuity detection until the first pulldown sequence becomes a predetermined value;
   determine the state of recording of a second period after a lapse of the first period, as the non-record state where the video signal and the audio signal are not to be recorded, the second period lasting until the second pulldown sequence becomes the predetermined value; and
   determine the state of recording, after a lapse of the second period, as the record state where the video signal and the audio signal are to be recorded in accordance with the second pulldown sequence.

3. The recording apparatus according to claim 2,
   wherein said control unit further includes an input disturbance detection unit configured to detect a disturbance of the input video signal,
   said sequence processing process control unit is further configured to determine the state of recording of a period during which the disturbance is being detected, as the record state where the video signal and the audio signal are to be recorded in accordance with the first pulldown sequence which is the information representing the pulldown sequence of the video signal detected before the disturbance detection, and
   said sequence state control unit is configured to, when the information representing the pulldown sequence changes from the first pulldown sequence to the second pulldown sequence after the disturbance is no more detected, detect the change as the discontinuity.

4. The recording apparatus according to claim 2,
   wherein said control unit further includes an input disturbance detection unit configured to detect a disturbance of the input video signal,
   said sequence state control unit is configured to, when the disturbance is detected, judge that the first pulldown sequence changes to the second pulldown sequence and detect the change as the discontinuity,
   said sequence processing process control unit is configured to:
   when the discontinuity is detected, determine the state of recording of the first period as the record state where the video signal and the audio signal are to be recorded in accordance with the first pulldown sequence;
   determine the state of recording of the second period after a lapse of the first period as the non-record state where the video signal and the audio signal are not to be recorded, the second period lasting until the disturbance is no more detected and the second pulldown sequence becomes the predetermined value; and
   determine the state of recording, after a lapse of the second period, as the record state where the video signal and the audio signal are to be recorded in accordance with the second pulldown sequence.

5. The recording apparatus according to claim 1,
   wherein said control unit includes:
   a pulldown sequence detection unit configured to detect the pulldown sequence of the input video signal;
   a record sequence generation unit configured to generate a first pulldown sequence which is information representing the pulldown sequence of the video signal currently being recorded;
   a warning detection unit configured to, when a second pulldown sequence which is information representing the pulldown sequence of the video signal detected by the pulldown sequence detection unit disagrees with the first pulldown sequence, detect the disagreement as the discontinuity; and
   a recording start-stop control unit configured to determine the state of recording as to whether or not to record the video signal and the audio signal, said recording start-stop control unit is configured to:

when said warning detection unit detects the discontinuity, determine the state of recording of a first period as a record state where the video signal and the audio signal are to be recorded in accordance with the first pulldown sequence, the first period starting from the discontinuity detection until the first pulldown sequence becomes a predetermined value;

determine the state of recording of a second period after a lapse of the first period as the non-record state where the video signal and the audio signal are not to be recorded, the second period lasting until the second pulldown sequence becomes the predetermined value; and determine the state of recording, after a lapse of the second period, as the record state where the video signal and the audio signal are to be recorded in accordance with the second pulldown sequence.

6. The recording apparatus according to claim 5, wherein said control unit further includes an input disturbance detection unit configured to detect a disturbance of the input video signal, said warning detection unit is configured to, when the disturbance is detected, judge that the first pulldown sequence changes to the second pulldown sequence and detect the change as the discontinuity, said recording start-stop control unit is configured to:

when the discontinuity is detected, determine the state of recording of the first period as the record state where the video signal and the audio signal are to be recorded in accordance with the first pulldown sequence;

determine the state of recording of the second period after a lapse of the first period as the non-record state where the video signal and the audio signal are not to be recorded, the second period lasting until the disturbance is no more detected and the second pulldown sequence becomes the predetermined value; and determine the state of recording, after a lapse of the second period, as the record state where the video signal and the audio signal are to be recorded in accordance with the second pulldown sequence.

7. The recording apparatus according to claim 1, wherein said control unit is configured to:

when information representing the pulldown sequence of the input video signal changes from a first pulldown sequence to a second pulldown sequence, detect the change as the discontinuity;

determine the state of recording as the non-record state where the video signal and the audio signal are not to be recorded for the predetermined period of time, during which the recording of the video signal is suspended following the discontinuity detection and after a lapse of which the recording of the video signal is resumed, so that the first pulldown sequence becomes continuous to the second pulldown sequence; and determine the state of recording, after the lapse of the predetermined period of time, as the record state where the video signal and the audio signal are to be recorded in accordance with the second pulldown sequence.

8. A method for recording an input video signal and an input audio signal, comprising:

receiving the video signal and the audio signal, a mode of the video signal being a second mode having been pulldown-converted from a first mode;

performing control so as to detect a discontinuity of a pulldown sequence of the input video signal, and to determine a state of recording as a non-record state where the video signal and the audio signal are not to be recorded for a predetermined period of time, during which the recording of the video signal is suspended following the discontinuity detection and after a lapse of which the recording of the video signal is resumed so that the pulldown sequence becomes continuous;

generating: video recording command information which indicates whether or not to record the video signal of the first mode; and audio recording command information which indicates whether or not to record the audio signal; and providing to-be-recorded video data and to-be-recorded audio data based on the video signal and the audio signal indicated to be recorded respectively according to the generated video recording command information and the generated audio recording command information.

9. A non-transitory computer-readable medium having a program stored thereon for recording an input video signal and an audio signal which, said non-transitory computer-readable medium, when loaded into a computer, allows the computer to execute:

receiving the video signal and the audio signal, a mode of the video signal being a second mode having been pulldown-converted from a first mode;

performing control so as to detect a discontinuity of a pulldown sequence of the input video signal, and to determine a state of recording as a non-record state where the video signal and the audio signal are not to be recorded for a predetermined period of time, during which the recording of the video signal is suspended following the discontinuity detection and after a lapse of which the recording of the video signal is resumed so that the pulldown sequence becomes continuous;

generating: video recording command information which indicates whether or not to record the video signal of the first mode; and audio recording command information which indicates whether or not to record the audio signal; and providing to-be-recorded video data and to-be-recorded audio data based on the video signal and the audio signal indicated to be recorded respectively according to the generated video recording command information and the generated audio recording command information.

* * * * *